Sept. 29, 1925.
F. H. BRINKERHOFF
1,555,100
VENDING MACHINE FOR POSTAGE STAMPS, VALUE TOKENS, ARTICLES, ETC
Original Filed Dec. 8, 1916   60 Sheets-Sheet 1
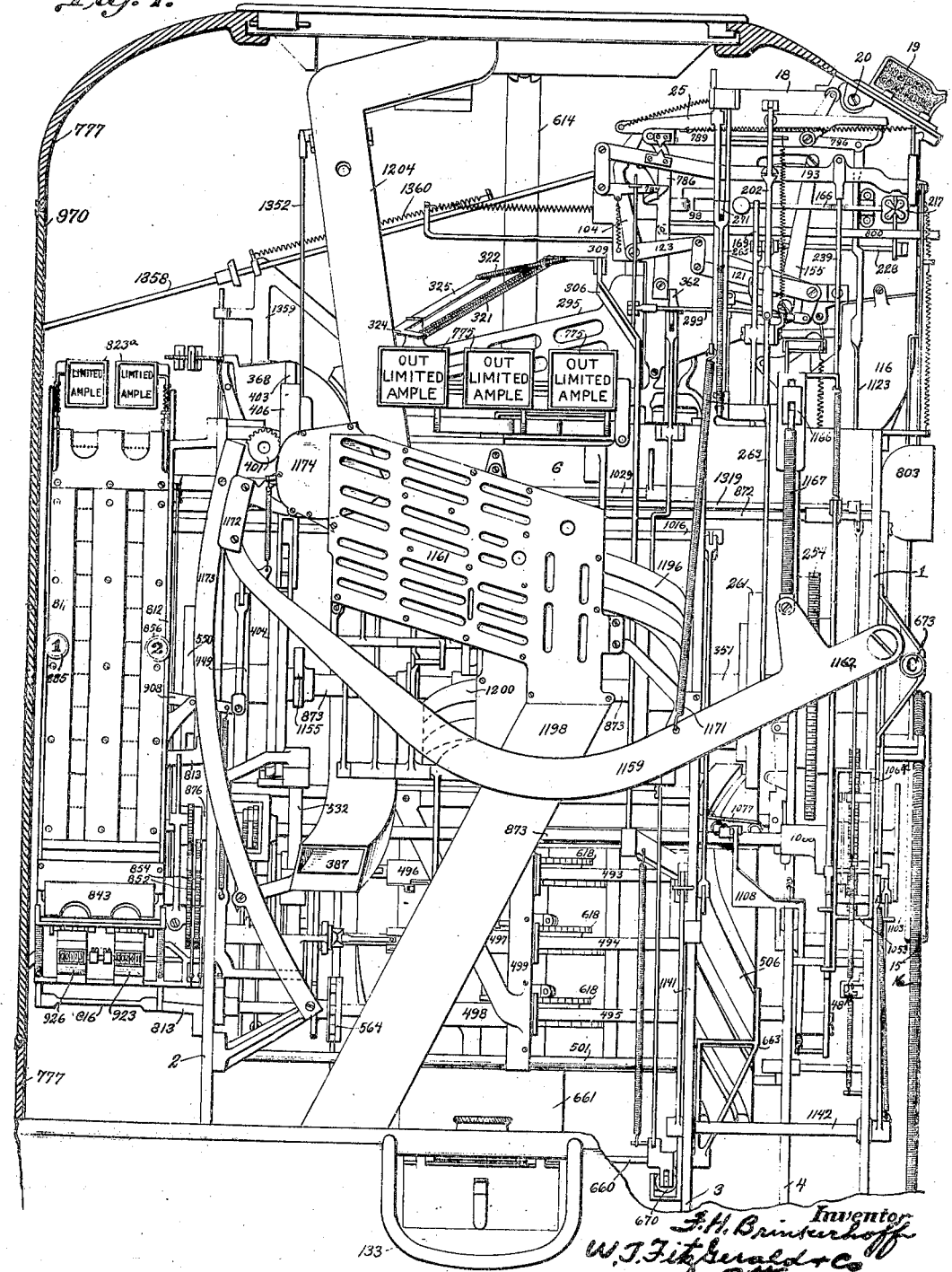

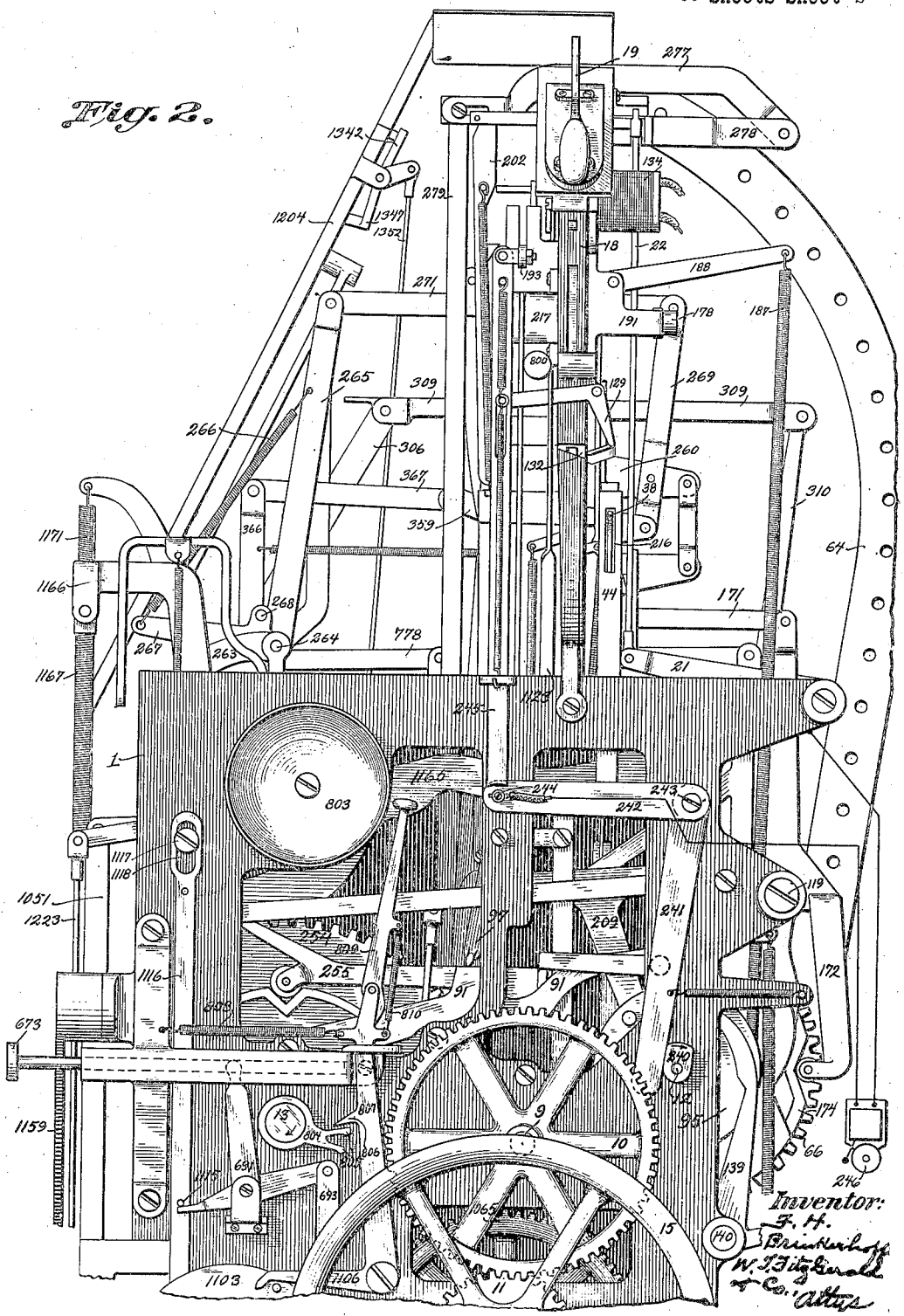

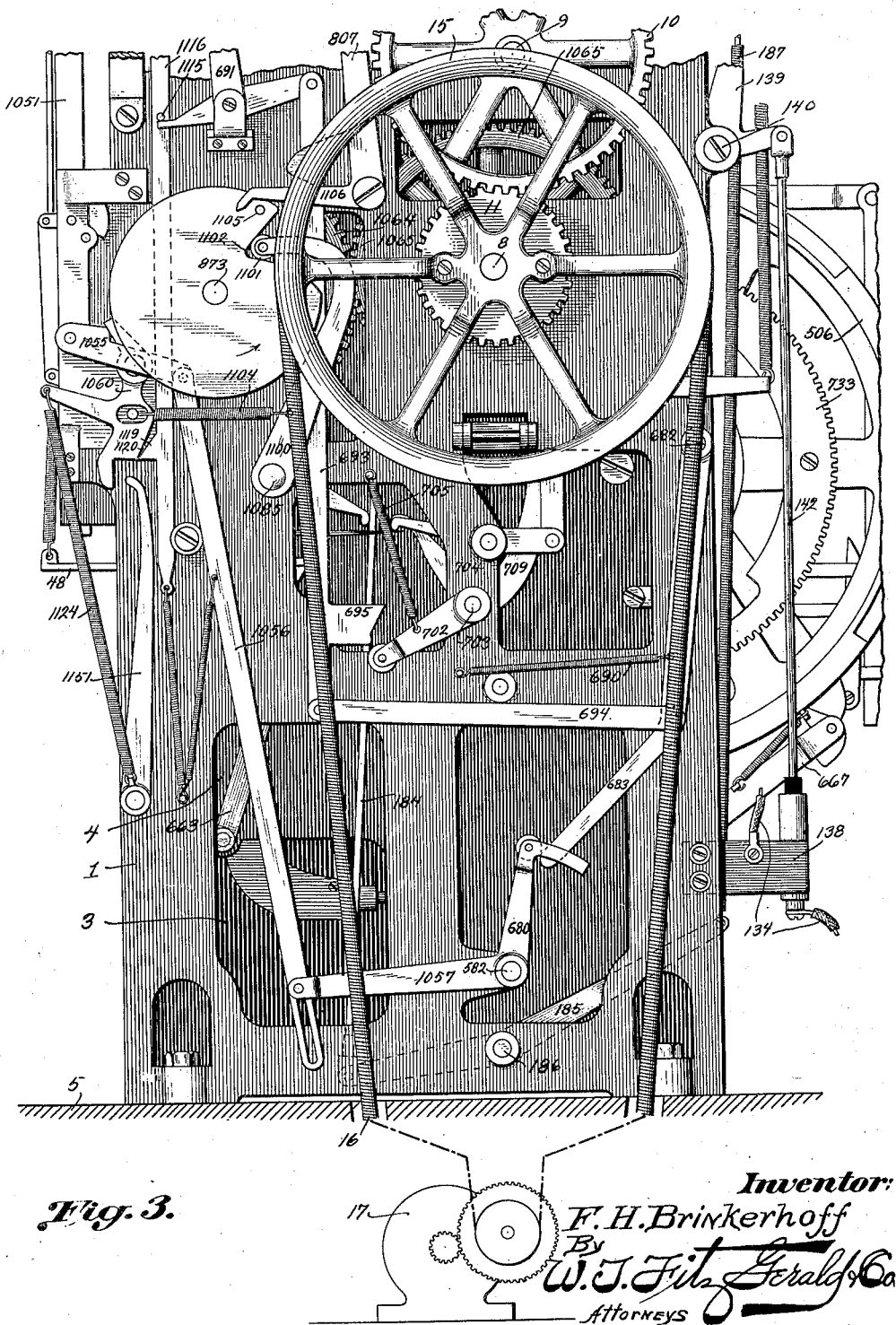

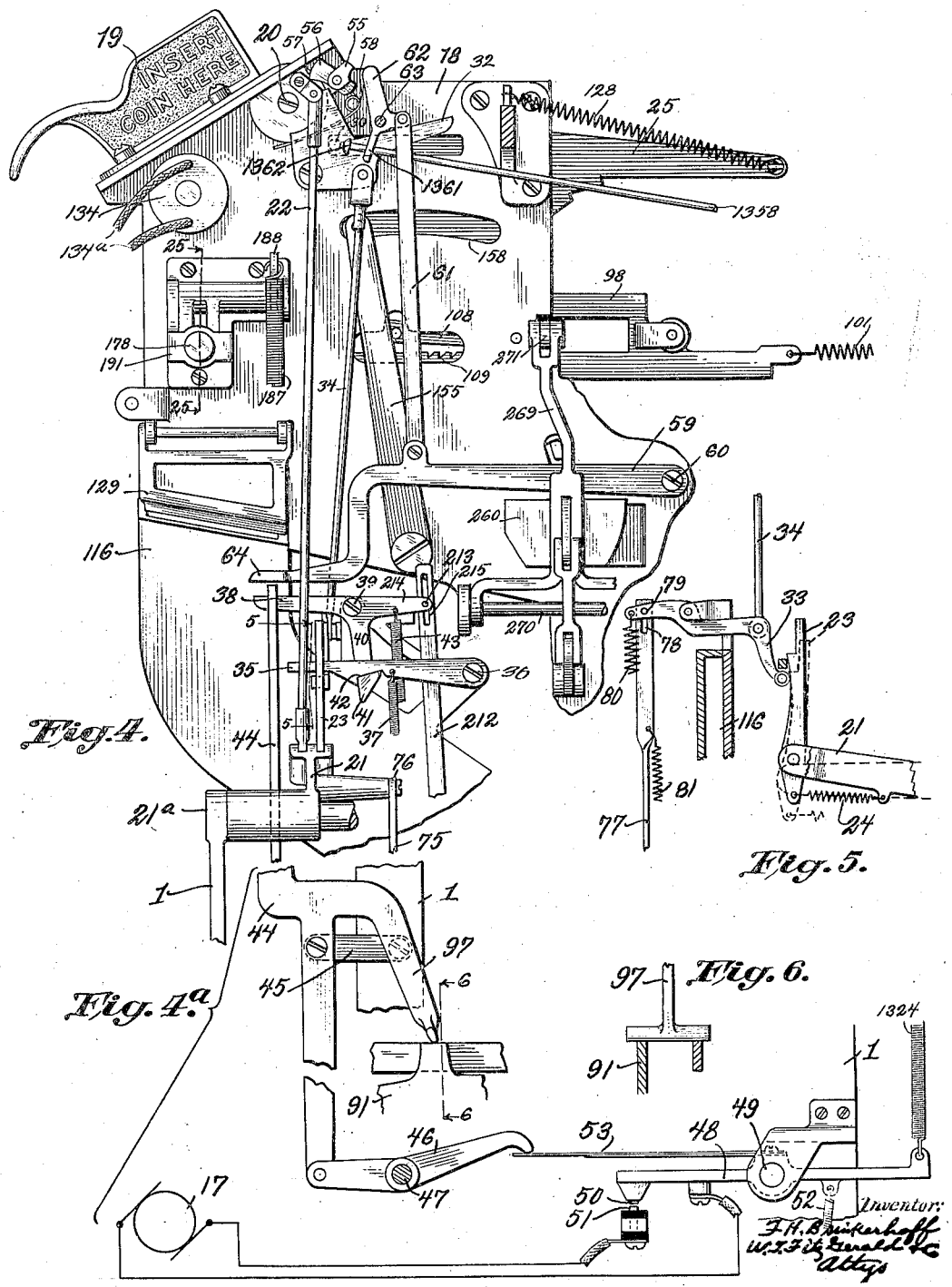

Sept. 29, 1925.                                                   1,555,100
                          F. H. BRINKERHOFF
        VENDING MACHINE FOR POSTAGE STAMPS, VALUE TOKENS, ARTICLES, ETC
                 Original Filed Dec. 8, 1916      60 Sheets-Sheet 5
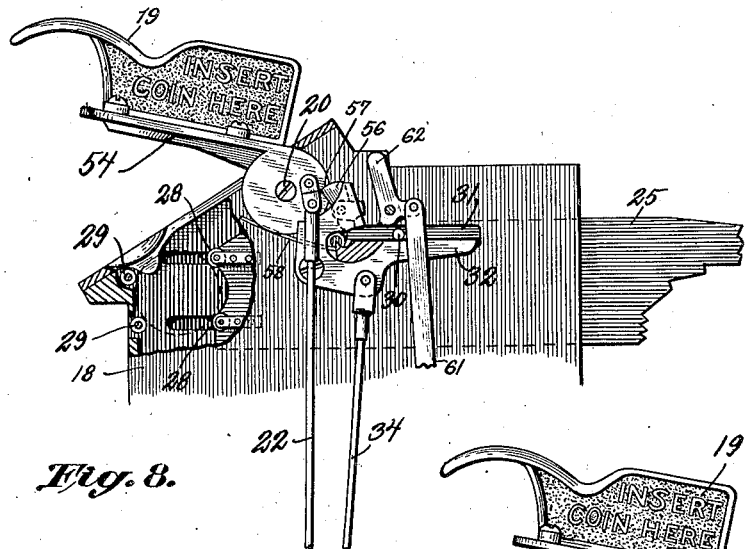
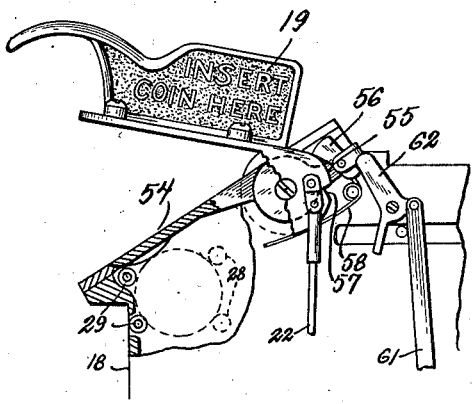
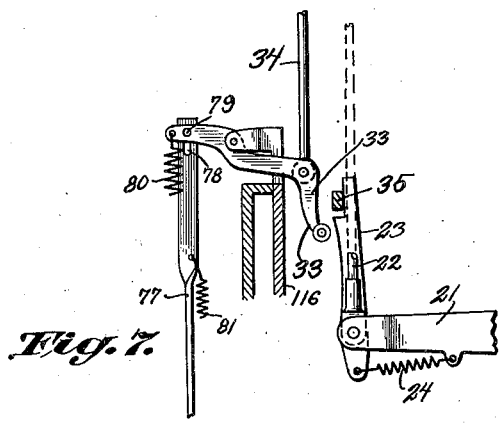
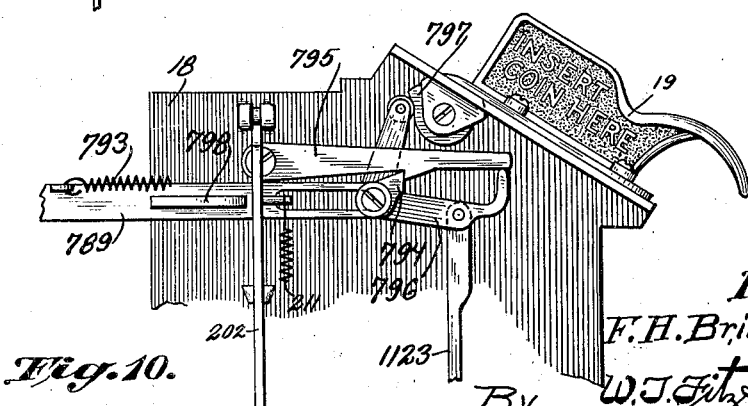
*Inventor:*
*F. H. Brinkerhoff*
By *W. J. Fitz Gerald & Co.*
*Attorneys*

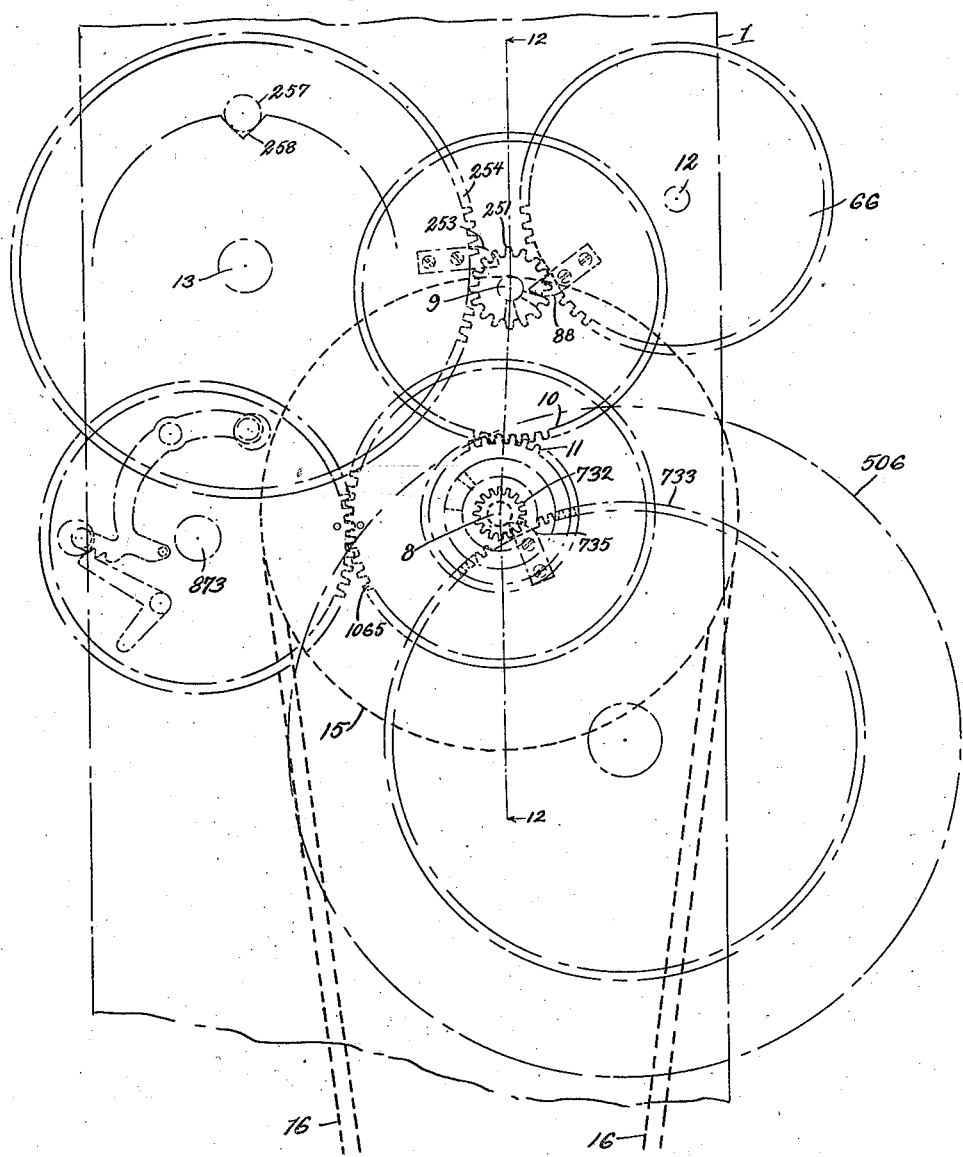

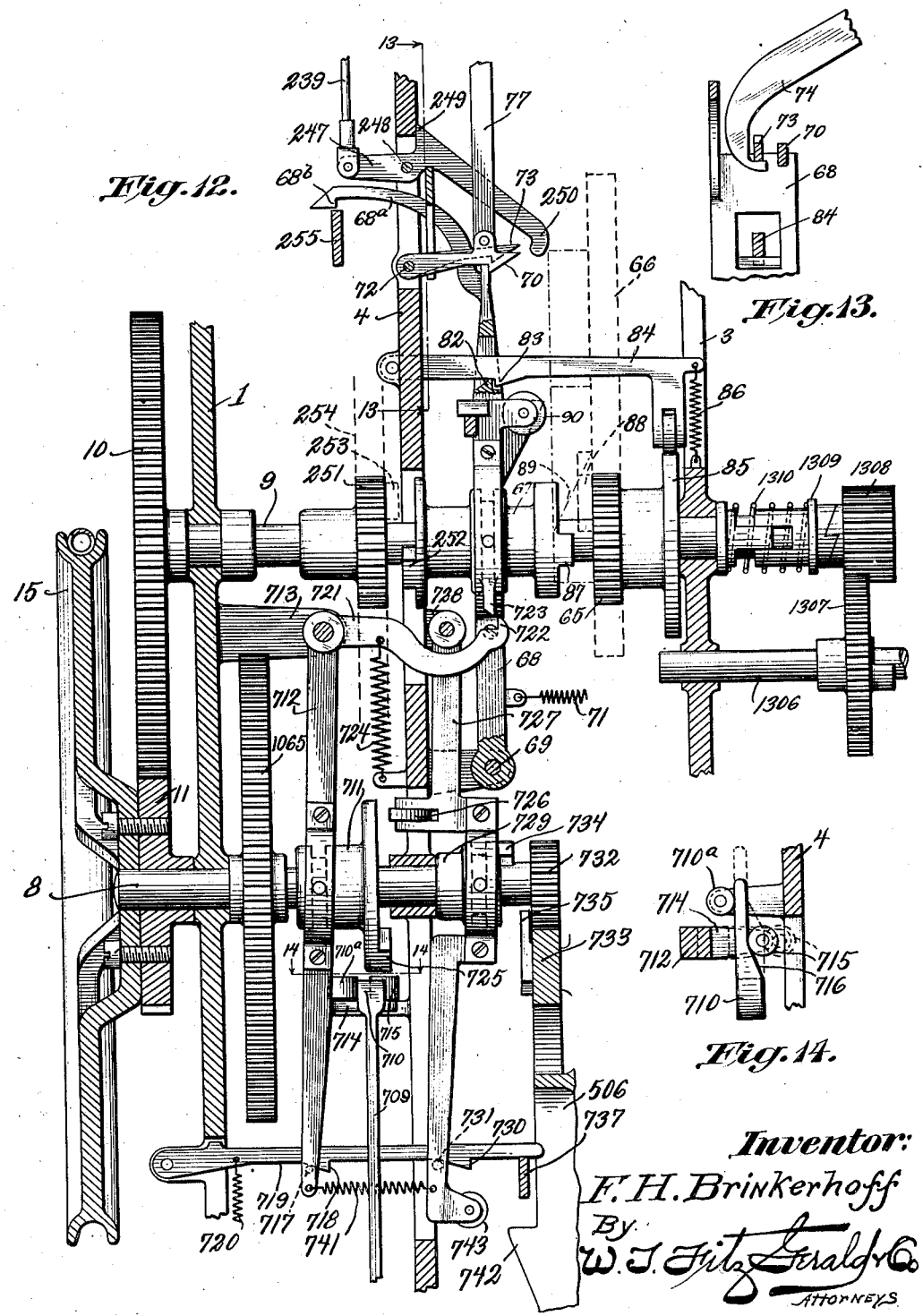

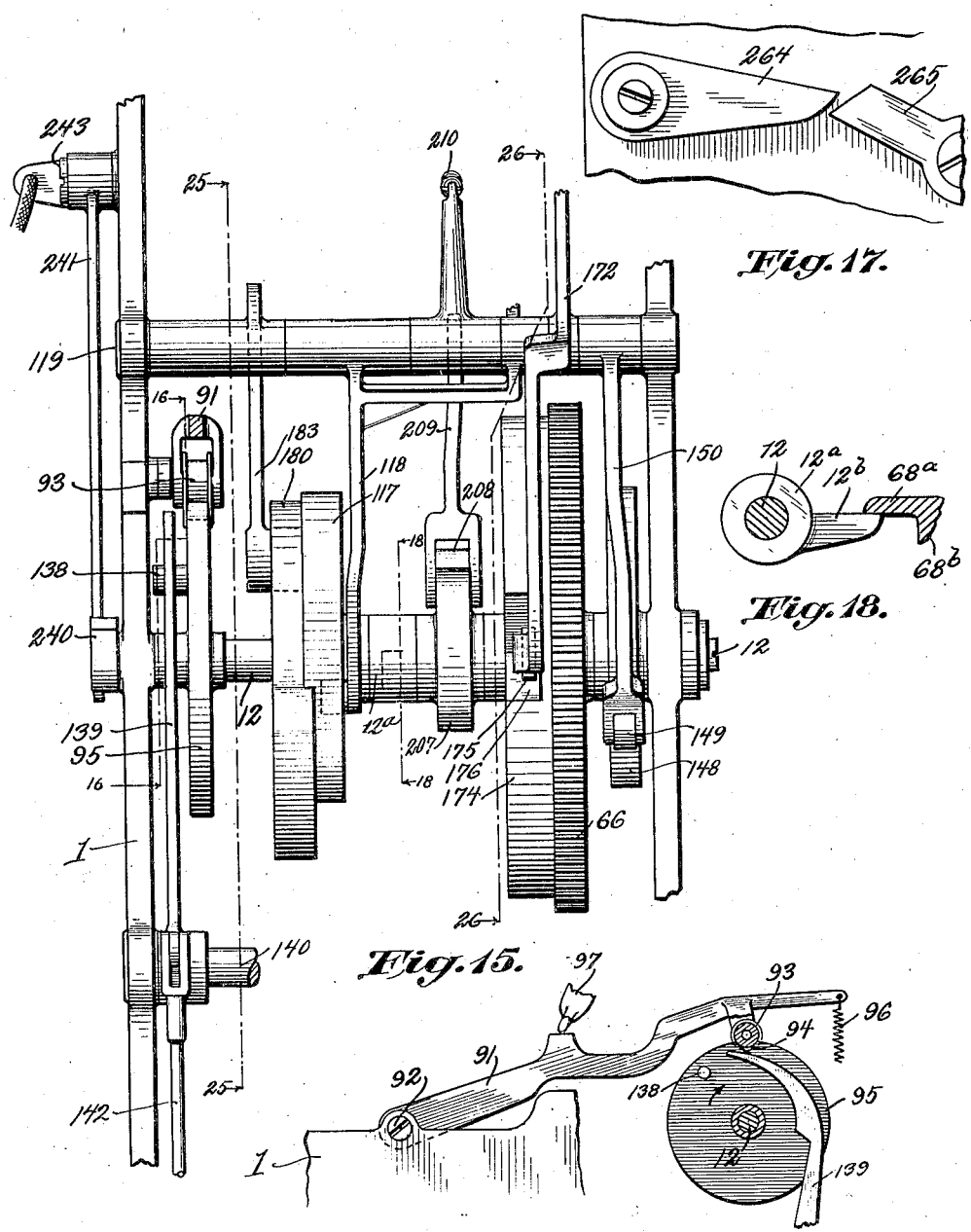

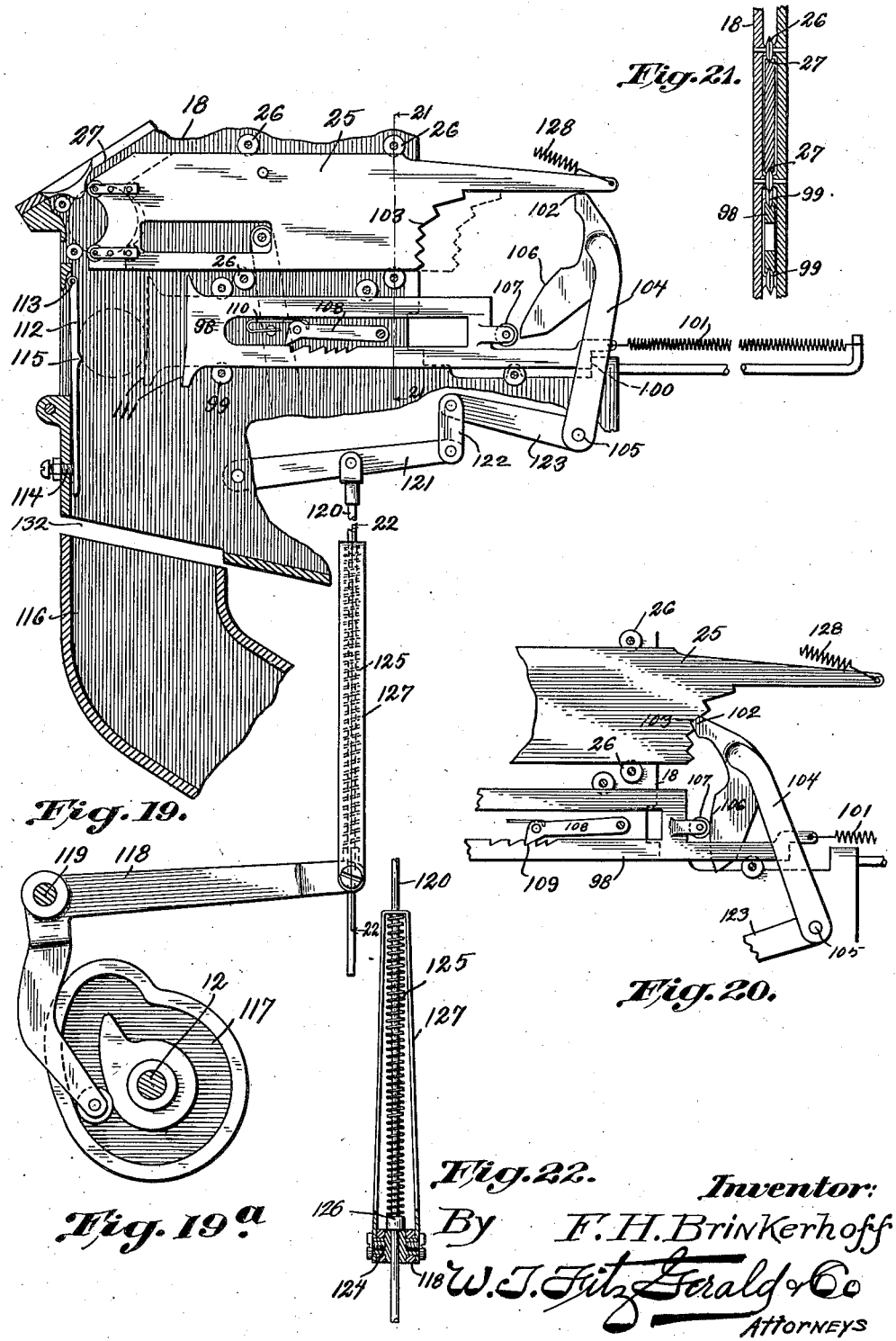

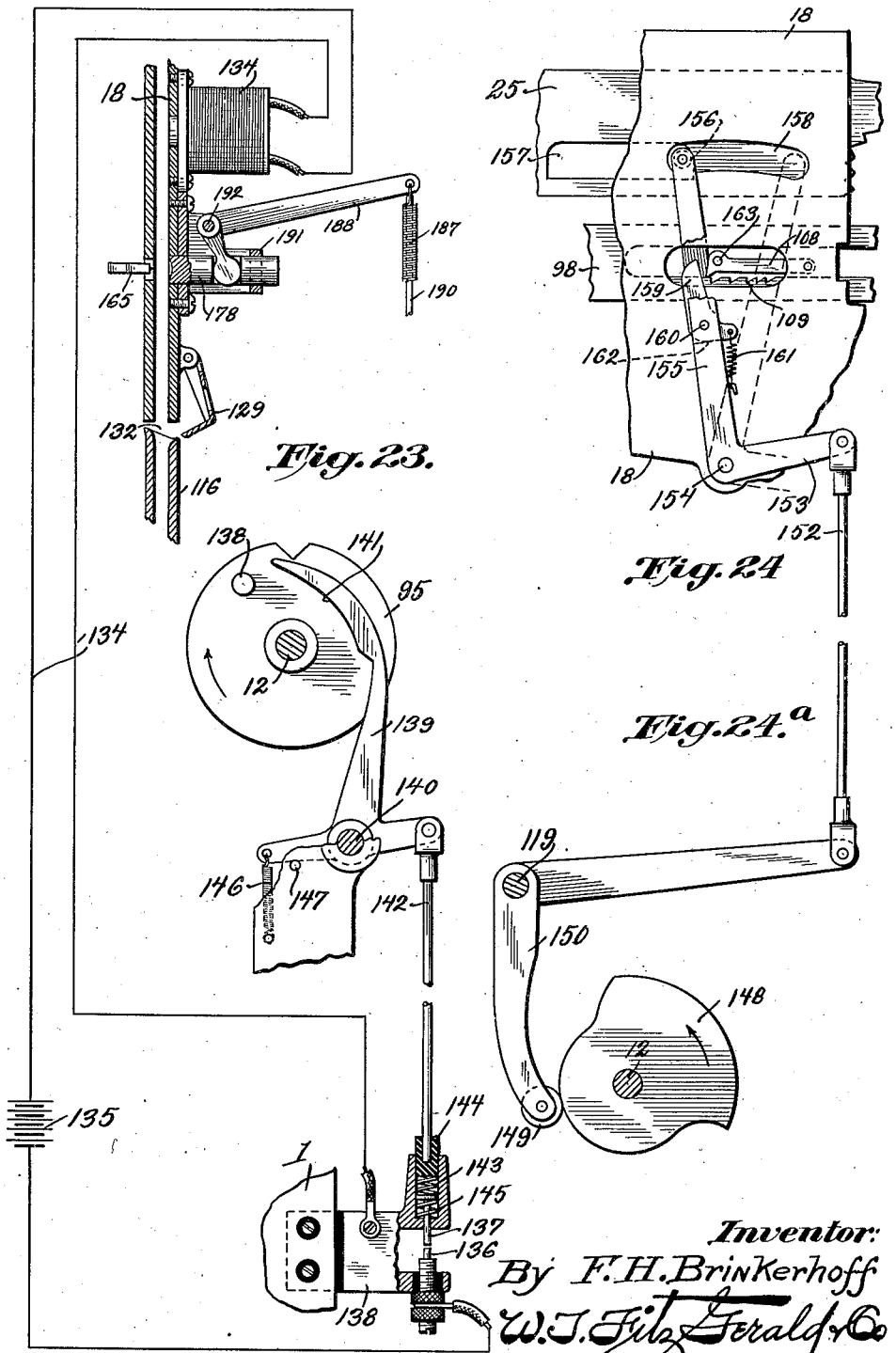

Sept. 29, 1925.

F. H. BRINKERHOFF

VENDING MACHINE FOR POSTAGE STAMPS, VALUE TOKENS, ARTICLES, ETC

Original Filed Dec. 8, 1916    60 Sheets-Sheet 11

Inventor:
F. H. Brinkerhoff
By W. T. Fitz Gerald & Co.
Attorneys

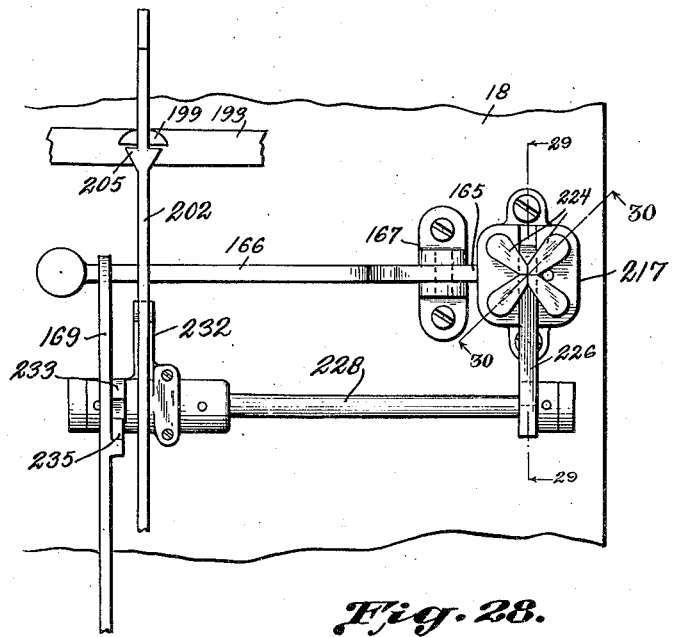
Fig. 28.
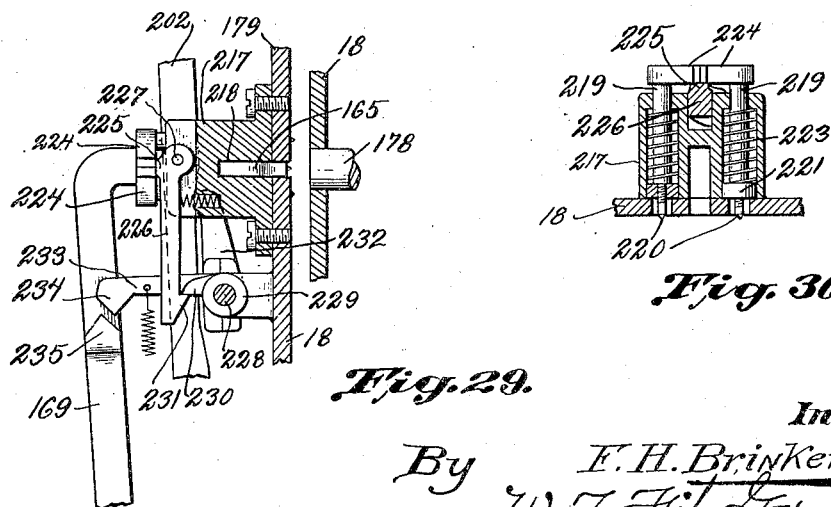
Fig. 29.
Fig. 30.

Sept. 29, 1925.  1,555,100
F. H. BRINKERHOFF
VENDING MACHINE FOR POSTAGE STAMPS, VALUE TOKENS, ARTICLES, ETC
Original Filed Dec. 8, 1916  60 Sheets-Sheet 13
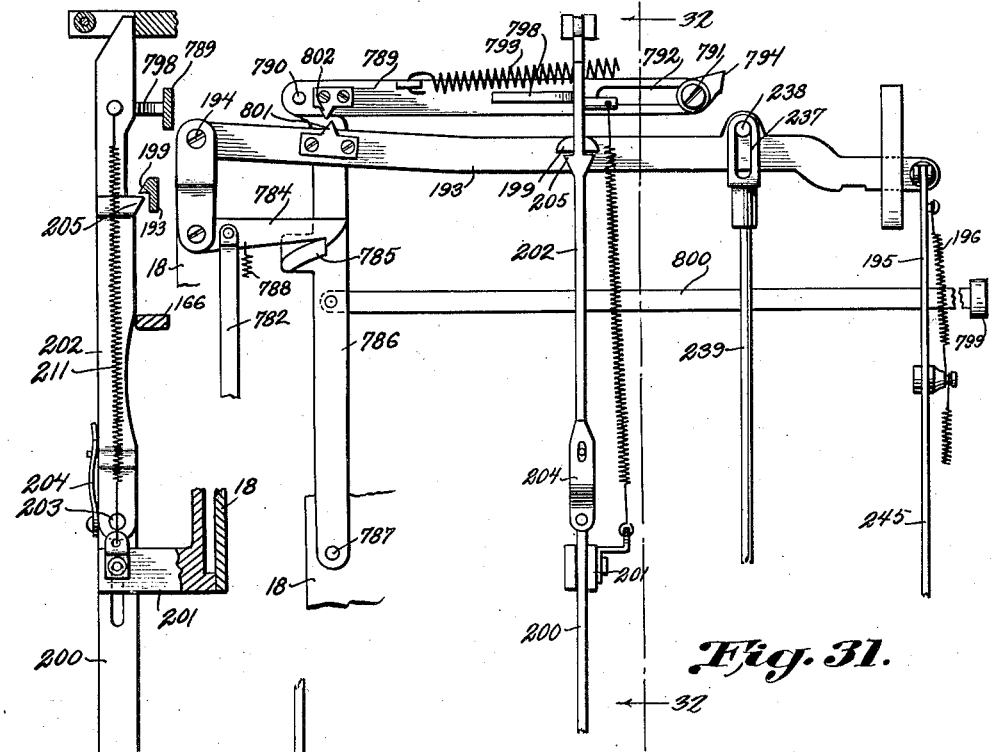
Fig. 31.
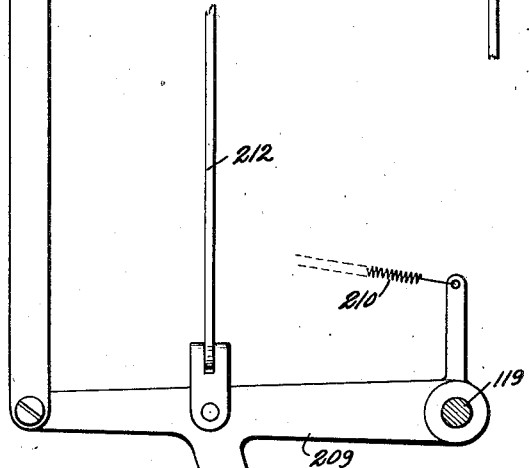
Fig. 32.
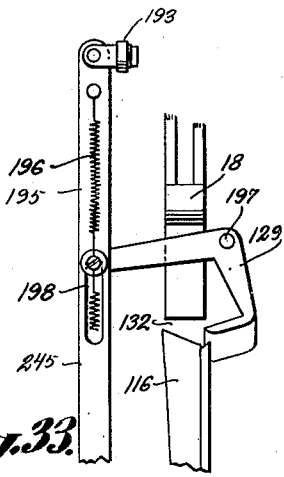
Fig. 33.
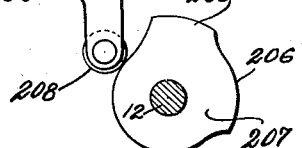
Inventor:
F. H. Brinkerhoff
By W. J. Fitz Gerald & Co
Attorneys Sept. 29, 1925.  
F. H. BRINKERHOFF  
1,555,100  
VENDING MACHINE FOR POSTAGE STAMPS, VALUE TOKENS, ARTICLES, ETC  
Original Filed Dec. 8, 1916    60 Sheets-Sheet 14
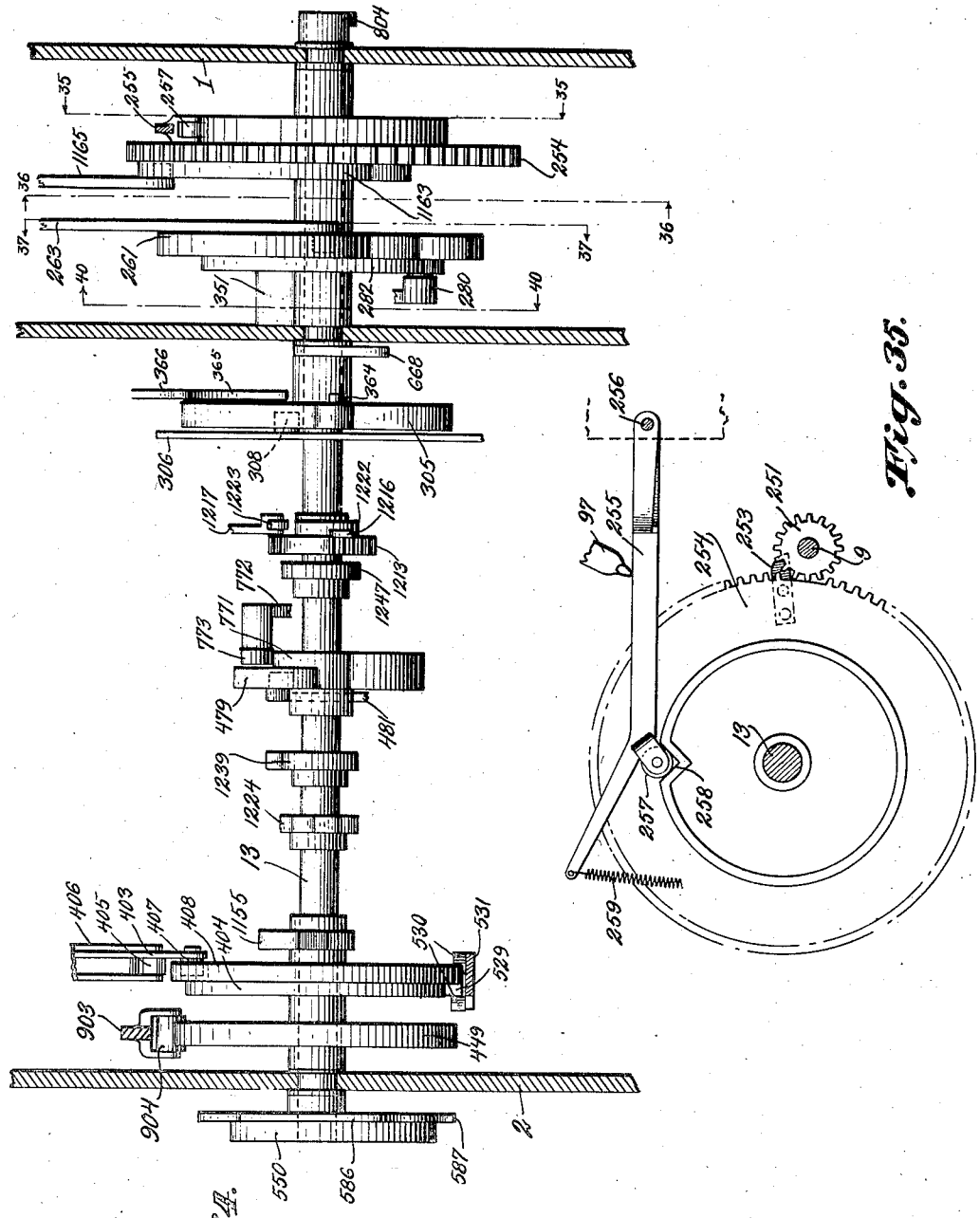

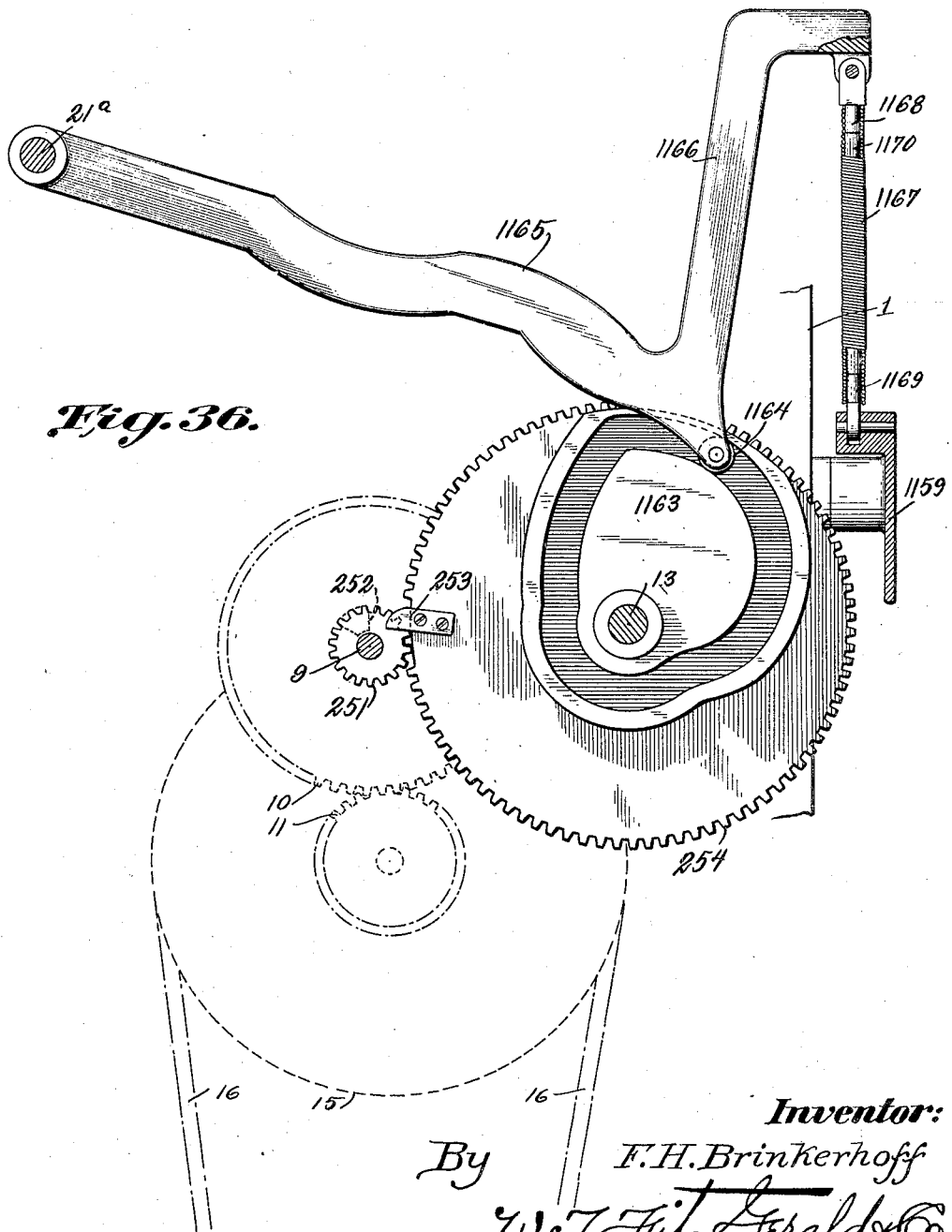

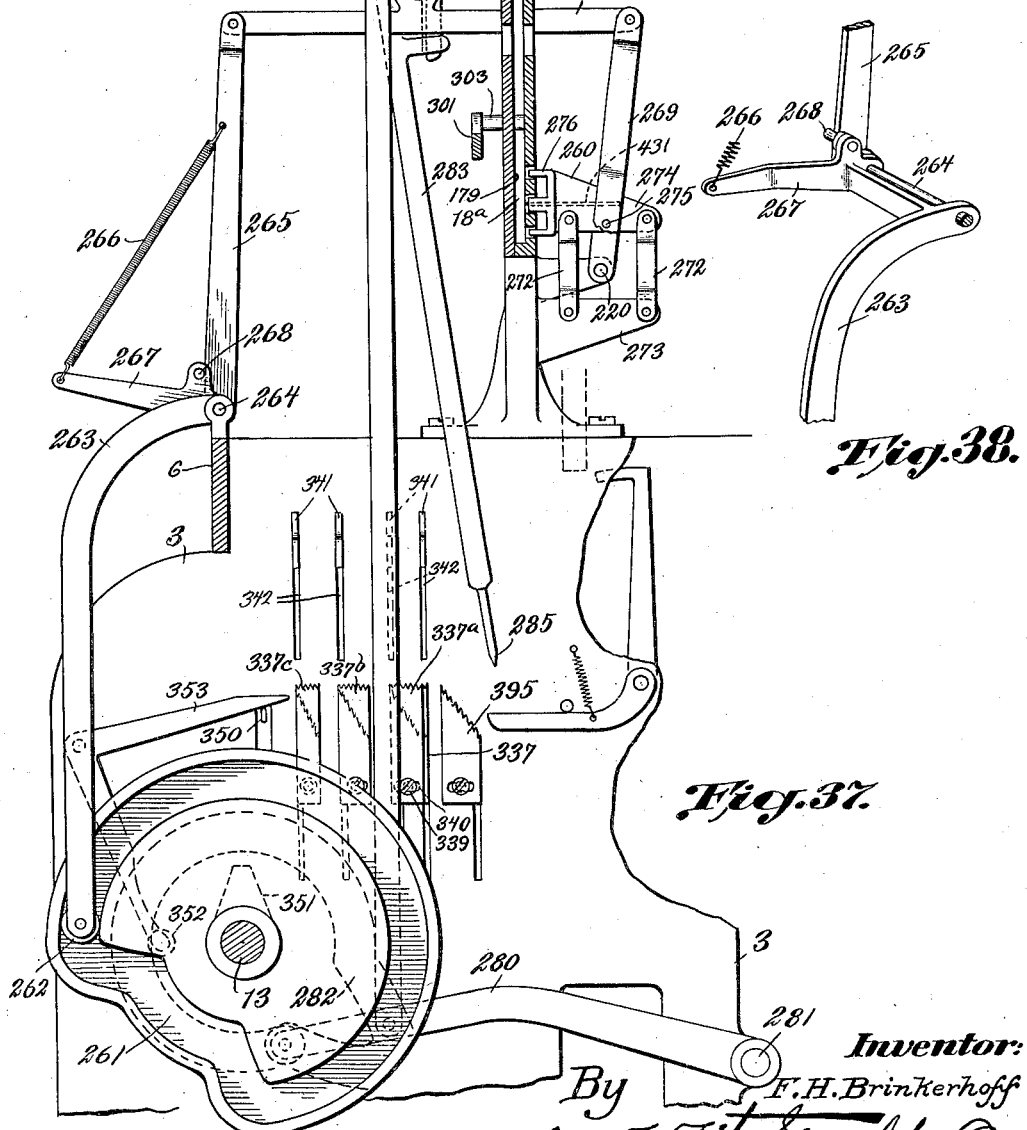

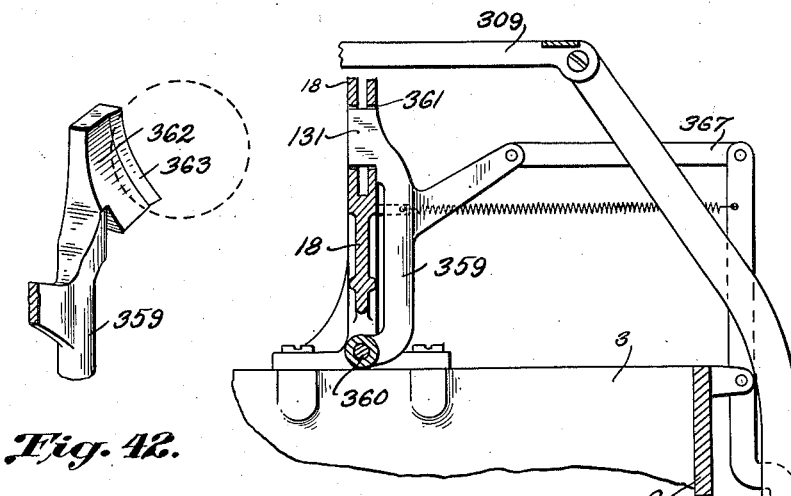
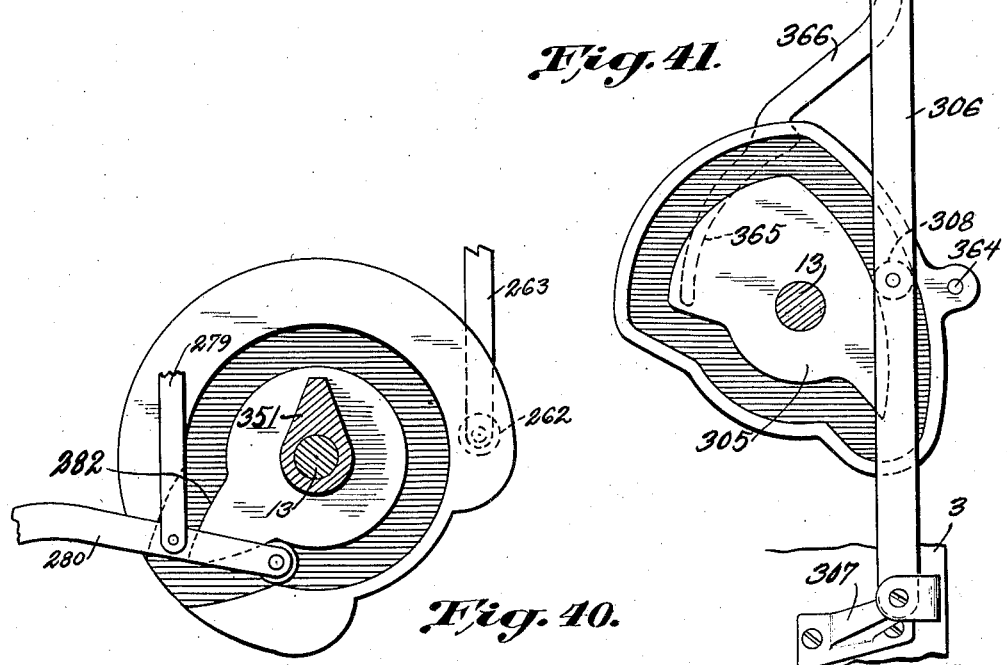

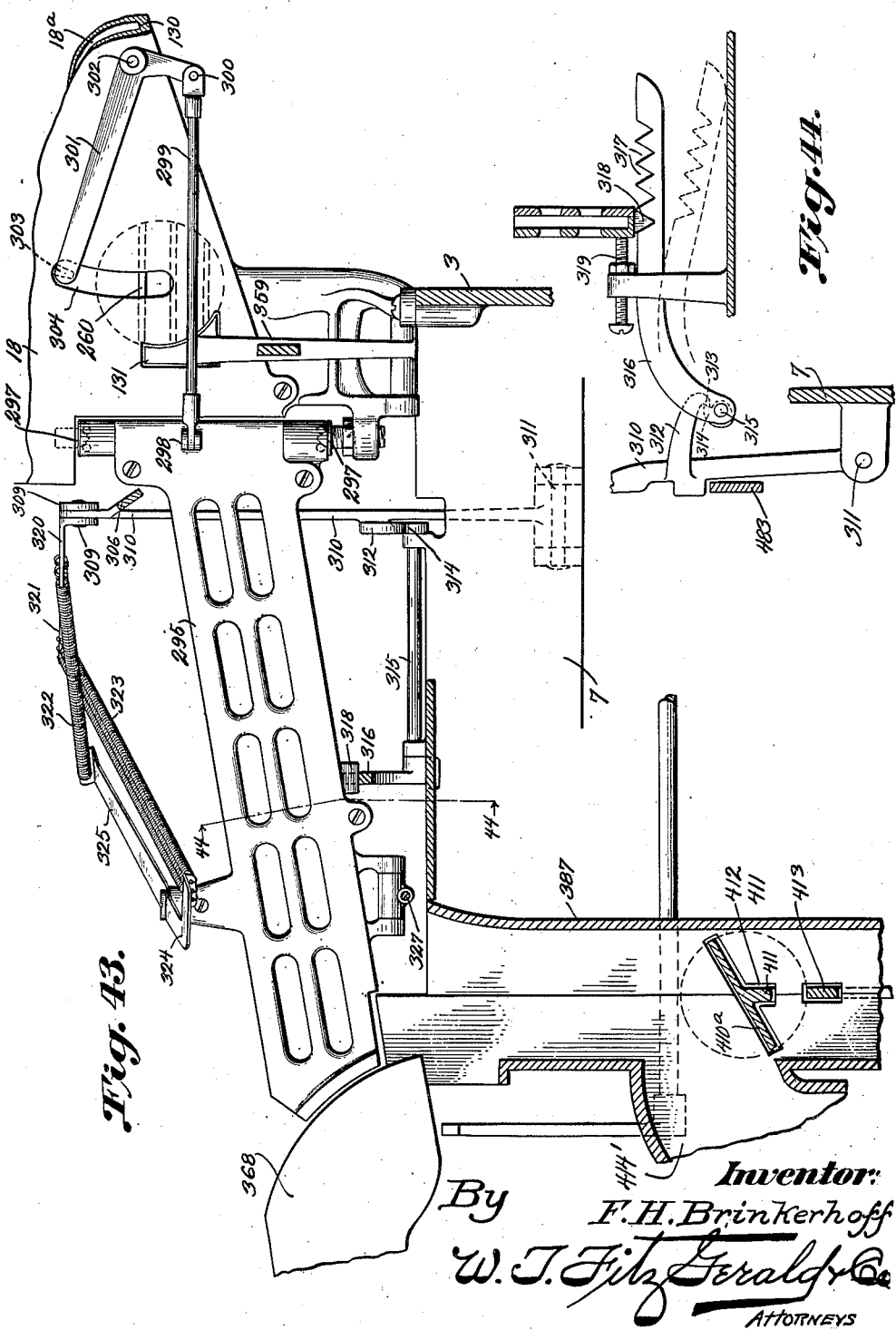

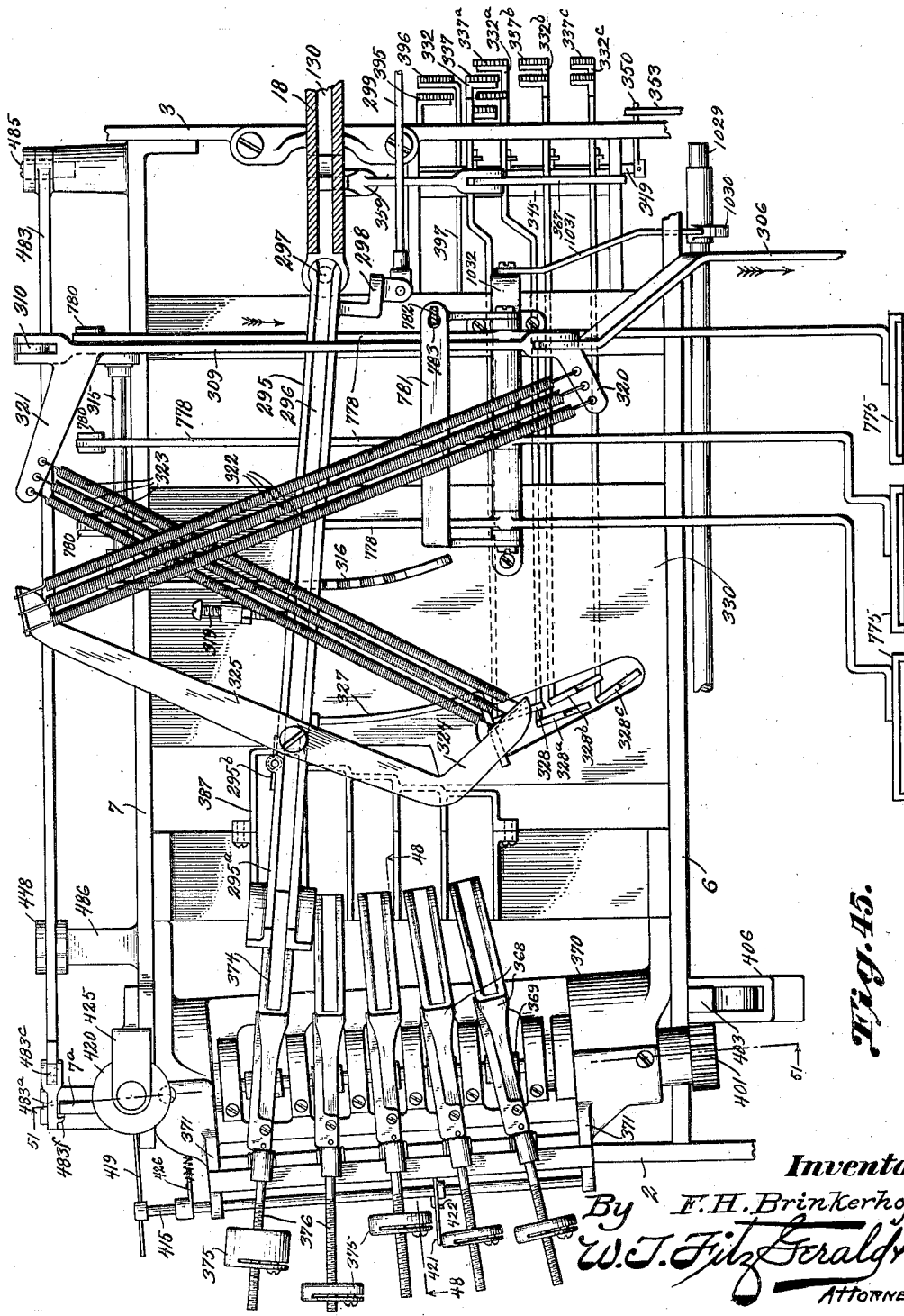

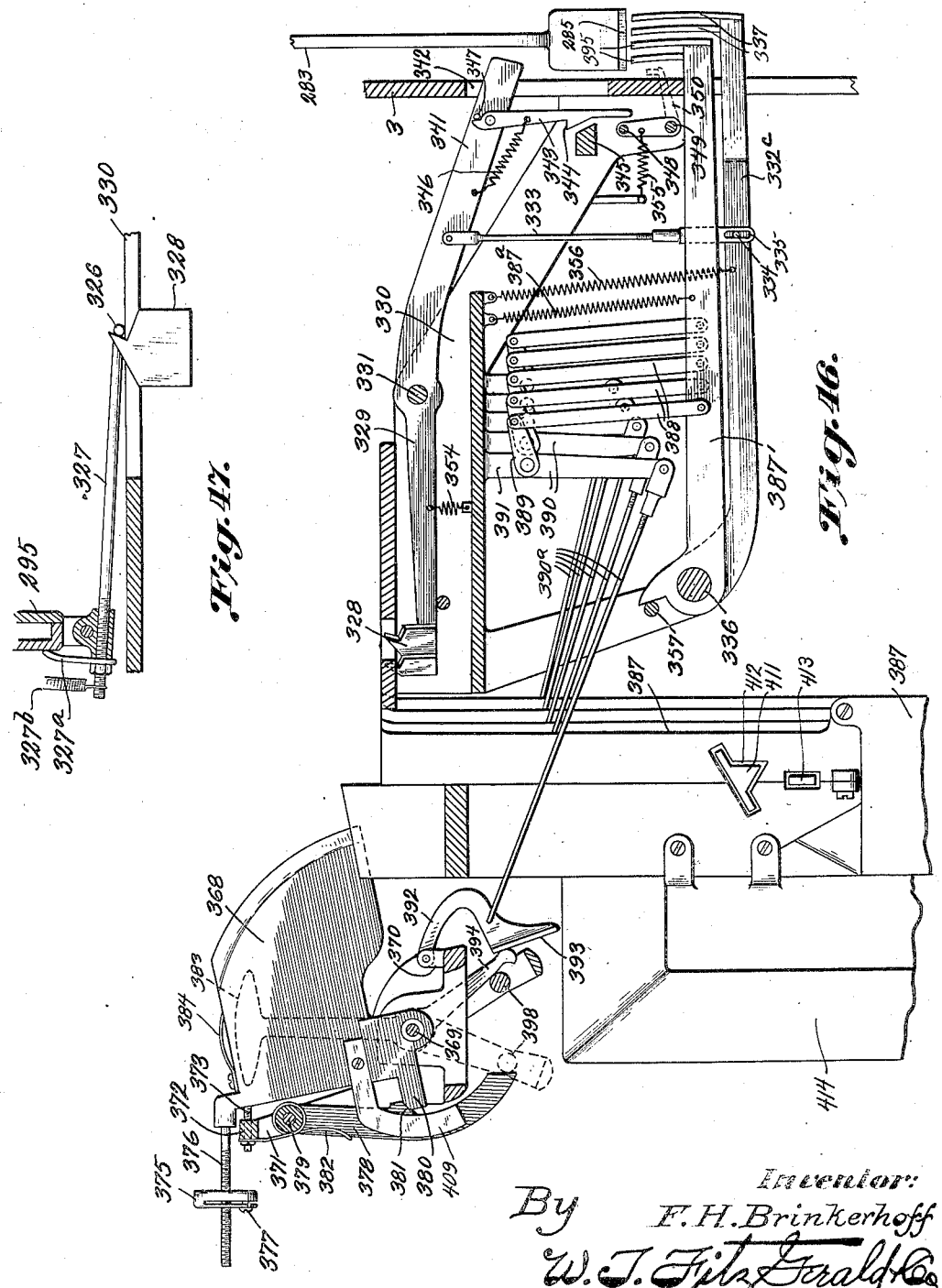

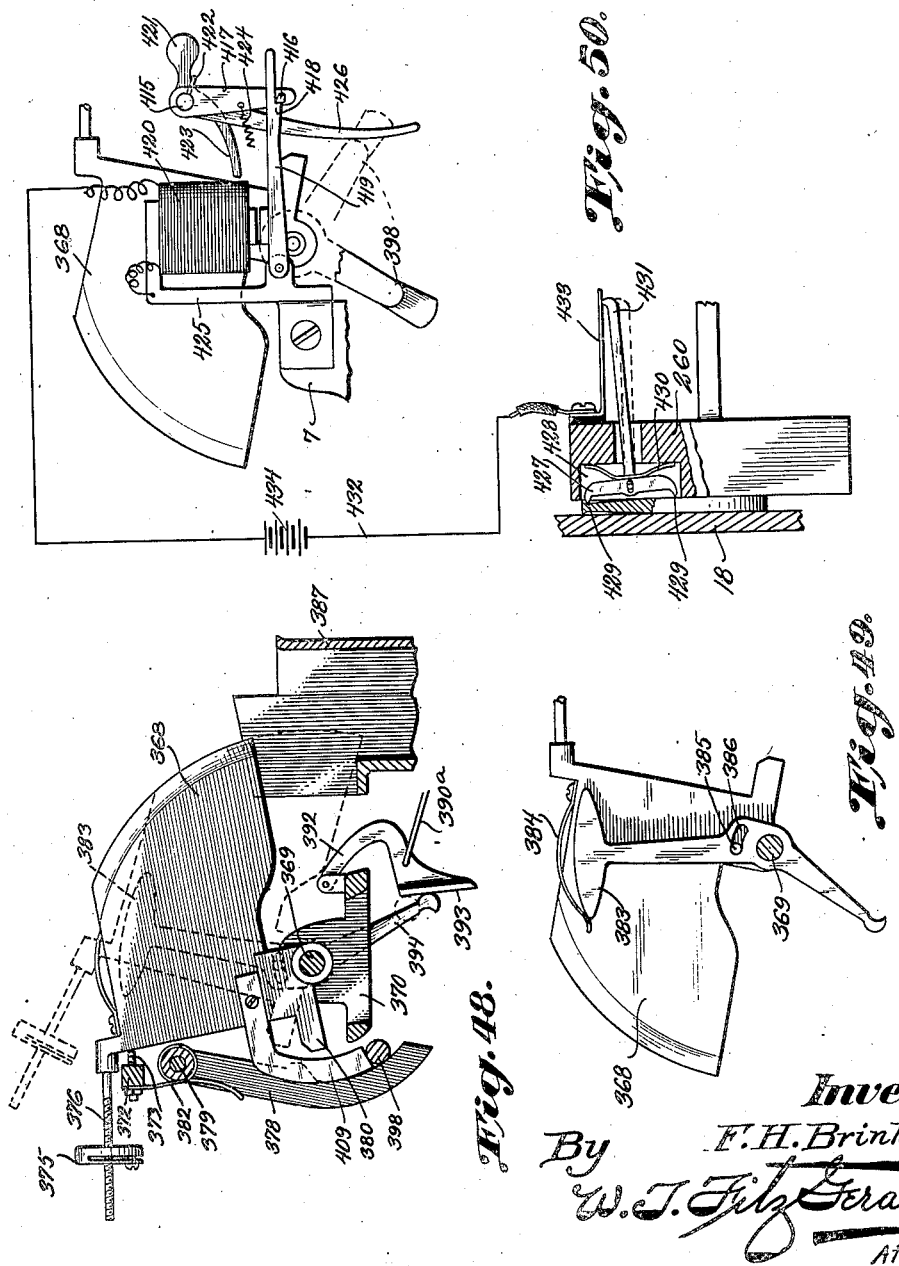

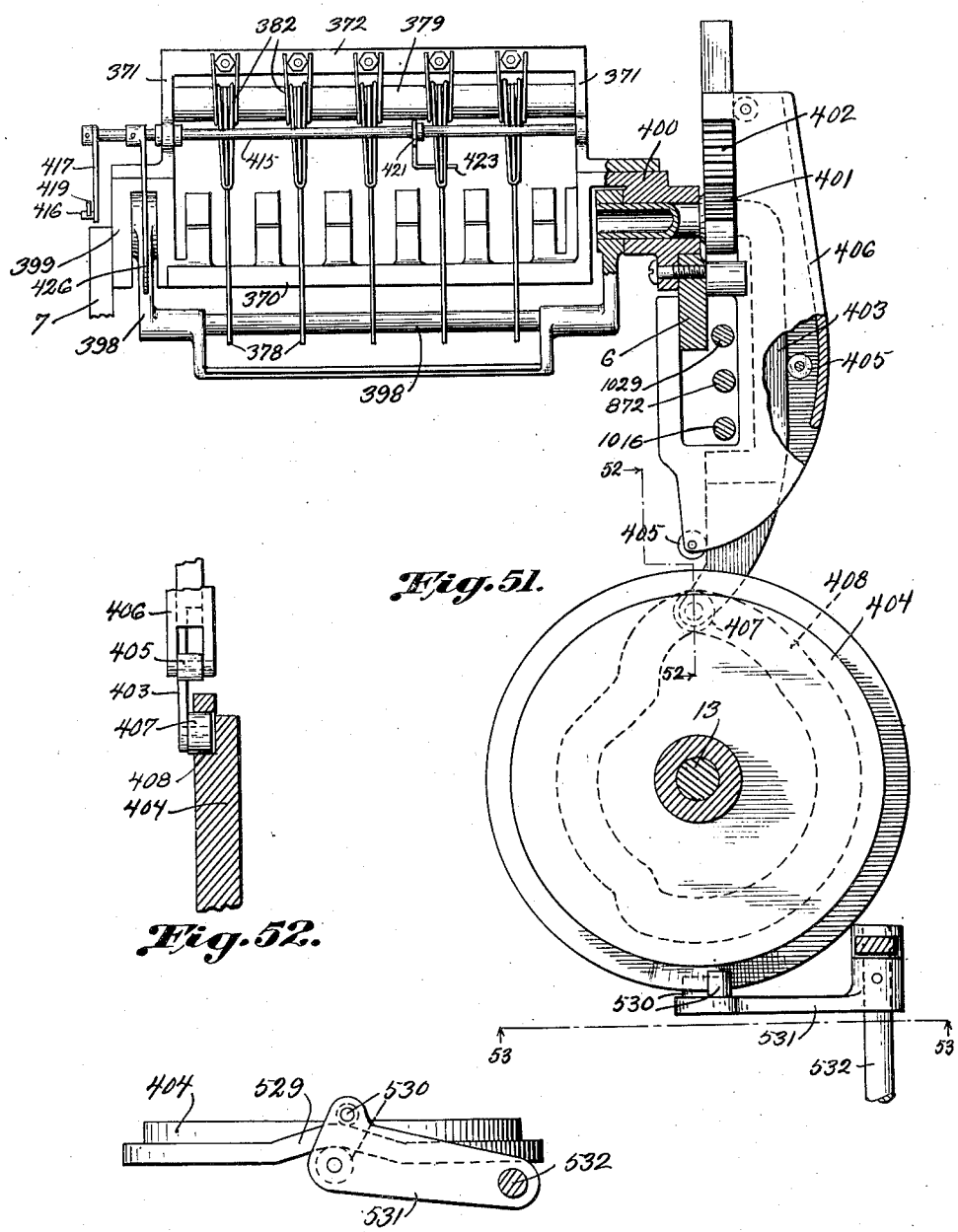

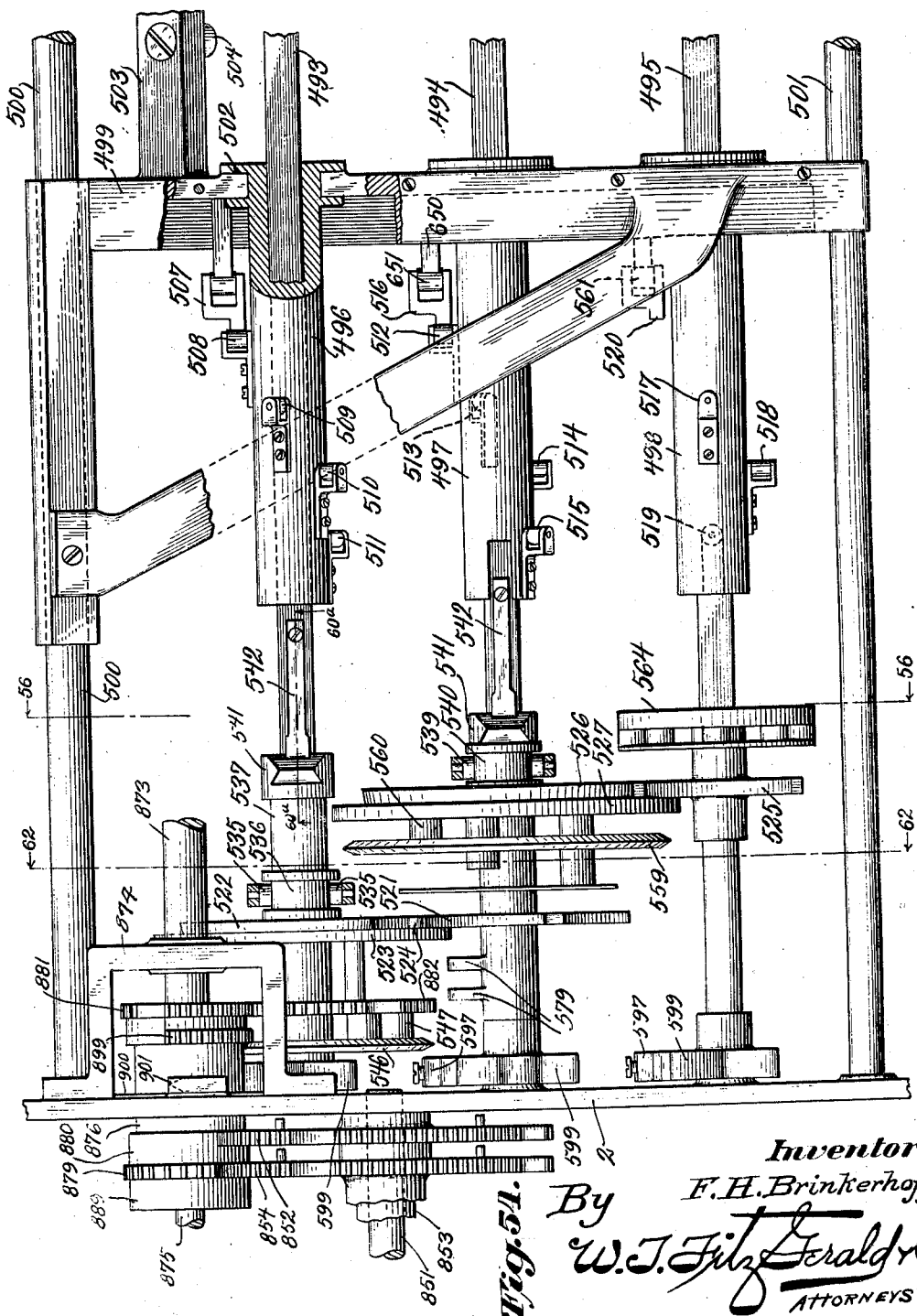

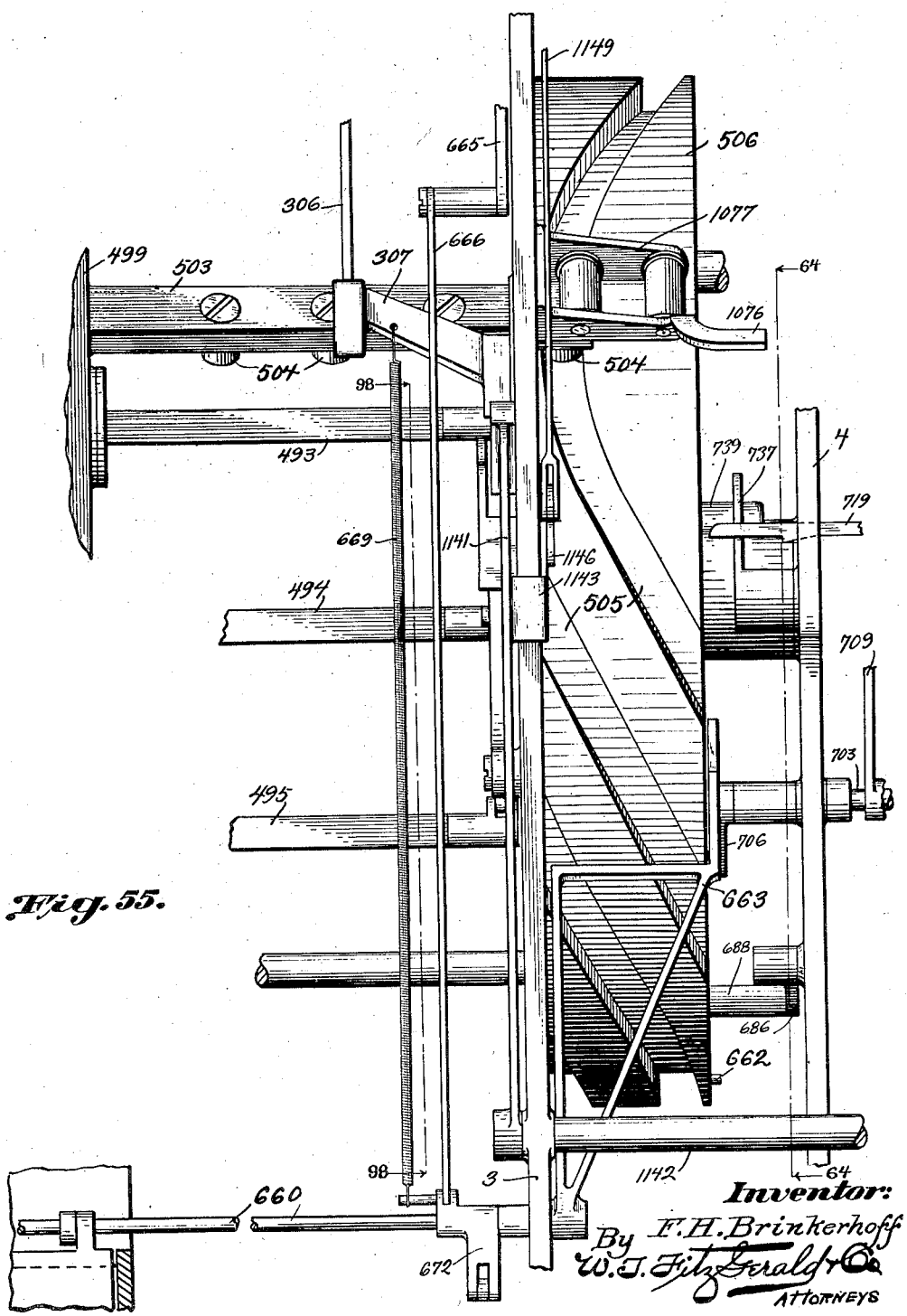

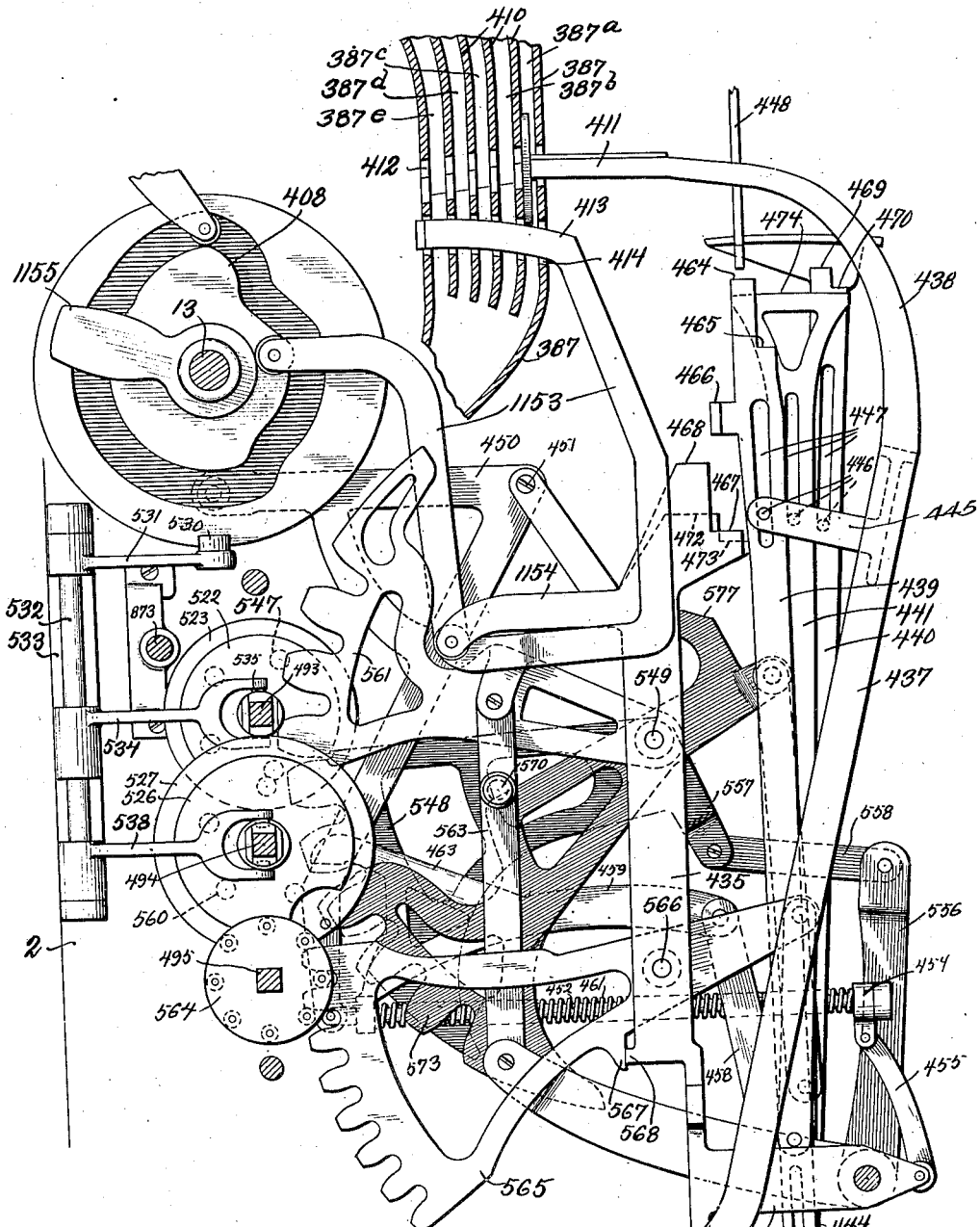

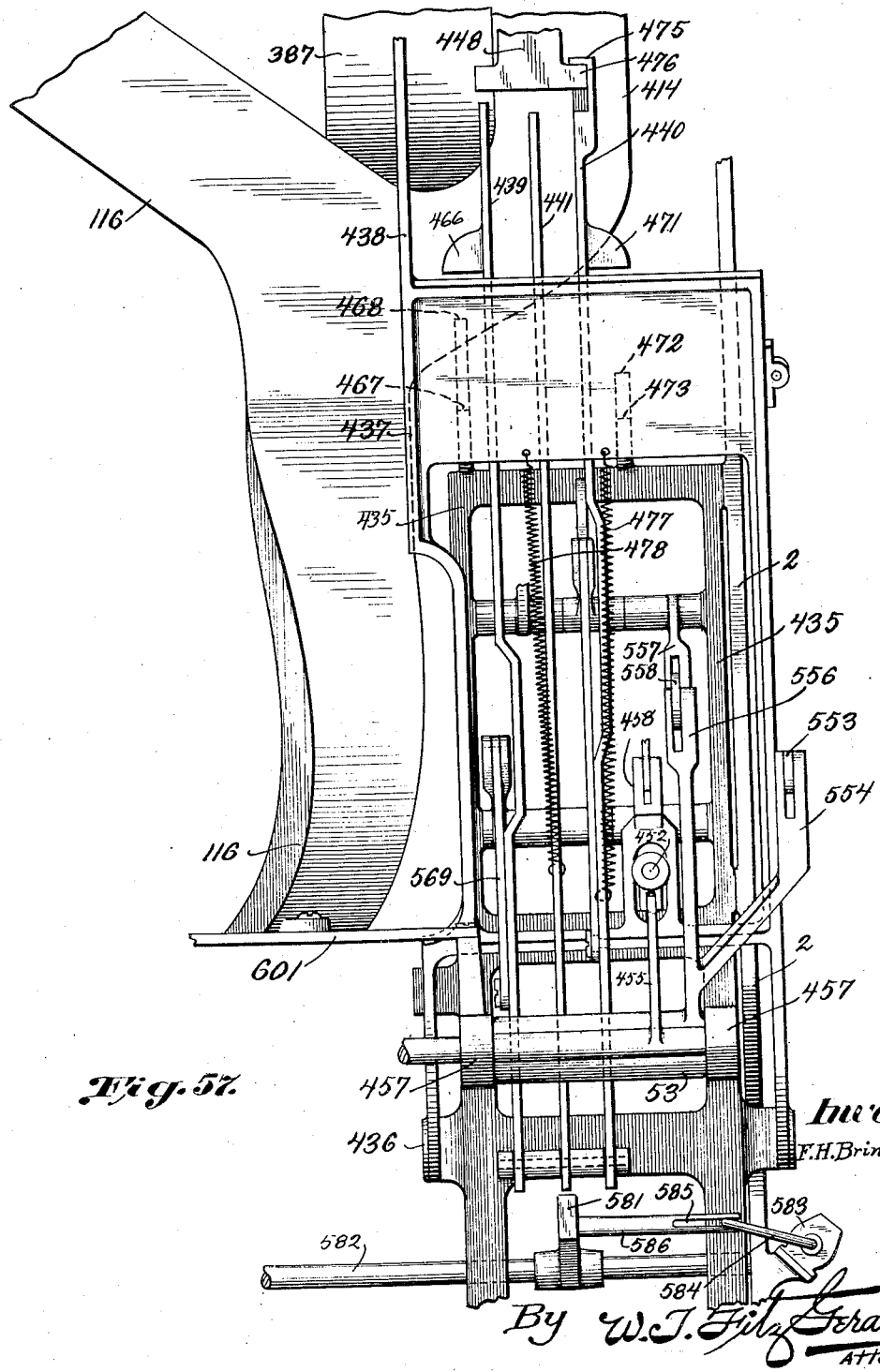

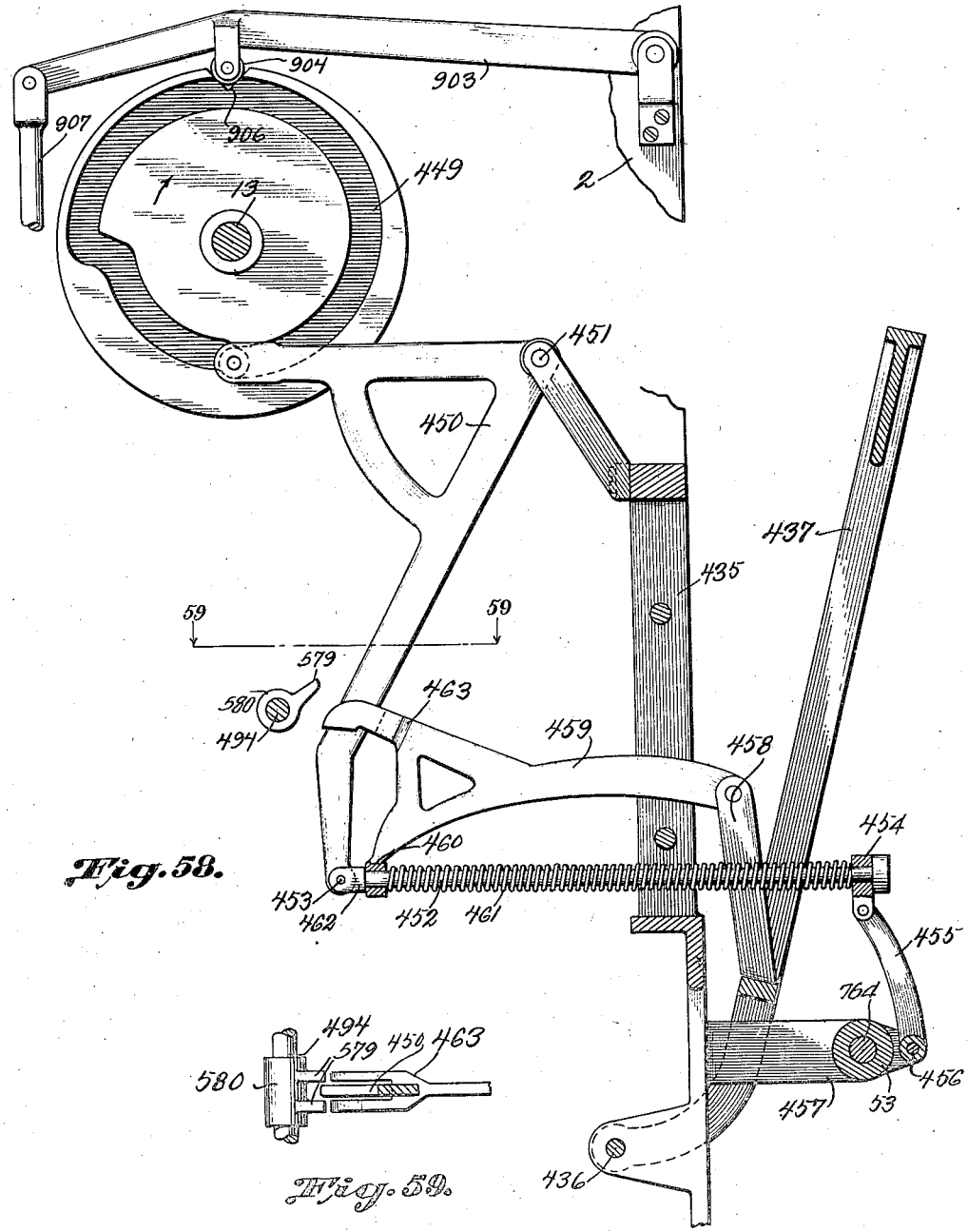

Sept. 29, 1925.
F. H. BRINKERHOFF
VENDING MACHINE FOR POSTAGE STAMPS, VALUE TOKENS, ARTICLES, ETC
Original Filed Dec. 8, 1916    60 Sheets-Sheet 28
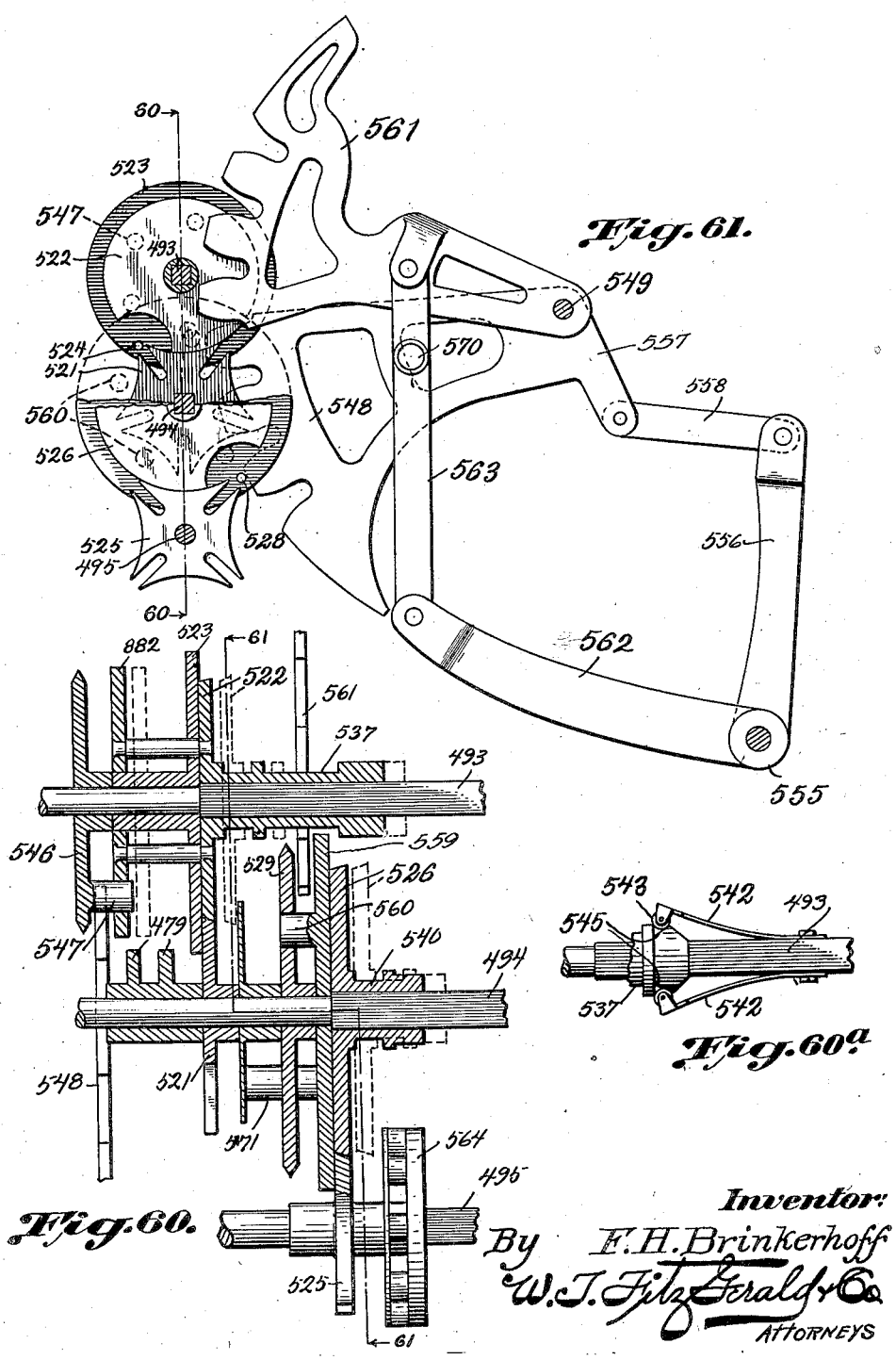

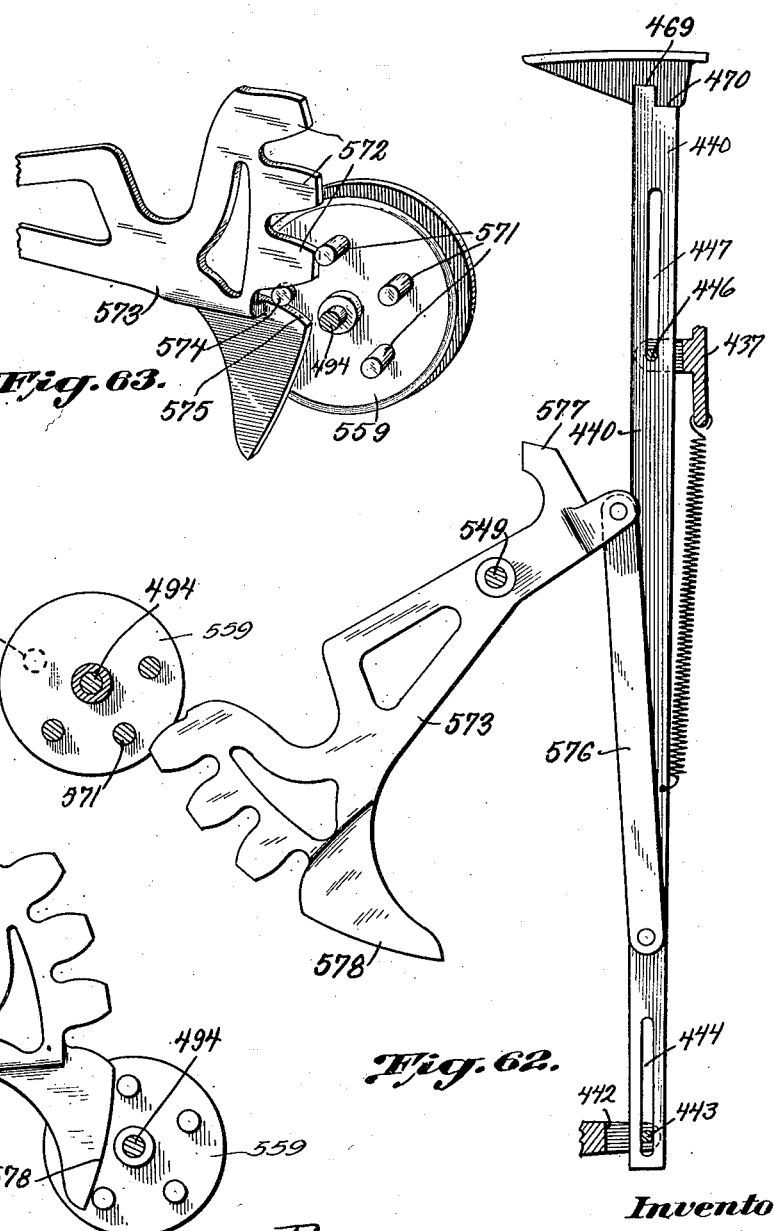

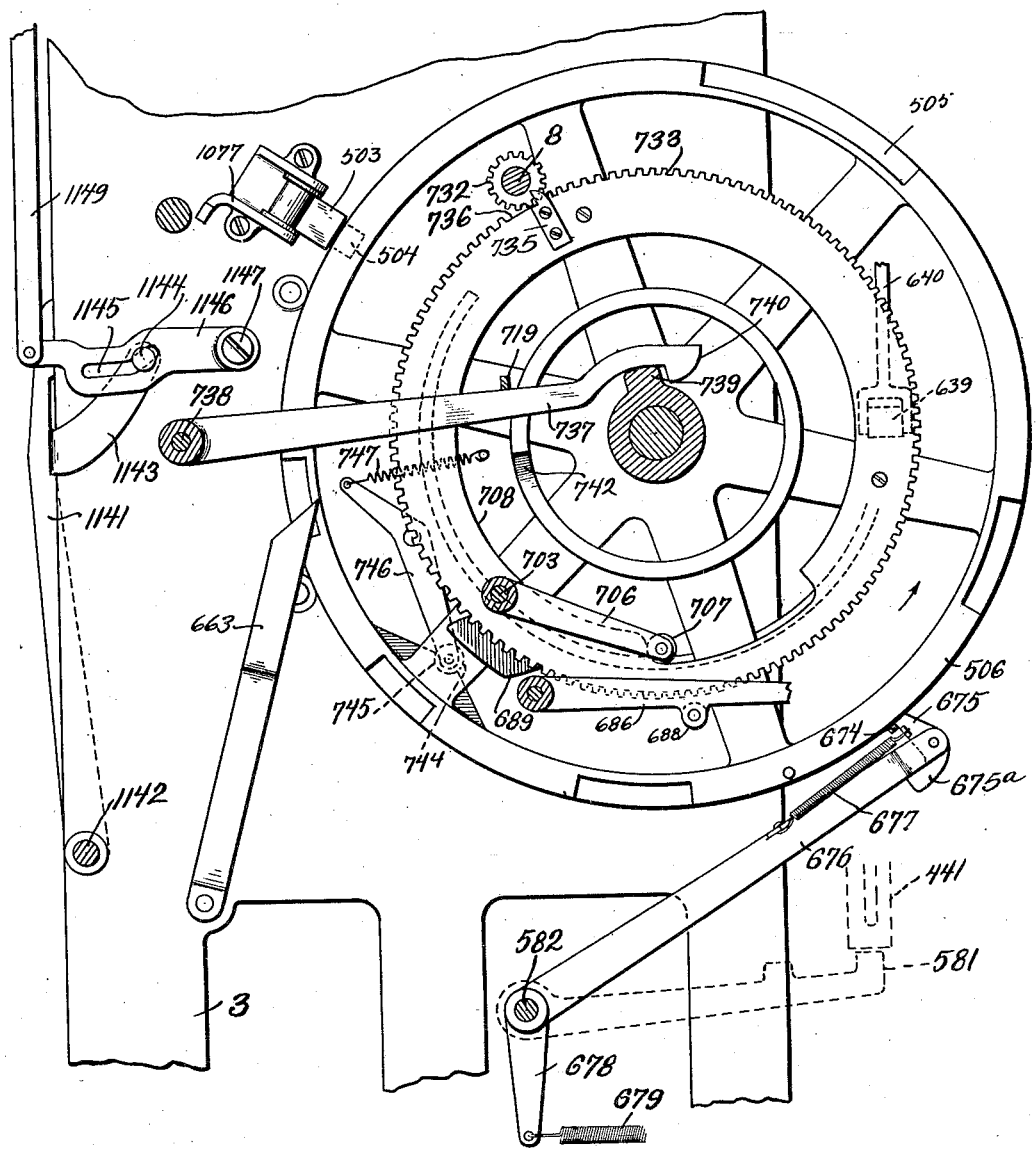

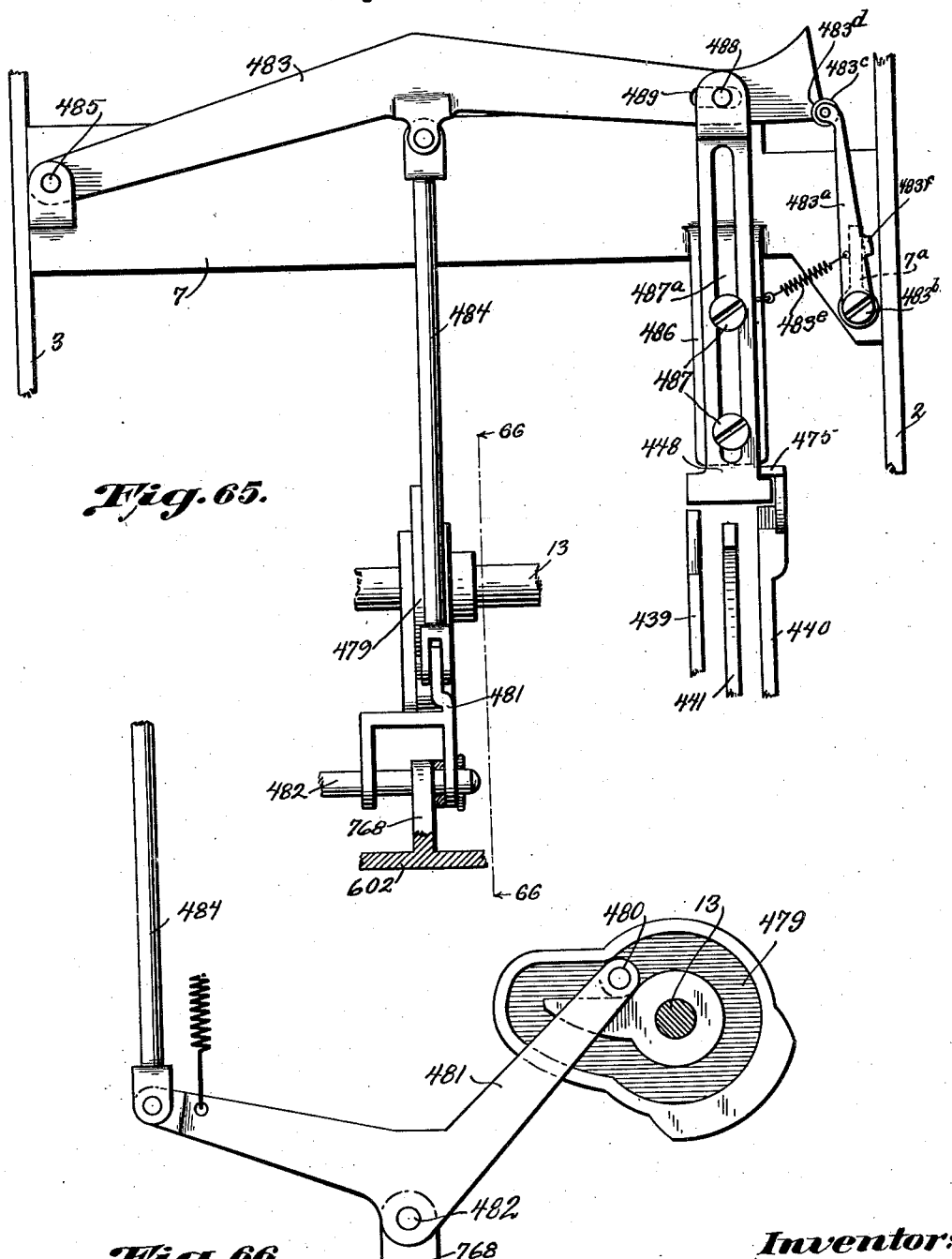

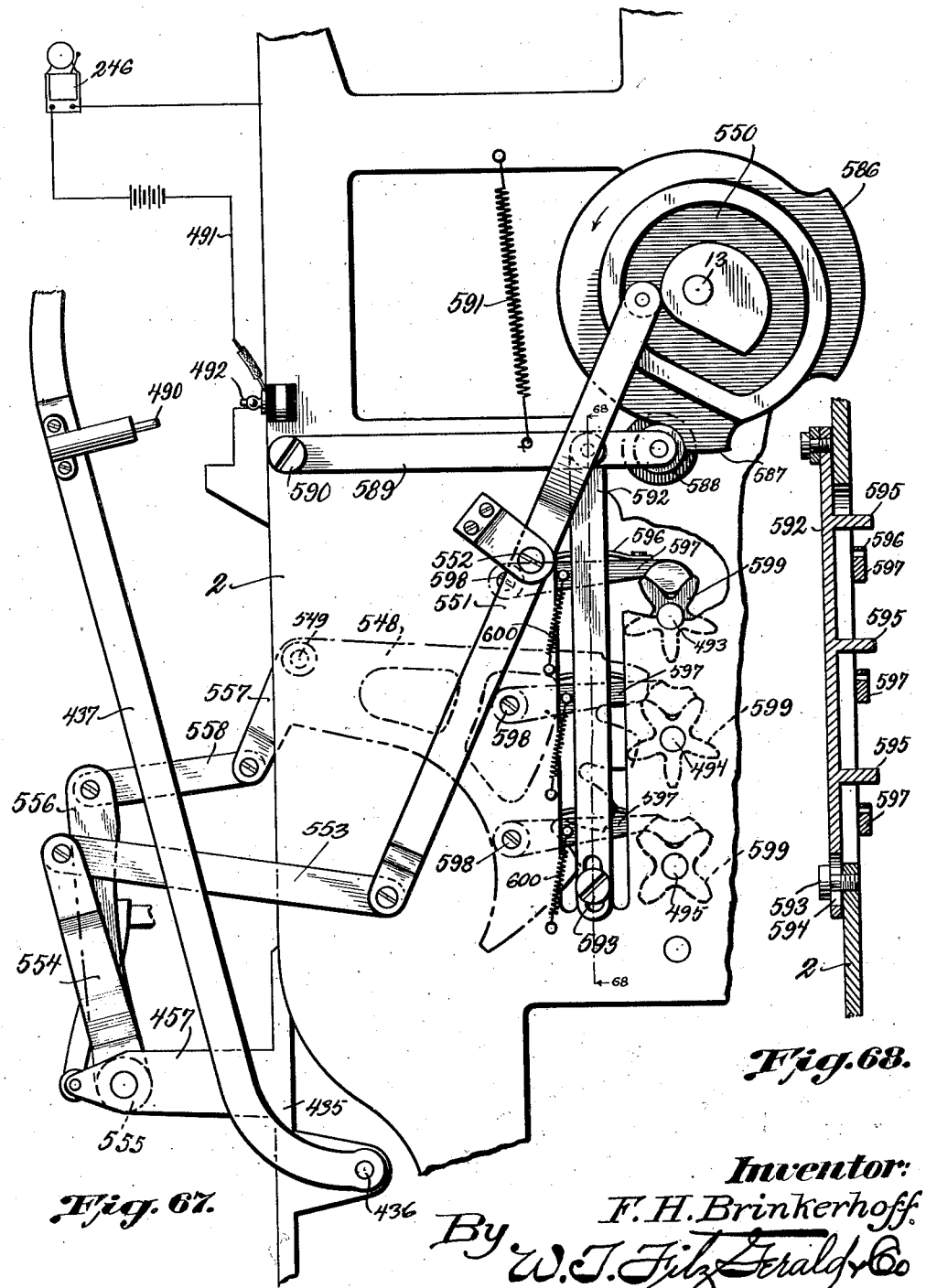

Sept. 29, 1925.

F. H. BRINKERHOFF 1,555,100

VENDING MACHINE FOR POSTAGE STAMPS, VALUE TOKENS, ARTICLES, ETC

Original Filed Dec. 8, 1916    60 Sheets-Sheet 34

Inventor:
F. H. Brinkerhoff
By
W. J. Fitzgerald & Co.
ATTORNEYS

Sept. 29, 1925.  
F. H. BRINKERHOFF  
1,555,100  
VENDING MACHINE FOR POSTAGE STAMPS, VALUE TOKENS, ARTICLES, ETC  
Original Filed Dec. 8, 1916 60 Sheets-Sheet 35

Inventor:
F. H. Brinkerhoff
By W. J. FitzGerald & Co.
Attorneys

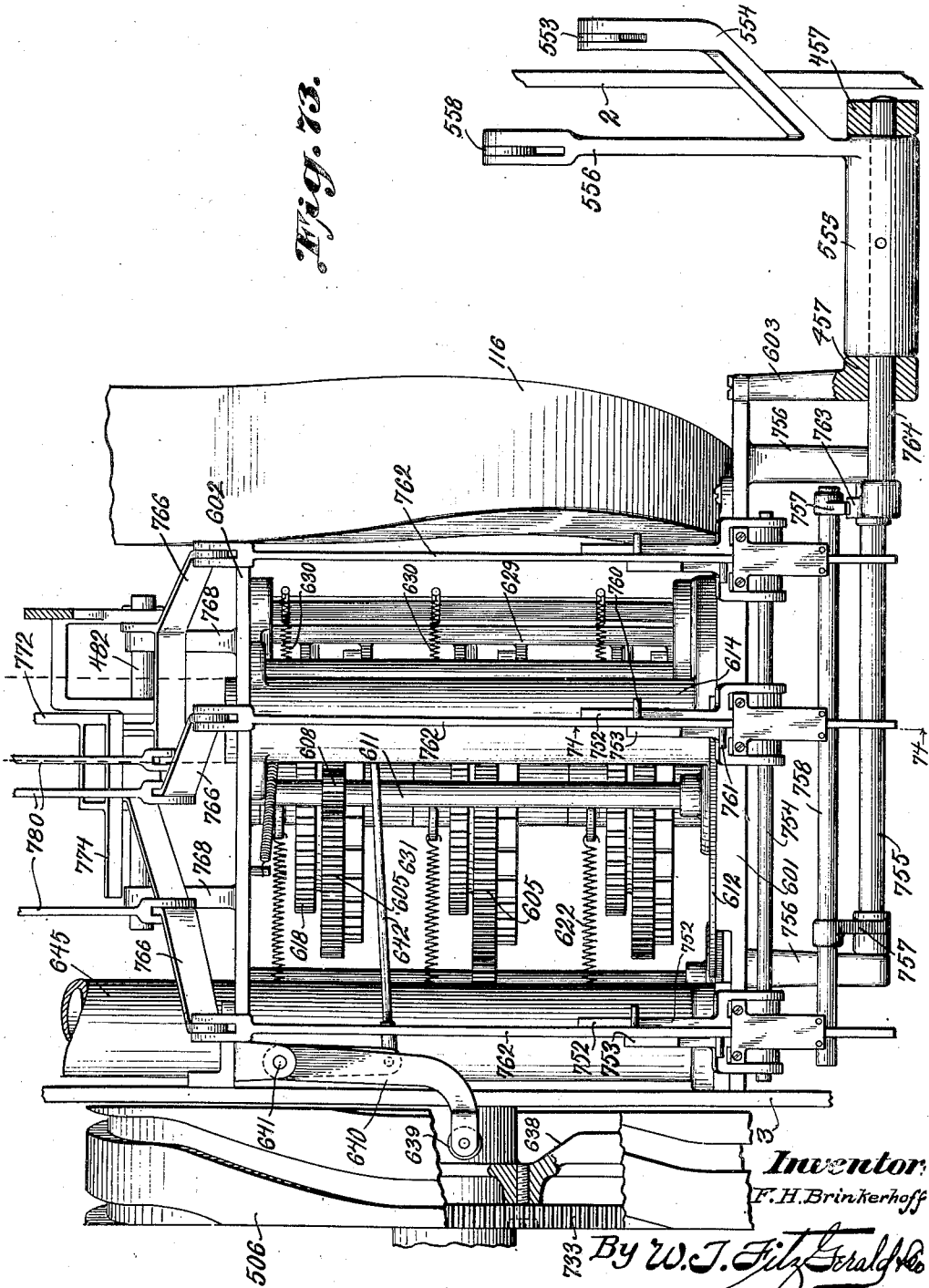

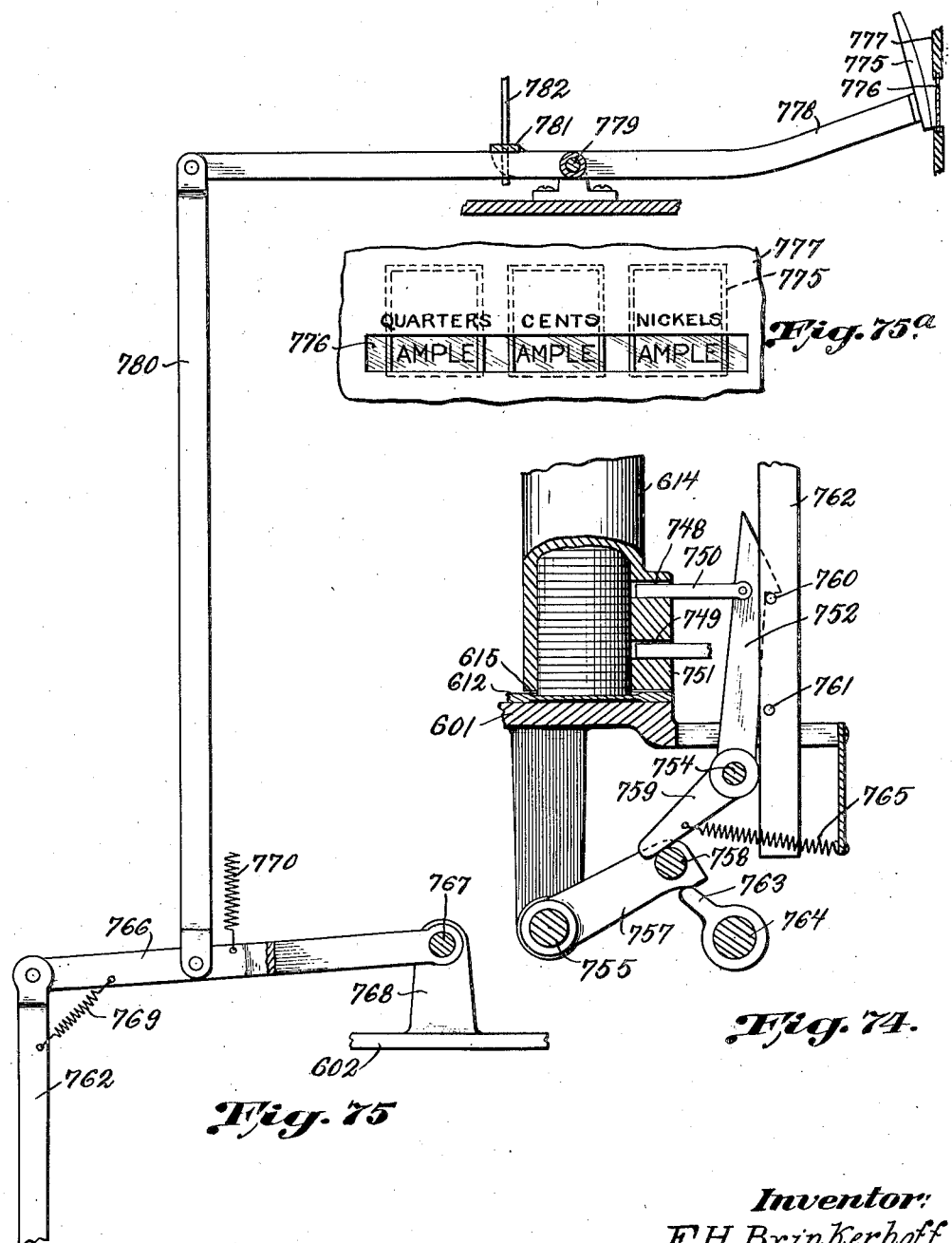

Sept. 29, 1925.  1,555,100
F. H. BRINKERHOFF
VENDING MACHINE FOR POSTAGE STAMPS, VALUE TOKENS, ARTICLES, ETC
Original Filed Dec. 8, 1916    60 Sheets-Sheet 39

Inventor:
F.H.Brinkerhoff
By
W. J. Fitz Gerald & Co.
ATTORNEYS

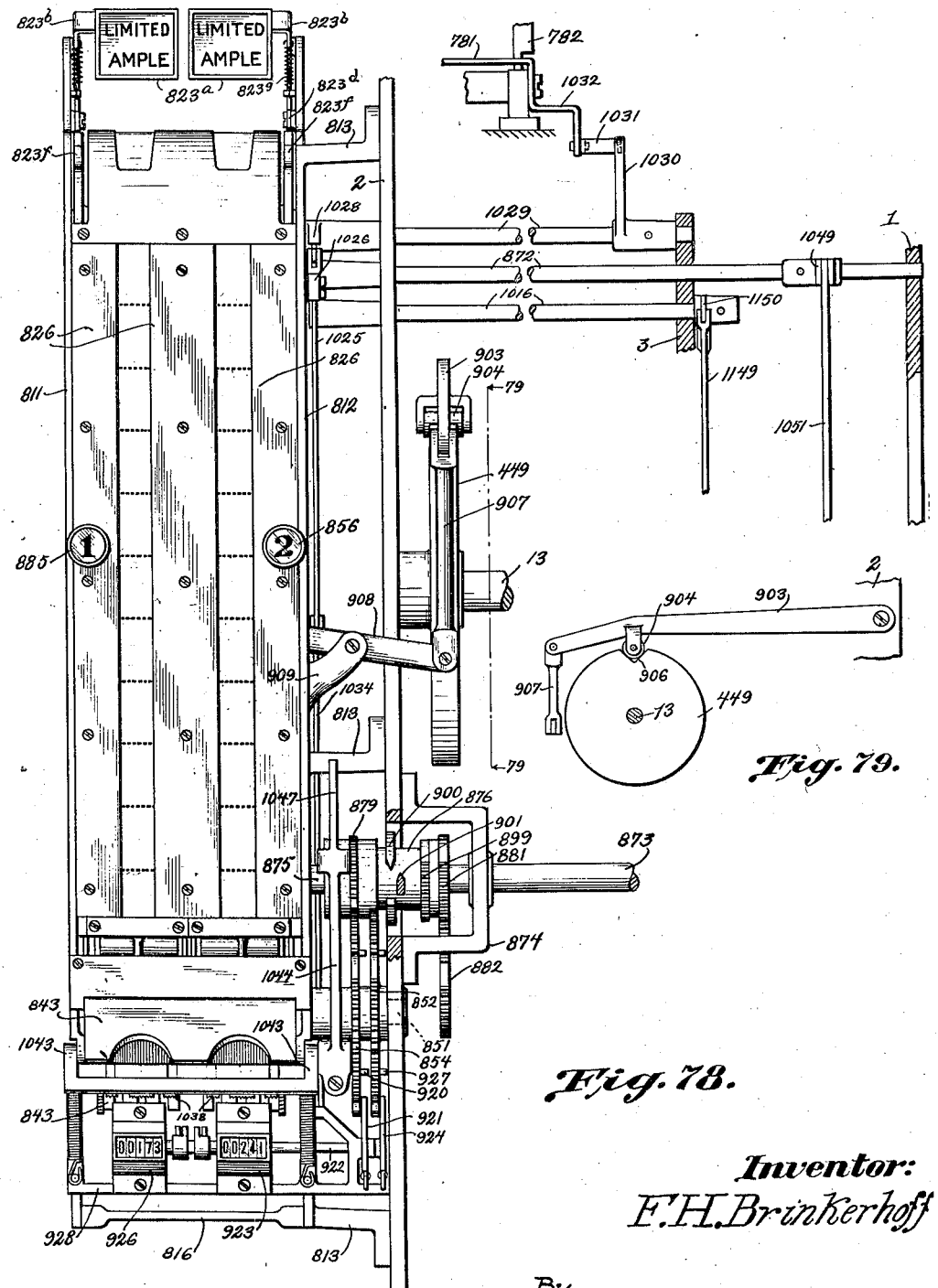

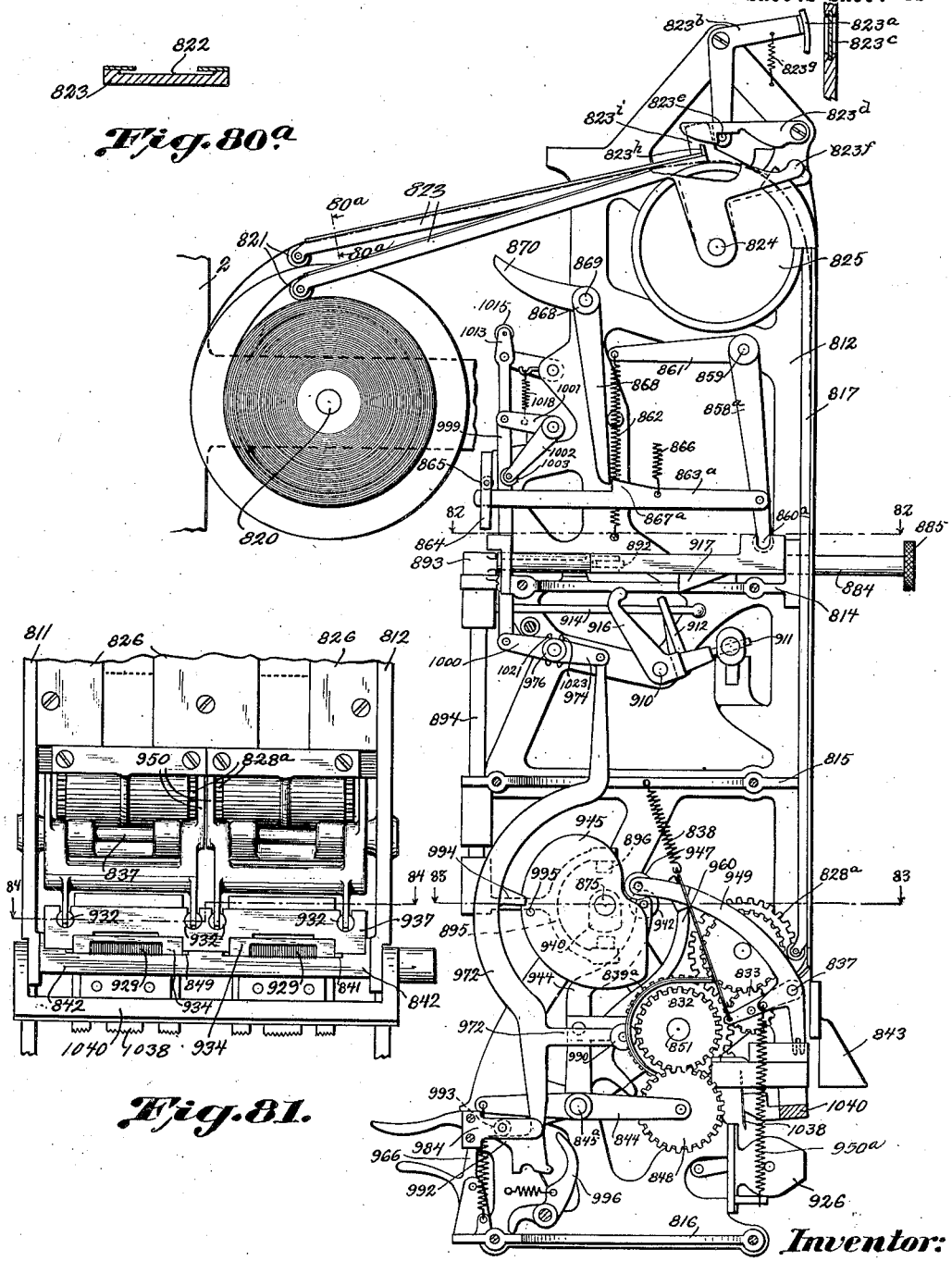

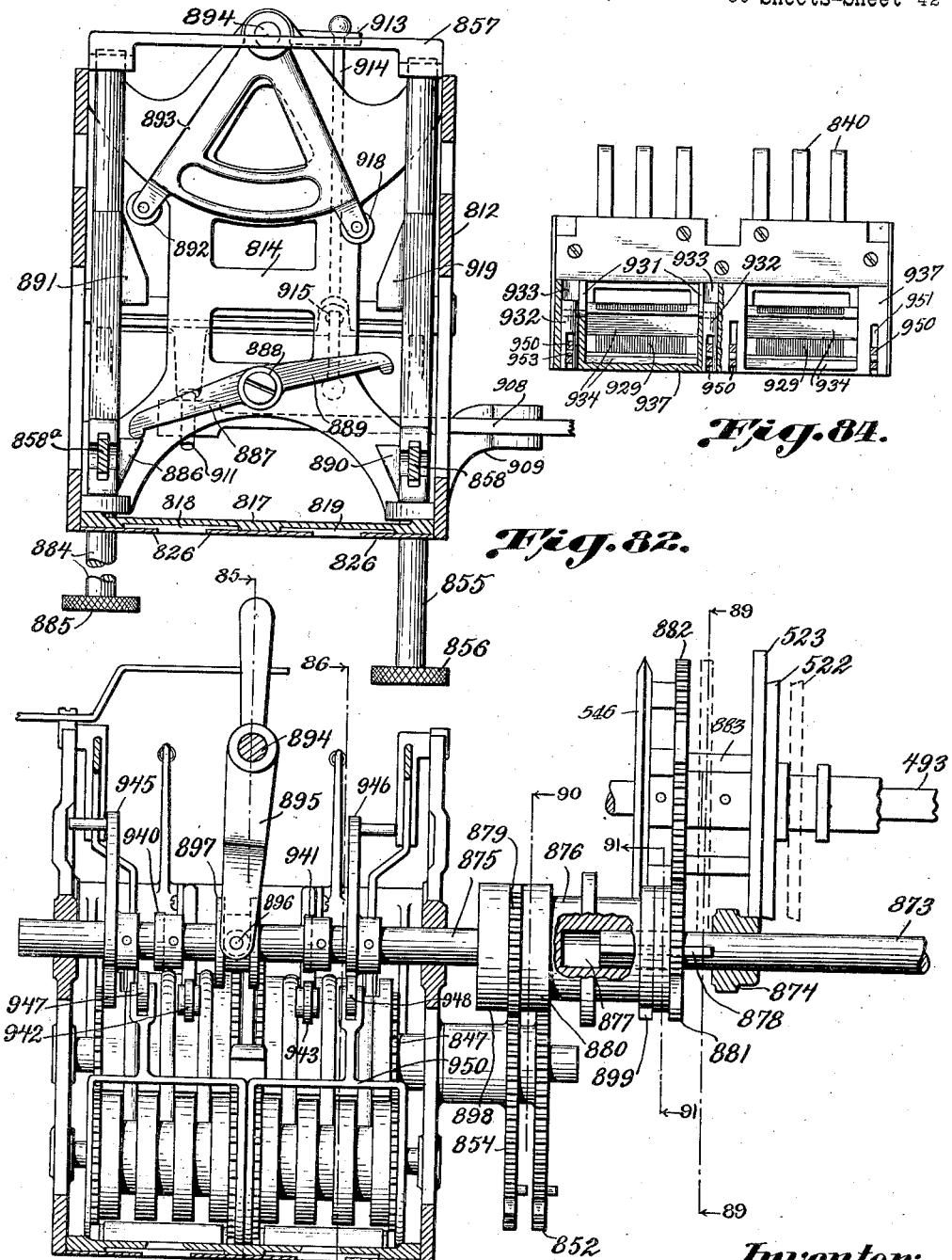

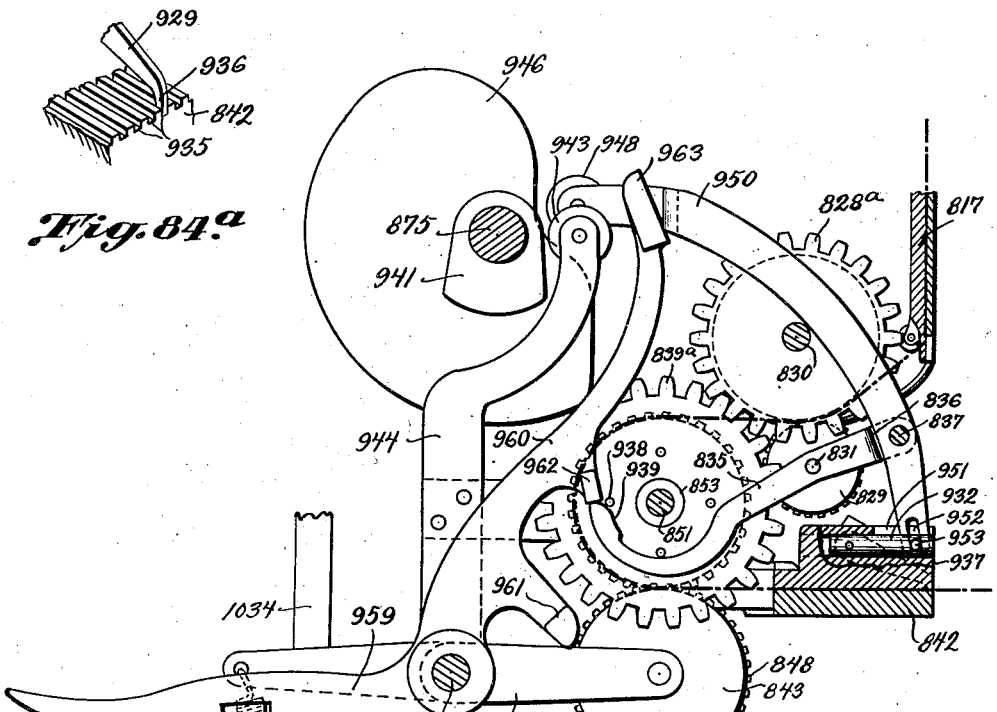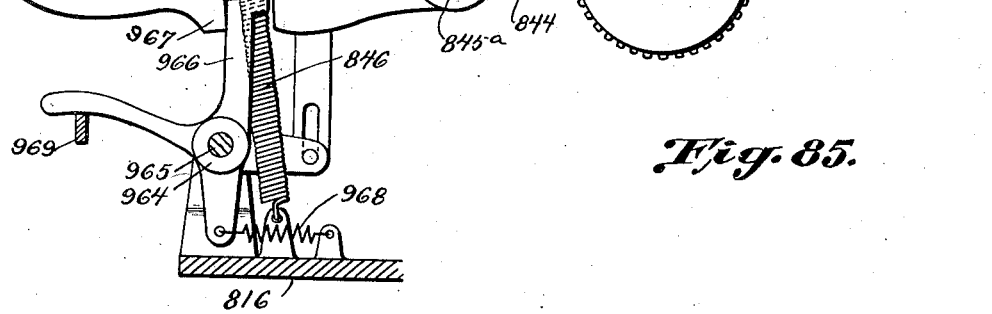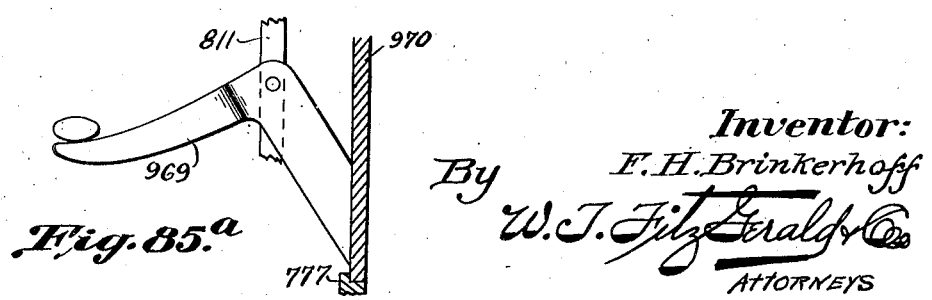

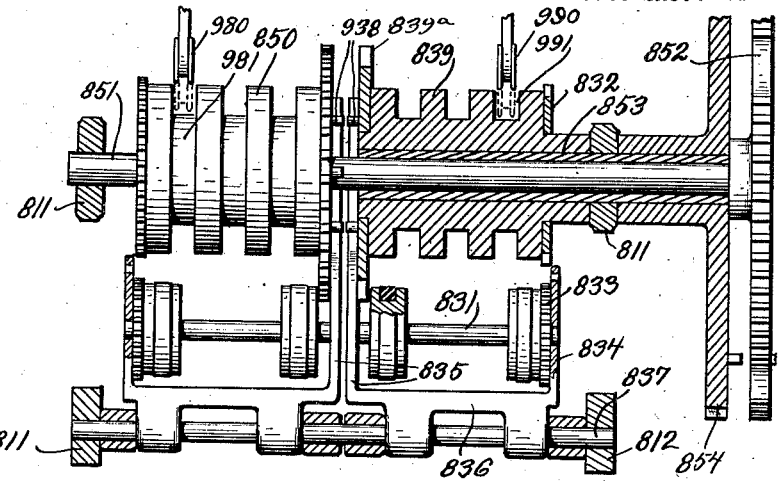
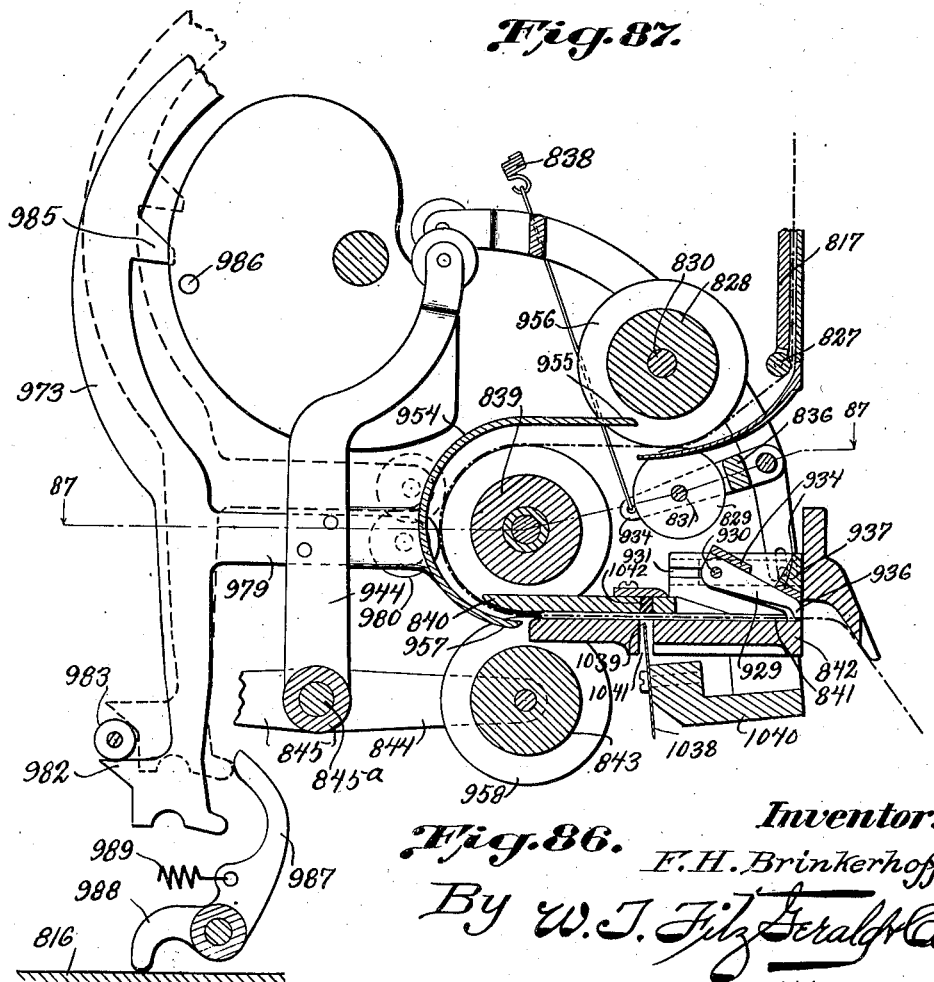

Sept. 29, 1925.  
F. H. BRINKERHOFF  
1,555,100  
VENDING MACHINE FOR POSTAGE STAMPS, VALUE TOKENS, ARTICLES, ETC  
Original Filed Dec. 8, 1916   60 Sheets-Sheet 46
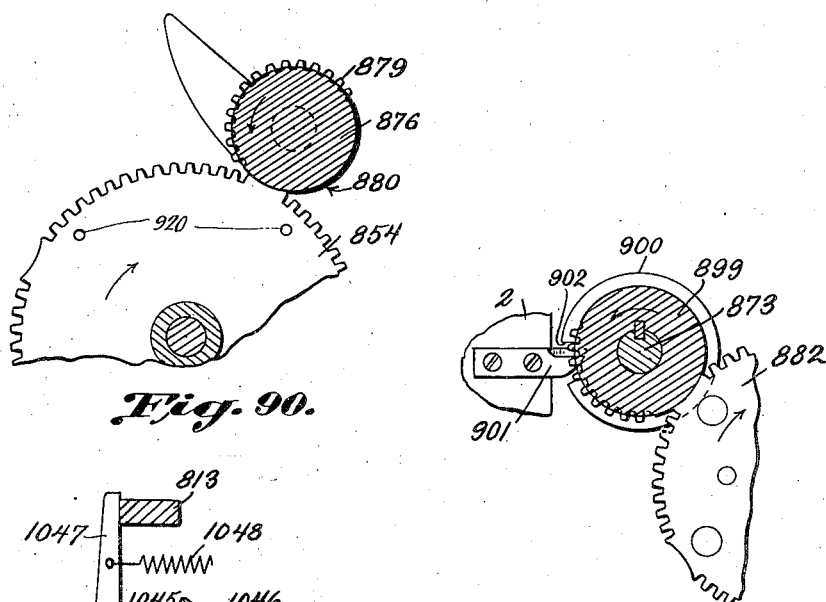
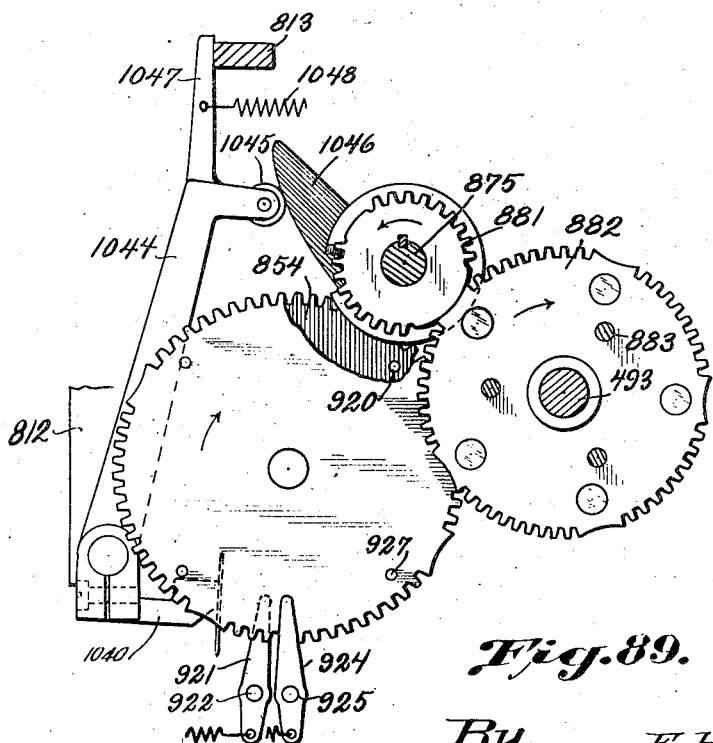
Inventor:  
F. H. Brinkerhoff  
By W. J. FitzGerald & Co  
ATTORNEYS Sept. 29, 1925.
F. H. BRINKERHOFF
1,555,100

VENDING MACHINE FOR POSTAGE STAMPS, VALUE TOKENS, ARTICLES, ETC

Original Filed Dec. 8, 1916    60 Sheets-Sheet 48

By

Inventor:
F. H. Brinkerhoff
W. J. FitzGerald & Co.
ATTORNEYS

Sept. 29, 1925.

F. H. BRINKERHOFF

VENDING MACHINE FOR POSTAGE STAMPS, VALUE TOKENS, ARTICLES, ETC

Original Filed Dec. 8, 1916     60 Sheets-Sheet 49

Inventor:
F. H. Brinkerhoff
By W. J. Fitz Gerald & Co.
Attorneys

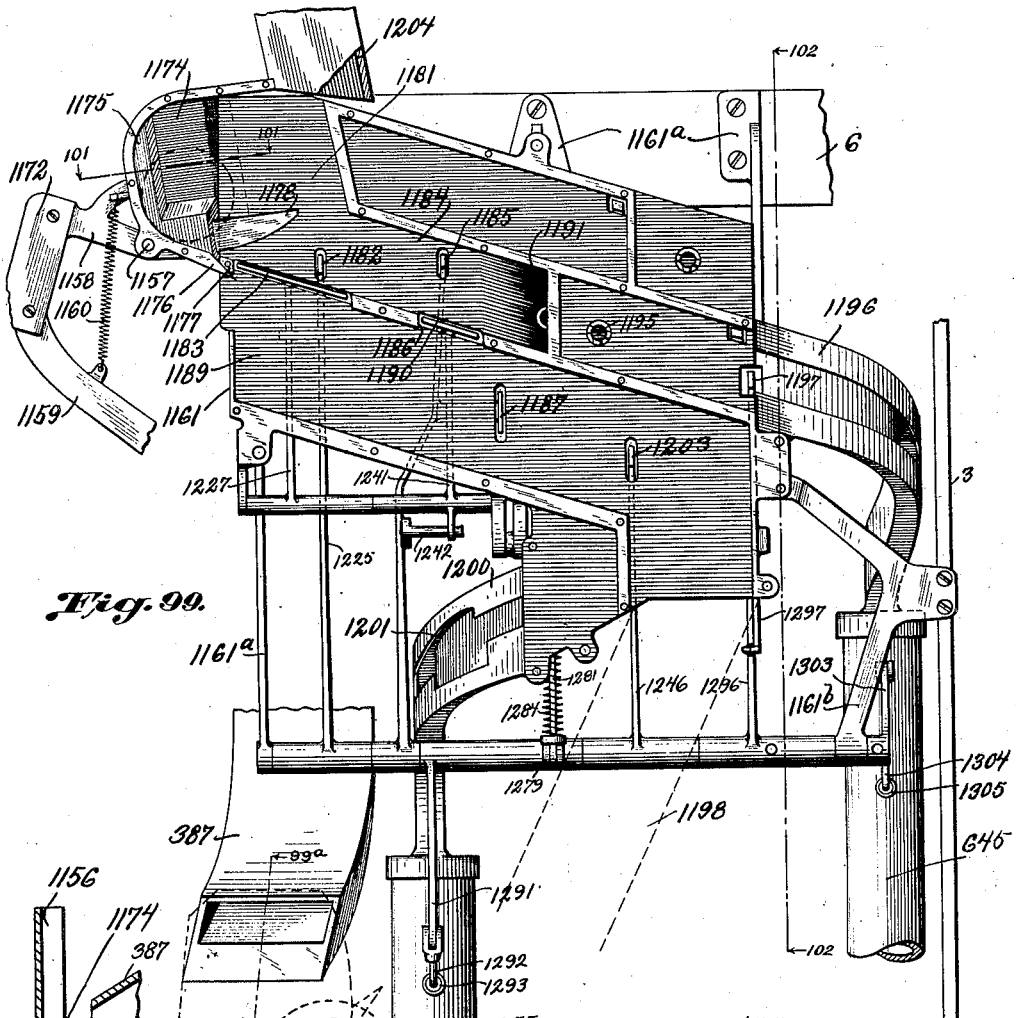
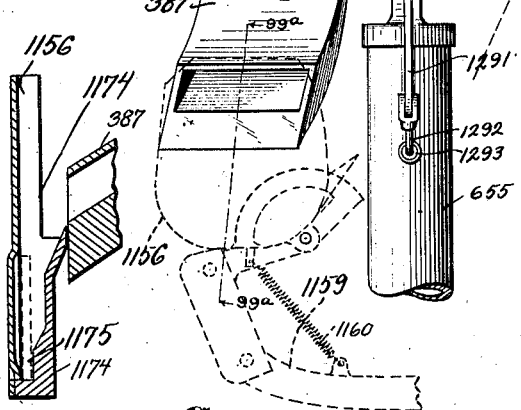
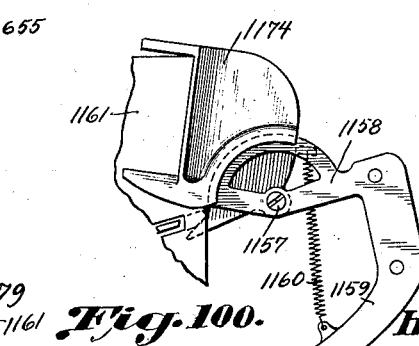
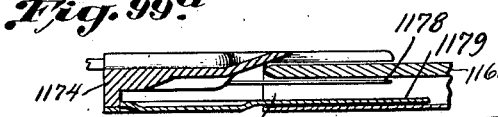

Sept. 29, 1925.  
F. H. BRINKERHOFF  
1,555,100  
VENDING MACHINE FOR POSTAGE STAMPS, VALUE TOKENS, ARTICLES, ETC  
Original Filed Dec. 8, 1916   60 Sheets-Sheet 54

Inventor:
F. H. Brinkerhoff
By W. J. FitzGerald & Co
ATTORNEYS

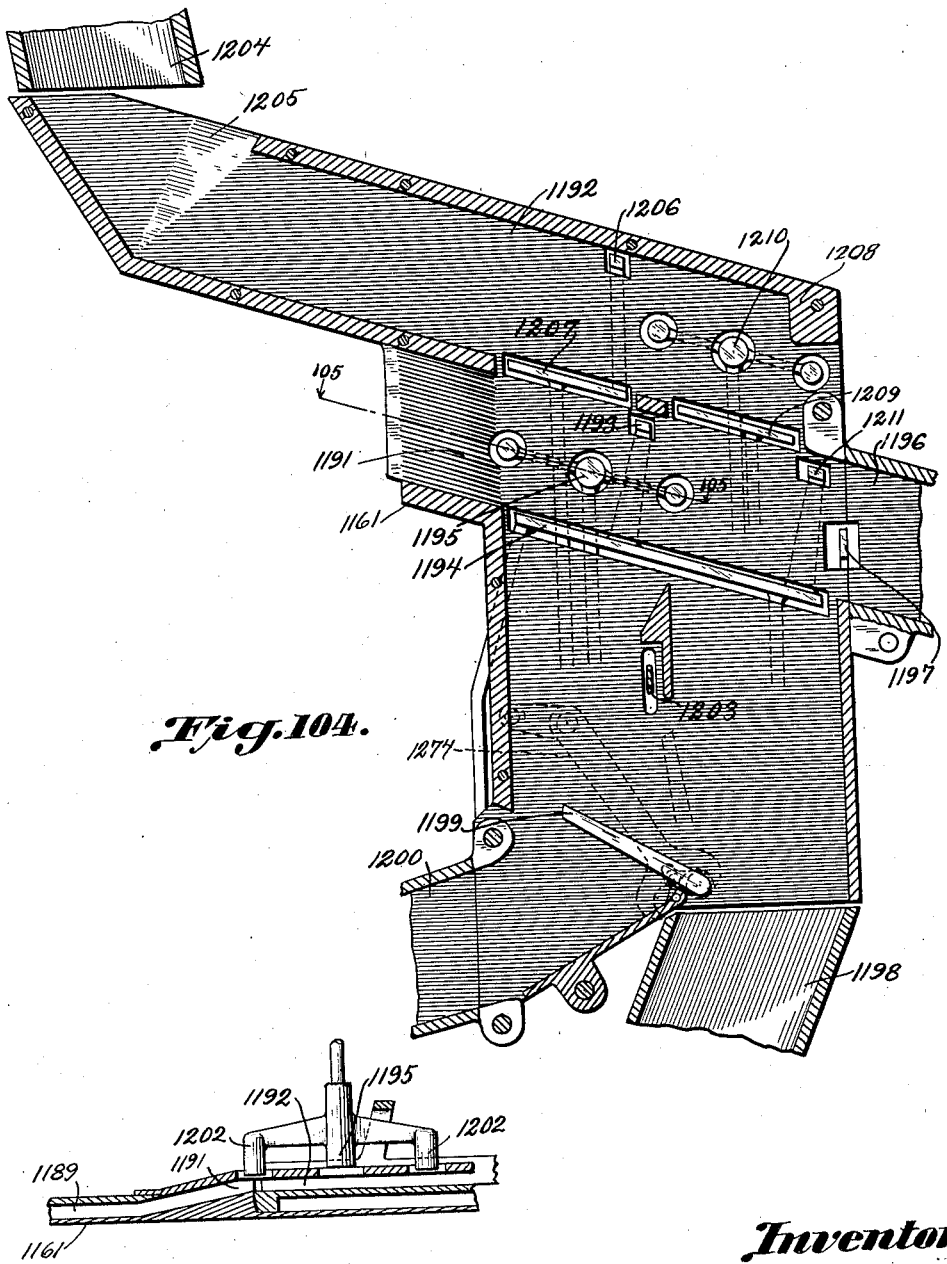
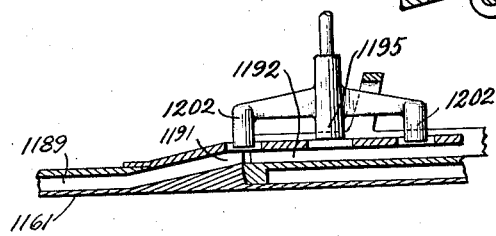

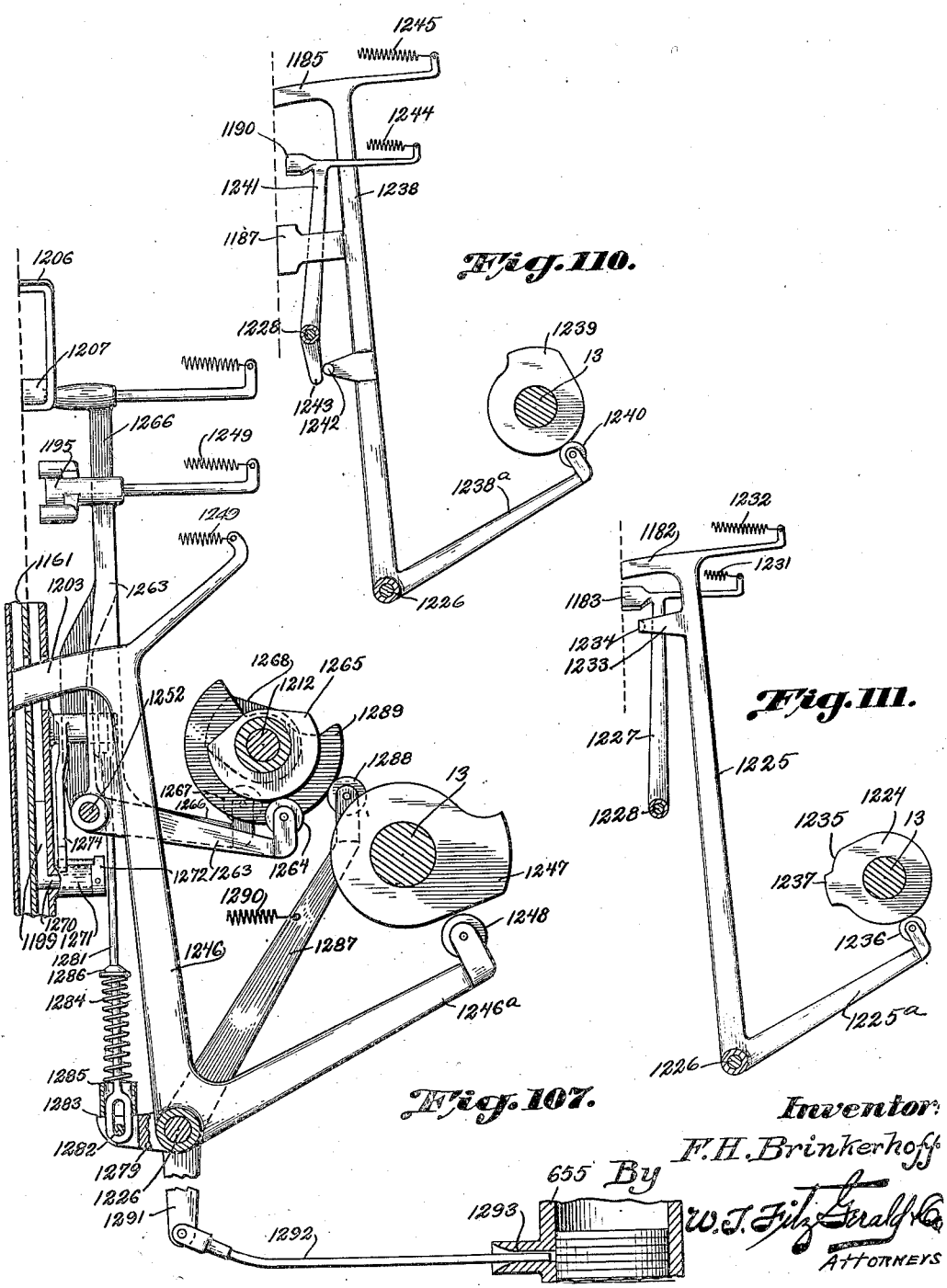

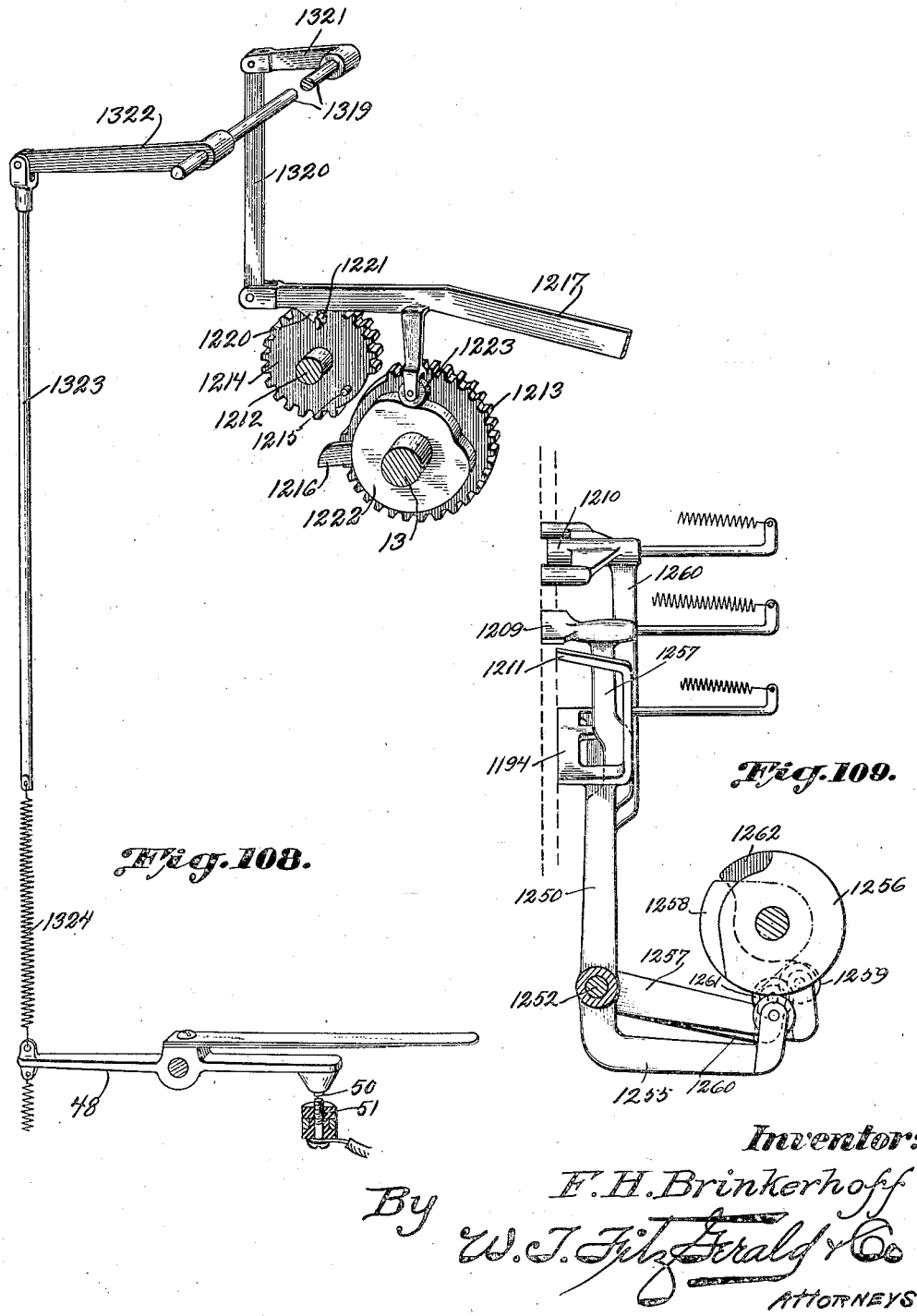

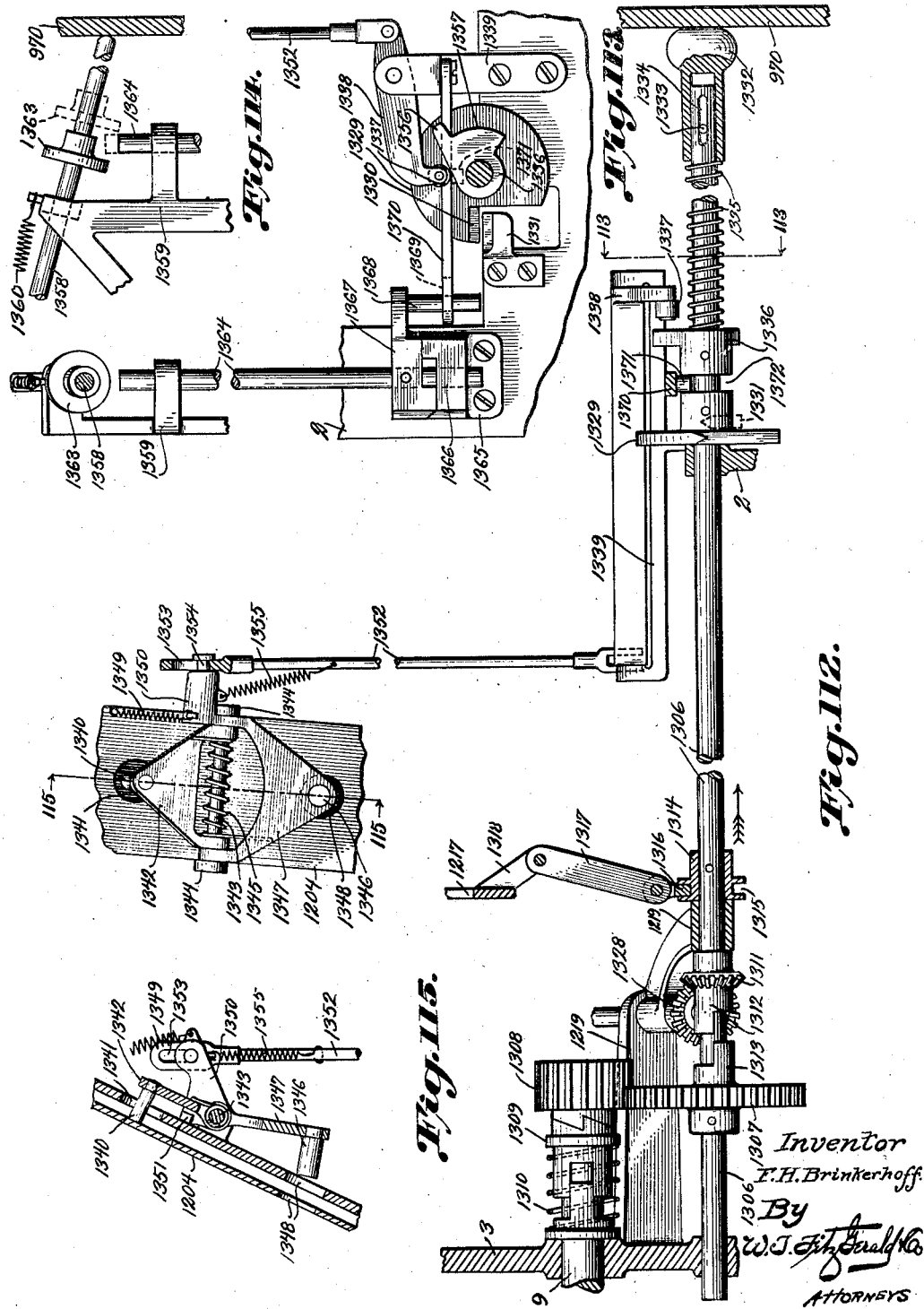

Sept. 29, 1925. 1,555,100
F. H. BRINKERHOFF
VENDING MACHINE FOR POSTAGE STAMPS, VALUE TOKENS, ARTICLES, ETC
Original Filed Dec. 8, 1916    60 Sheets-Sheet 60

Inventor.
F. H. Brinkerhoff
By
W. J. FitzGerald & Co
Attorneys

Patented Sept. 29, 1925.

1,555,100

UNITED STATES PATENT OFFICE.

FREDERIC H. BRINKERHOFF, OF CLINTON, IOWA.

VENDING MACHINE FOR POSTAGE STAMPS, VALUE TOKENS, ARTICLES, ETC.

Application filed December 8, 1916, Serial No. 135,878. Renewed February 26, 1925.

*To all whom it may concern:*

Be it known that I, FREDERIC H. BRINKERHOFF, a citizen of the United States, residing at Clinton, in the county of Clinton and State of Iowa, have invented certain new and useful Improvements in Vending Machines for Postage Stamps, Value Tokens, Articles, Etc.; and I do hereby declare the following to be a full, clear, and exact description of the invention, such as will enable others skilled in the art to which it appertains to make and use the same.

My invention relates to a coin-controlled vending machine, and in some of its features more particularly to postage stamp venders. Its general object is to provide a commodity-vending machine and change-maker, having adequate flexibility of operation for best accommodating its service to satisfy varying requirements of its users; and further to require of its customers only a minimum of mental effort, of manipulative action, of predetermination of their intentions, and of fore-knowledge of the uses of the machine.

Among the special objects attained by my invention are: making the commodity-vending mechanism to handle a plurality of articles, which may be differently-valued articles, and enabling the customer selectively to take as many articles of any one value, or of a plurality of values, as he may desire, within a certain limit of delivery value, or "credit" appropriate to the coin which he inserts in the machine; also providing for the delivery of commodity items to such aggregate value, less than the credit, as the user may selectively determine, and the issuance of change to make up the balance of the credit, or the issuance of change only, as the user may desire, so that the customer may take merely change or any combination of commodity-items and change in a single transaction; and making the machine, having either or both of the characteristics above mentioned, respond to the insertion (preferably through a single orifice) of any one of a plurality of coins of different values, so that the "credit" determinative of the extent of its aggregate change and commodity-value deliveries may be accordingly varied as to any single transaction.

In the within described machine, presenting a single embodiment of my invention in highly developed form, U. S. postage stamps are the commodity vended, and U. S. coins are the things received by the machine to initiate transactions and delivered by the change-making section of the machine; but it will be understood that, in its broader aspects, my invention is not limited in these regards. In said specific machine any U. S. coin from a nickel to a dollar, inclusive, may be inserted through a single orifice, and the "credit" or aggregate-return-capacity of the machine is automatically fixed accordingly. Up to that limit the customer may take change alone, stamps alone, or change and stamps, the stamps being preferably of different denominations, as one cent and two cent values, and the user being able to take either kind alone or part of each kind, and in any order and in any relative quantities that he may desire.

Further special objects of my invention are to make the machine self-operating to a maximum extent and to minimize and simplify the necessary manipulation of those parts which are provided for the user's control. In the specific construction hereinafter described the machine is wholly motor driven, and for conscious manipulation by the user to control the stamp-selection and change delivery there are provided merely two buttons to control the commodity delivery—one button for each denomination of stamps—and a button controlling the change delivery. Specifically, further, a door for the coin orifice is the only other part operated by the user, the door being advantageously employed, in conjunction with the insertion of a coin, to control the starting operations, this element of control (somewhat like the operation of a telephone switch-hook) being exercised unconsciously by the customer. Also the door may be locked closed, automatically, except when the machine is in proper condition to receive coins. Automatically the machine, motor driven, tests the inserted coin as to certain physical characteristics, rejects and expels such objects as fail to meet the tests, and then, according to tests of the value-distinguishing characteristics of the retained coin, the commodity delivery and change making mechanisms are conditioned to function within the limit of value, or "credit" appropriate to that denomination of coin. The commodity delivery is made, under motor power, preferably one item at a time, successive deliveries being made as long as the appropriate button is pressed by the user, subject, of course to the condition that the machine becomes incapacitated for further delivery when the credit-limit is reached. The change delivery is made under motor power and may be made at any time upon the user's manipulation of the change button, so that the complete flexibility of operation above referred to is attained. The change-maker setting is initially that determined by the value of the inserted coin but is reducible by the article-dispensing means, so that the values given in commodity and change will equal the credit established.

It may here be noted that since both stamps and change are issued at face value, and the coins received and dispensed are of higher value than those used in most automatic vending machines, it is especially desirable that the testing apparatus be very accurate in its rejection of inserted objects other than good coins. Also it will be apparent that if the machine is to operate for profit, the credit or limit up to which the machine will dispense stamps and change, on each transaction, must be set lower than the face value of the coin inserted. In the specific machine hereinafter described, the credit is arbitrarily set, on each transaction, at one-cent below the face value of the coin inserted. This, however, is a matter which can be varied in the construction of the machine if greater profit or no profit be desired by the owners, so it will be understood that in referring to the credit as being as substantially equal to the value of an inserted coin I do not limit myself to the precise relative amount stated.

Further specific objects of my invention are to provide for the display of coins taken in by the machine, and for obtaining separation of underweight coins from those of current standard weight, and for using the latter to replenish the change supply.

Still other and further objects will become apparent from the detailed description and claims.

In general, the mechanisms which I provide for attaining the stated objects may be regarded as comprising three interdependent, co-acting main sections, viz: an automatic, motor driven coin-testing section, for rejecting articles other than good coins and retaining only the latter in the machine; an automatic change-making section, and an article-vending section. The change section includes credit mechanism governed in its initial setting accordingly with the physical value-indicating characteristics of the inserted and tested coin, and subtractively affected by the commodity dispensing mechanism so that its initial setting may be reduced correspondingly with the value of each commodity item delivered and also it includes motor driven change delivering means, governed in the extent of its change delivery by the varied settings of the credit mechanism and controlled as to the time of its delivery-operation by the user's manipulative means or change button. The commodity delivering mechanism, preferably including separate portions handling differently-valued items, is actuated from the motor to deliver commodity items singly under the selective control afforded by the user's manipulative means, or stamp buttons, so that time, order, and quantity of the commodity-delivery is user-controlled, each article-delivery action subtractively affecting the credit mechanism aforesaid which in turn governs both the commodity and change mechanisms to limit by value their aggregate deliveries, disabling the delivery devices when the credit is reduced to zero or no-change setting.

It will be understood that I do not limit my invention to machines performing all of the functions and embodying all of the mechanisms which I have heretofore referred to and will describe herein since many eliminations of parts and their respective functions, as well as changes in matters of construction and arrangement of parts, may be made without departure from the spirit of my invention within the scope of the claims hereinafter appended. For illustration of a single embodiment of my invention reference is made to the accompanying drawings in which:

Figure 1 is a front elevation of my invention with a portion of the casing broken away.

Figure 2 is an elevation of the upper half of the righthand side of the machine.

Figure 3 is an elevation of the lower half of the same side of the machine.

Figure 4 is a detail back view of the coin inlet member, coin testers, coin chutes and motor starting mechanism.

Figure 4ᵃ is a continuation of some of the parts shown in Figure 4, also showing the contact members with the motor shown diagrammatically and turned horizontally 90° with relation to Figure 4.

Figure 5 is a vertical sectional detail view taken on line 5—5 of Figure 4.

Figure 6 is a sectional detail view taken on line 6—6 of Figure 4.

Figure 7 is a sectional detail view also taken on line 5—5 of Figure 4.

Figure 8 is a detail view of the coin inlet member and door, a portion being broken away to show the coin inlet and first coin gauge.

Figure 9 is a detail view partly in section of the coin inlet showing the inner door closed.

Figure 10 is a detail front elevation of a portion of the coin inlet member.

Figure 11 is a diagrammatic view showing the relative position of the driving mechanism, cam shafts, and stamp shaft.

Figure 12 is a sectional view of the cam shaft starting and driving mechanism taken on line 12—12 of Figure 11.

Figure 13 is a sectional detail view taken on line 13—13 of Figure 12.

Figure 14 is a sectional detail view taken on line 14—14 of Figure 12.

Figure 15 is a rear elevation of the first cam shaft and cams mounted thereon.

Figure 16 is a sectional detail view taken on line 16—16 of Figure 15.

Figure 17 is a detail view of the cam for operating the change pocket door.

Figure 18 is a sectional detail view taken on line 18—18 of Figure 15.

Figure 19 is a vertical sectional detail view of the coin inlet, first and second gauge, and means for operating the same.

Figure 19$^a$ is a detail view of the cam and connecting means for operating the mechanism shown in Figure 19.

Figure 20 is a detail view of a portion of the first and second gauges shown in their position when gauging a coin.

Figure 21 is a detail vertical sectional view taken on line 21—21 of Figure 19.

Figure 22 is a detail view partially in section on a line corresponding to line 22—22 of Figure 19$^a$.

Figure 23 is a detail vertical sectional view of the coin testing magnet, and means for operating the same.

Figure 24 is a detail view of the coin releasing and gauge tripping mechanism.

Figure 24$^a$ is a detail view of the cam, and means for operating the mechanism shown in Figure 24.

Figure 25:
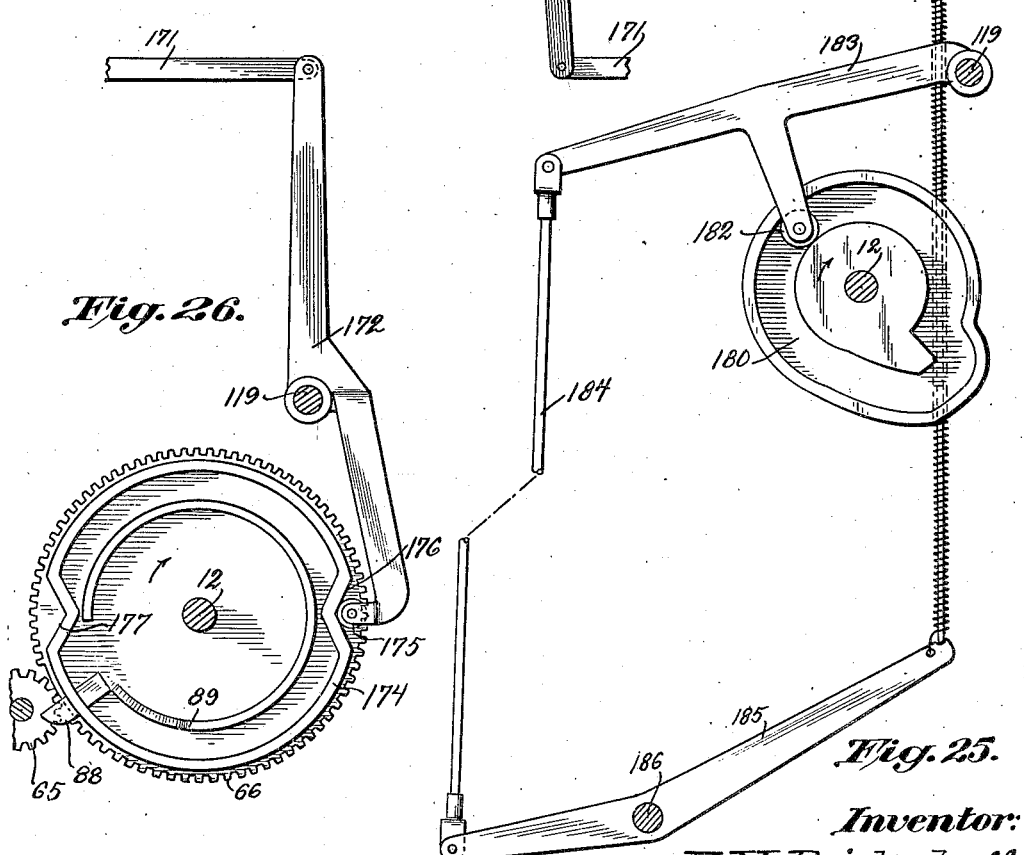

Figure 25 is a vertical sectional detail view taken on a line corresponding to line 25—25 of Figure 15, and Figure 4, showing the means for operating the lead tester.

Figure 26:
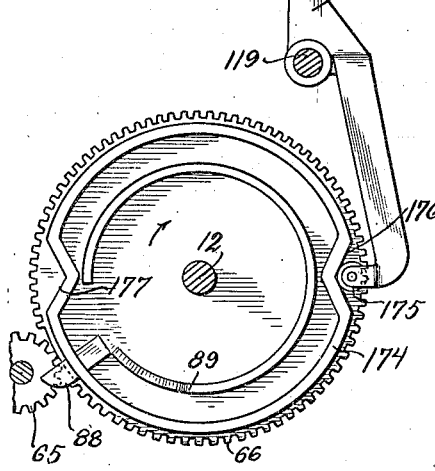

Figure 26 is a detail sectional view taken on line 26—26 of Figure 15, and showing the means for releasing the lead tester.

Figure 27:
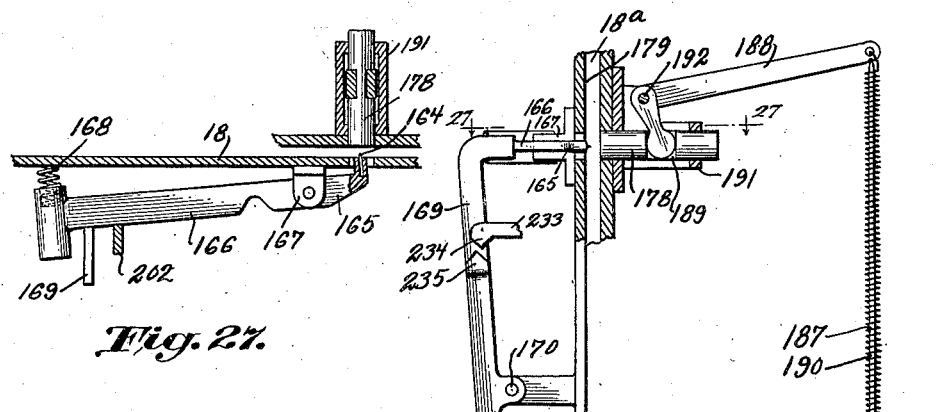

Figure 27 is a horizontal sectional detail view taken on line 27—27 of Figure 25.

Figure 28 is a front elevation of the lead and smooth-slug tester.

Figure 29 is a vertical sectional detail view taken on a line corresponding to line 29—29 of Figure 28.

Figure 30 is a sectional detail view taken on a line corresponding to line 30—30 of Figure 28.

Figure 31 is a detail front elevation of the second cam shaft control.

Figure 32 is a sectional detail view taken on a line corresponding to 32—32 of Figure 31, and also showing the second cam shaft starting cam.

Figure 33 is a front elevation of the coin trap or gate.

Figure 34 is a front elevation of the second cam shaft, with cams mounted thereon.

Figure 35 is a vertical sectional detail view taken on a line corresponding to line 35—35 of Figure 34, showing the second cam shaft gear and driving pinion.

Figure 36 is a vertical sectional detail view on a line corresponding to line 36—36 of Figure 34, showing the second cam shaft driving means and coin elevator cam.

Figure 37 is a vertical sectional detail view taken on a line corresponding to line 37—37 of Figure 34, showing the thickness-gauge and scale weight adjusting means.

Figure 38 is a detail perspective view of a portion of the thickness-gauge operating means shown in Figure 37.

Figure 39 is a horizontal sectional view taken on a line corresponding to line 39—39 of Figure 37.

Figure 40 is a vertical sectional view taken on a line corresponding to line 40—40 of Figure 34, showing the cam for operating the thickness-gauge shown in Figure 37.

Figure 41 is a vertical sectional view of the cam, and means for operating the coin stop and swinging chute.

Figure 42 is a detail perspective view of the coin stop, for holding the coin during the operation of the thickness-gauge.

Figure 43 is a detail view partially in vertical section of the swinging chute, and supporting means for carrying the coin to the scales.

Figure 44 is a vertical sectional view taken on a line corresponding to line 44—44 of Figure 43.

Figure 45 is a detail top plan view of a portion of machine partially in horizontal section showing the swinging chute, scales and operating means therefor.

Figure 46 is a vertical sectional elevation of the scale weight operating mechanism.

Figure 47 is a vertical sectional detail view of the swinging chute stopping mechanism.

Figure 48 is a detail sectional view taken on a line corresponding to line 48—48 of Figure 45, showing the scale unlocked.

Figure 49 is a side elevation of one of the scales, showing the adjustable weight.

Figure 50 is a detail view partially in section of the scale weight adjusting means for a Buffalo nickel.

Figure 51 is a sectional detail view taken on a line corresponding to line 51—51 of Figure 45 showing the scale unlocking and tilting mechanism.

Figure 52 is a vertical sectional detail view taken on a line corresponding to line 52—52 of Figure 51.

Figure 53 is a detail sectional view taken on a line corresponding to line 53—53 of Figure 51.

Figure 54 is a front elevation of the credit mechanism and the change carriage.

Figure 55 is a front elevation of the cam and connecting means for operating the change carriage.

Figure 56 is a view partially in section of the credit set-up and re-set mechanism, and is taken on a line corresponding to line 56—56 of Figure 54.

Figure 57 is a rear elevation of the parts shown in Figure 56.

Figure 58 is a detail sectional view of the coin finder and means for operating the same.

Figure 59 is a detail sectional view taken on a line corresponding to line 59—59 of Figure 58.

Figure 60 is a vertical sectional detail view taken on a line corresponding to line 60—60 of Figure 61, showing a portion of the credit mechanism.

Figure 60$^a$ is a horizontal detail section taken on a line 60$^a$—60$^a$ of Figure 54.

Figure 61 is a detail view partially in section taken on a line corresponding to line 61—61 of Figure 60, showing the credit segments and general movements.

Figure 62 is a detail sectional view of the five and ten cent credit key and credit set-up taken on a line corresponding to line 62—62 of Figure 54.

Figure 63 is a detail perspective view of the pinion and segment shown in Figure 62.

Figure 63$^a$ is a detail view of the parts shown in Figure 63 but in a different position.

Figure 64 is a detail sectional view taken on a line corresponding to line 64—64 of Figure 55, and showing a side elevation of the change carriage operating cam.

Figure 65 is a rear elevation of the money bar and means for operating same.

Figure 66 is a detail sectional view taken on a line corresponding to line 66—66 of Figure 65.

Figure 67 is a left side elevation of a portion of the machine, a portion being broken away to show the change rod locks.

Figure 68 is a sectional detail taken on a line corresponding to line 68—68 of Figure 67.

Figure 69:
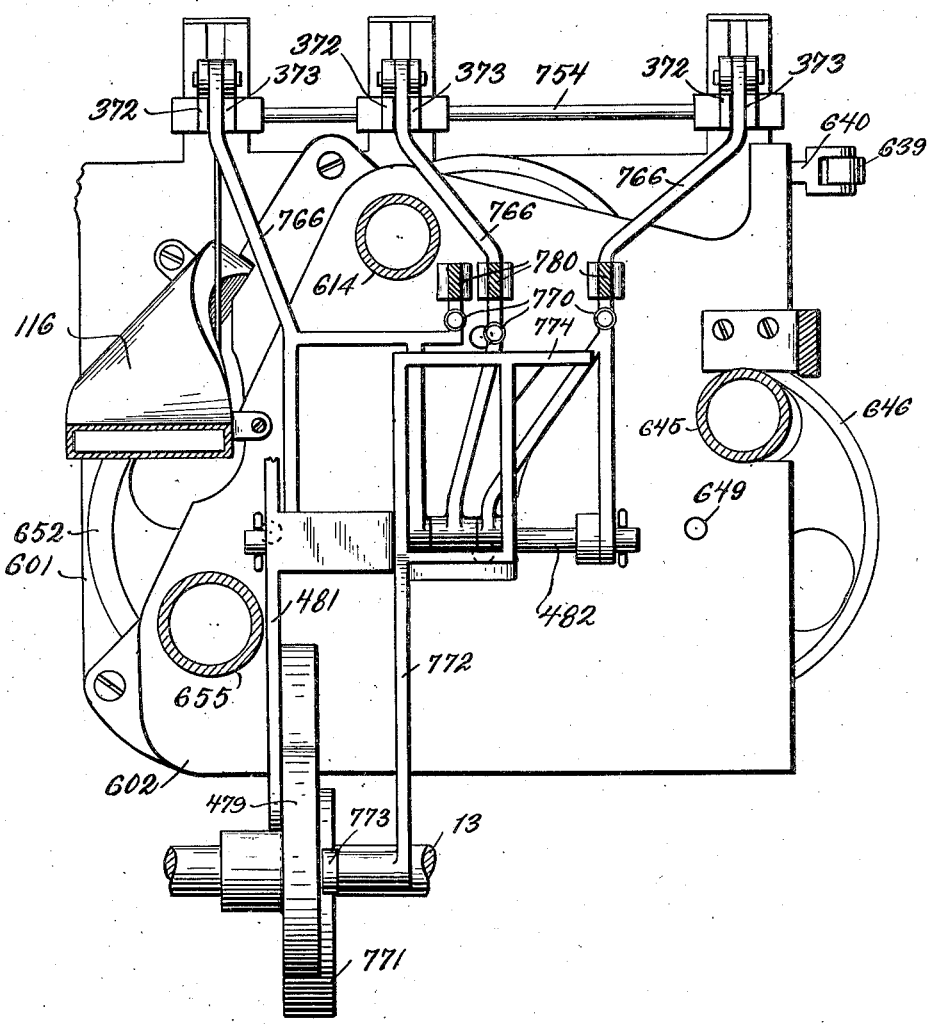

Figure 69 is a top plan view of the change section, the coin tubes and money chute being shown in section.

Figure 70:
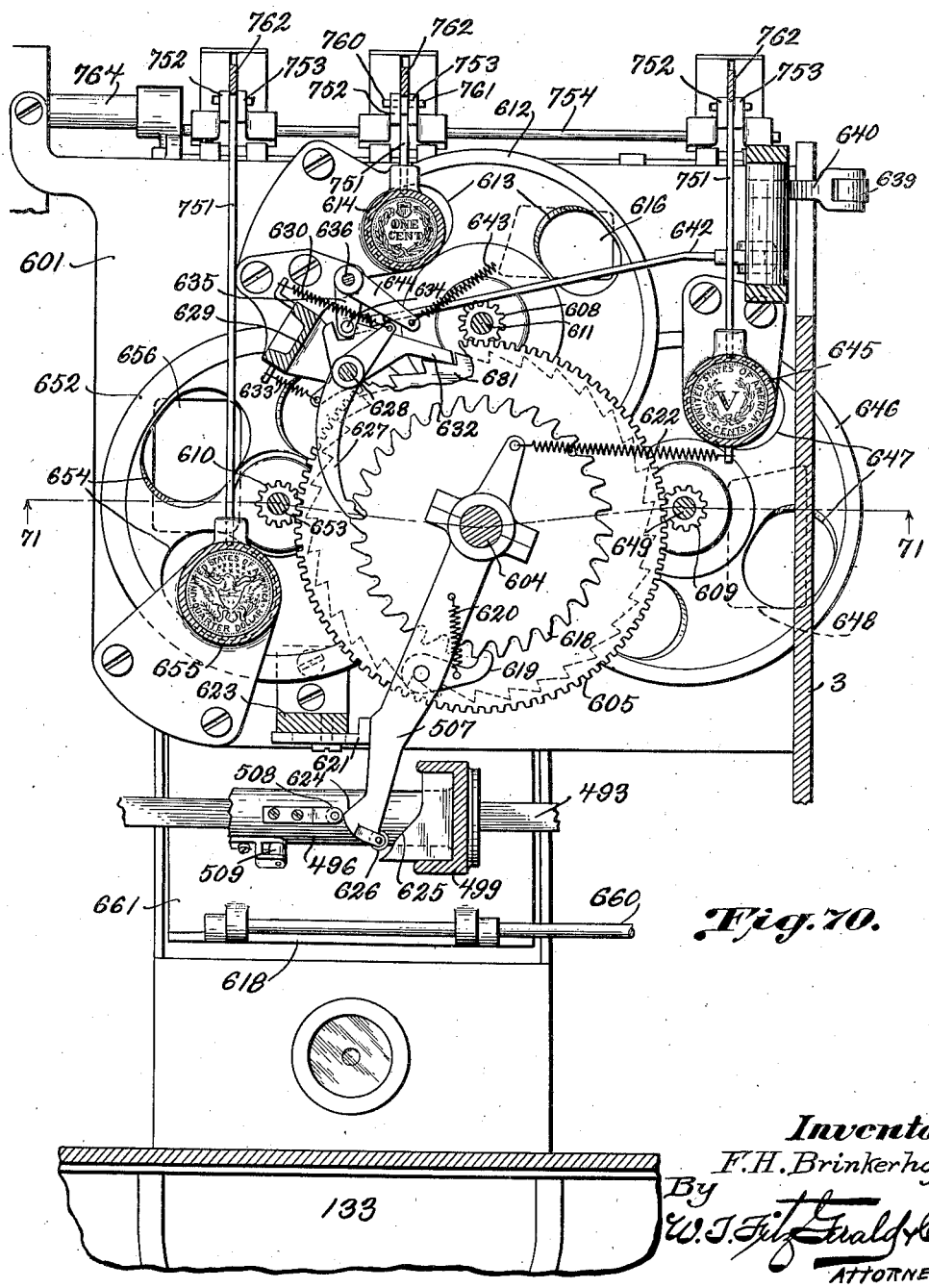
Figure 71:
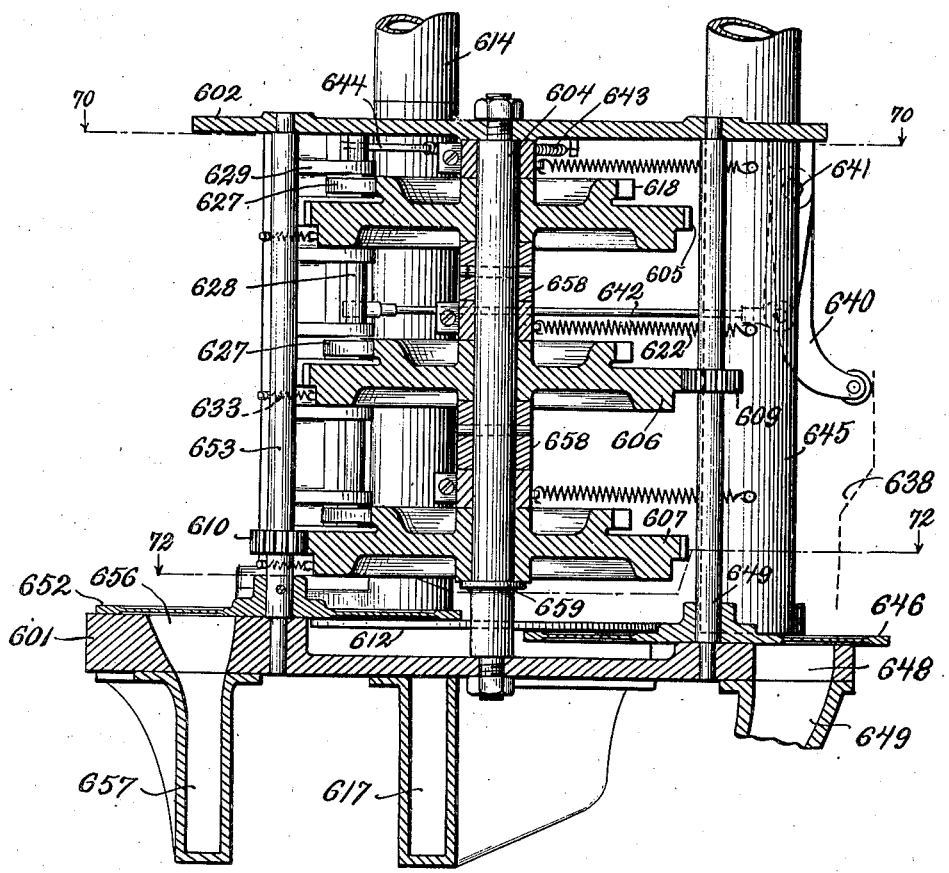

Figure 70 is a detailed horizontal sectional view of the change section taken on line corresponding to line 70—70 of Figure 71.

Figure 71 is a vertical section through the change section taken on a line corresponding to line 71—71 of Figure 70.

Figure 72:
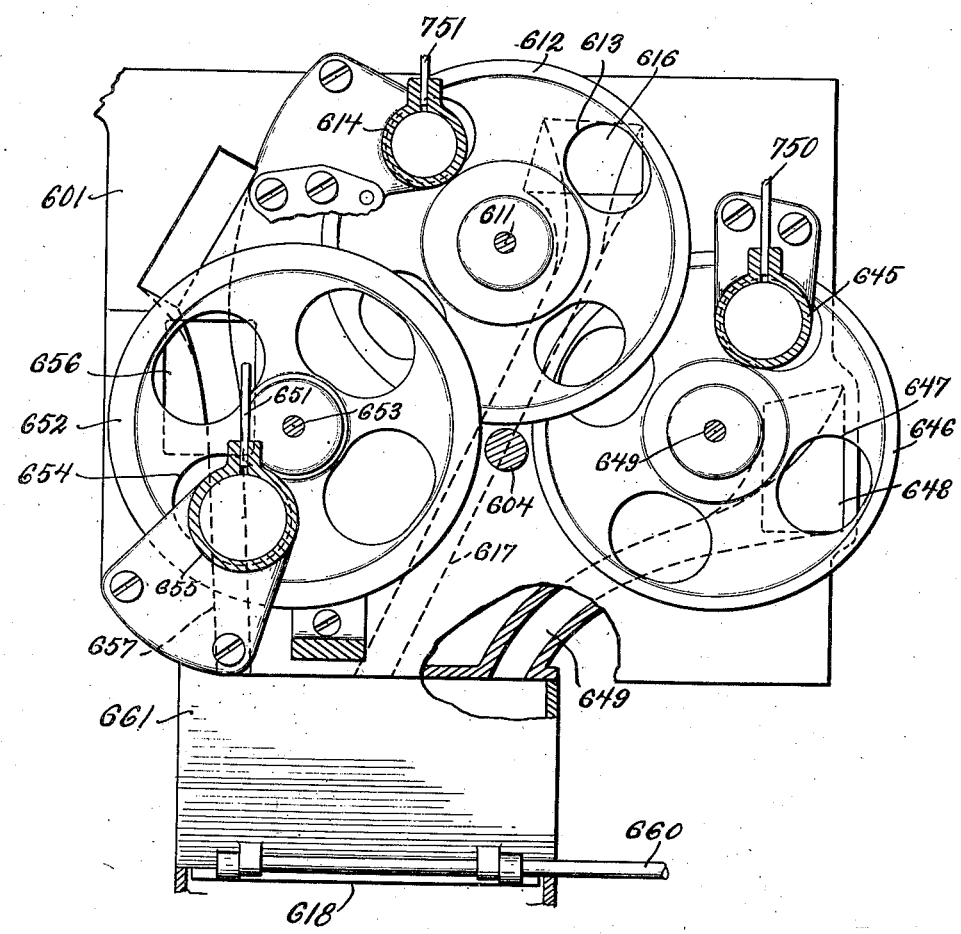

Figure 72 is a horizontal section taken on a line corresponding to line 72—72 of Figure 71.

Figure 73 is a rear elevation partially in section of the change section.

Figure 74 is a vertical section through one of the coin tubes, and taken on a line corresponding to line 74—74 of Figure 73 showing a portion of the sign controlling device.

Figure 75 is a detail view of a portion of the coin sign controlling device.

Figure 75$^a$ is a front elevation of the sign.

Figure 76:
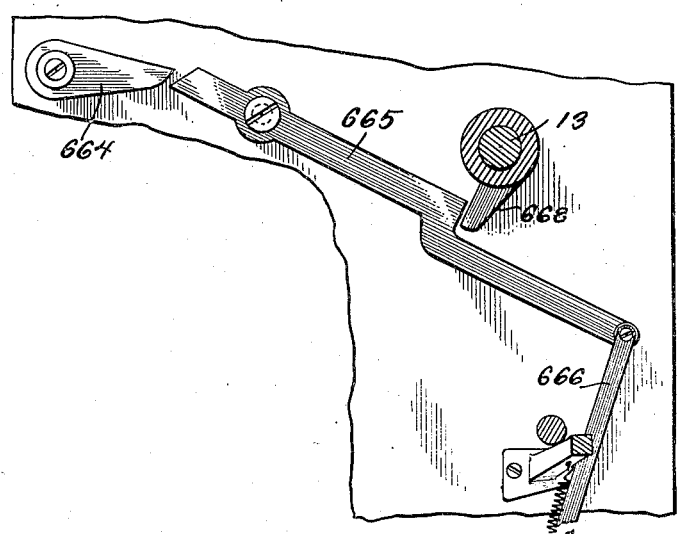

Figure 76 is a detail view of the change pocket door controlling means.

Figure 77:
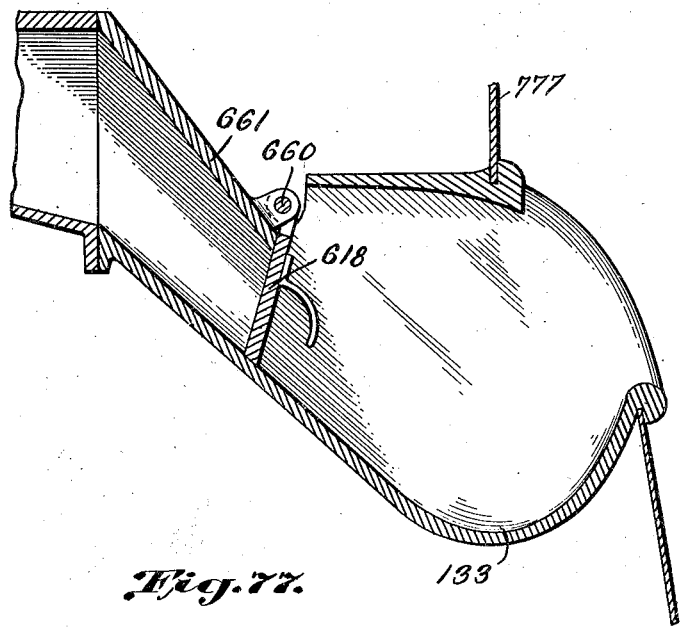

Figure 77 is a vertical section through the change pocket and coin chute.

Figure 78 is a front elevation of the stamp section.

Figure 79 is a sectional detail view of the stamp button locking cam taken on a line corresponding to line 79 of Figure 78.

Figure 80 is a side elevation of the stamp section with one of the side frames removed.

Figure 80$^a$ is a detail section taken on line 80$^a$—80$^a$ of Figure 80.

Figure 81 is a front elevation of the stamp feeding mechanism.

Figure 82 is a horizontal section taken on a line corresponding to line 82—82 of Figure 80.

Figure 83 is a horizontal section taken on a line corresponding to line 83—83 of Figure 80.

Figure 84 is a detail plan view of a portion of the stamp feeding mechanism, partially in section on a line corresponding to line 84—84 of Figure 81.

Figure 84$^a$ is a detail perspective view of one of the adjusting pawls and coacting grooved member for bringing the perforations between the stamps to the desired position.

Figure 85 is a vertical sectional view through the stamp feeding device taken on a line corresponding to line 85—85 of Figure 83.

Figure 85$^a$ is a detail view of the loading lock tripping means.

Figure 86 is a vertical section through the stamp feed rolls taken on a line corresponding to line 86—86 of Figure 83.

Figure 87 is a horizontal section through the stamp feed rolls corresponding to line 87—87 of Figure 86.

Figure 88:
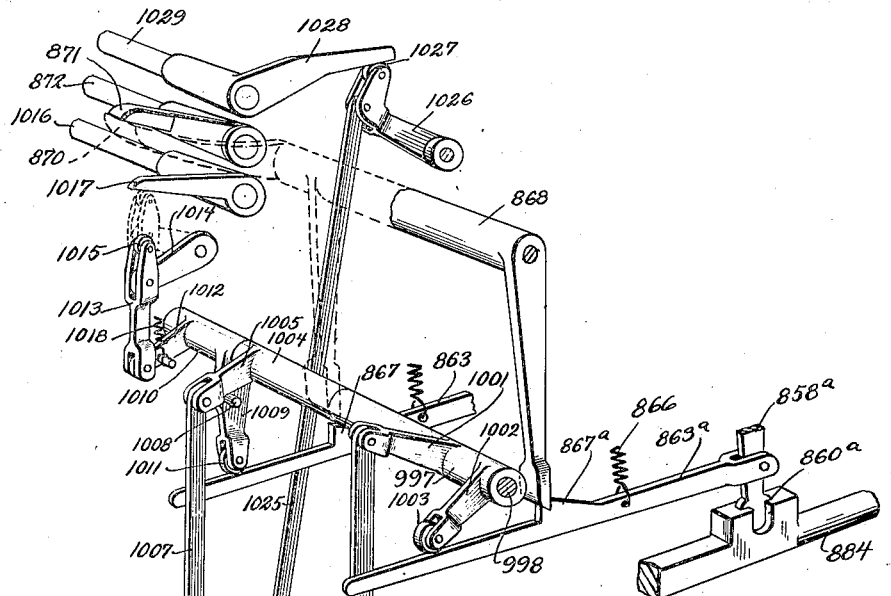

Figure 88 is a detail perspective view of a portion of the stamp controlling mechanism.

Figure 89 is a vertical section taken on a line corresponding to line 89—89 of Figure 83, showing the intermittent gears for feeding stamps and subtracting credit.

Figure 90 is a detail section taken on a line corresponding to line 90—90 of Figure 83.

Figure 91 is a detail section taken on a line corresponding to line 91—91 of Figure 83.

Figure 92:
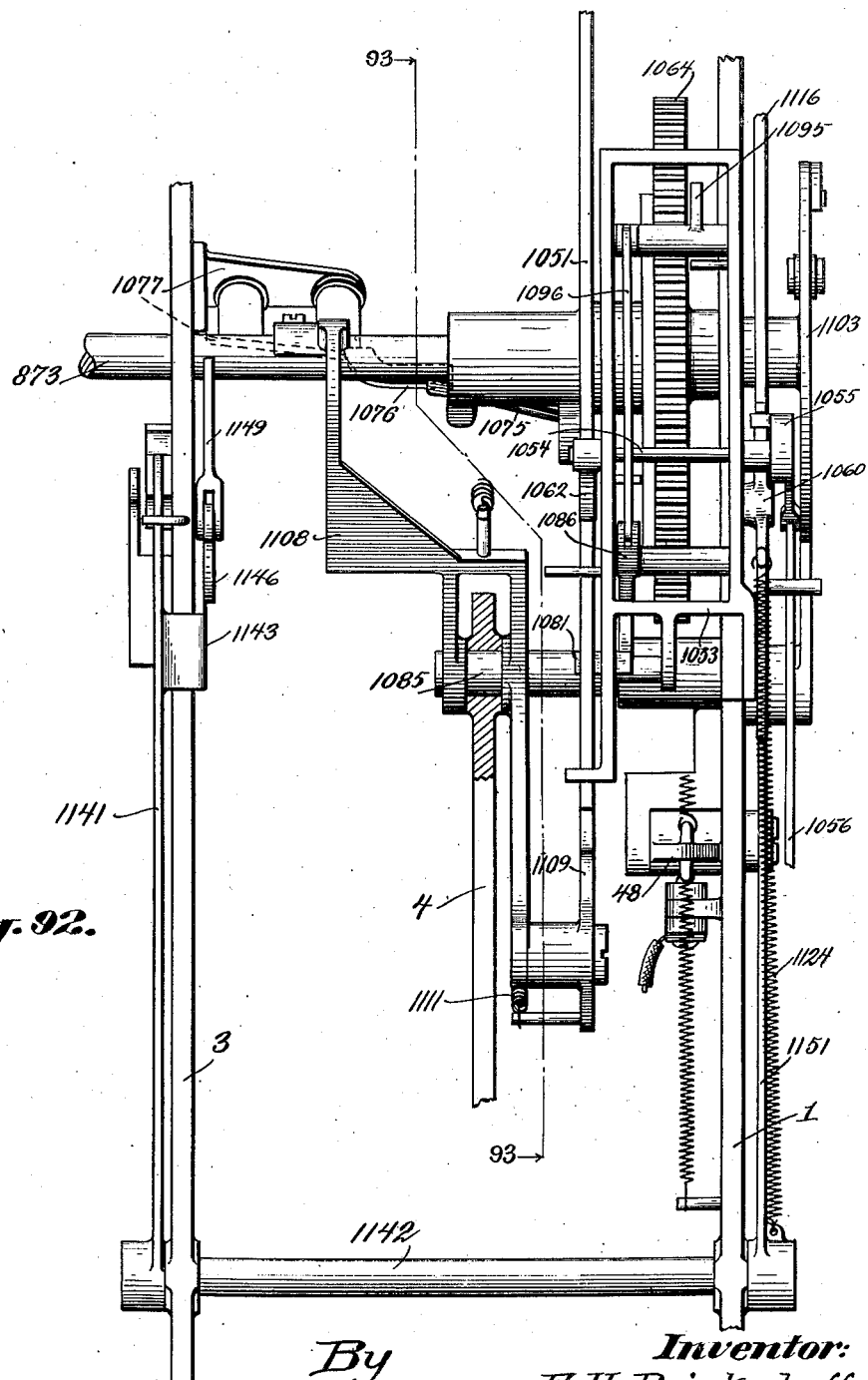

Figure 92 is a front elevation of the stamp shaft starting mechanism.

Figure 93:
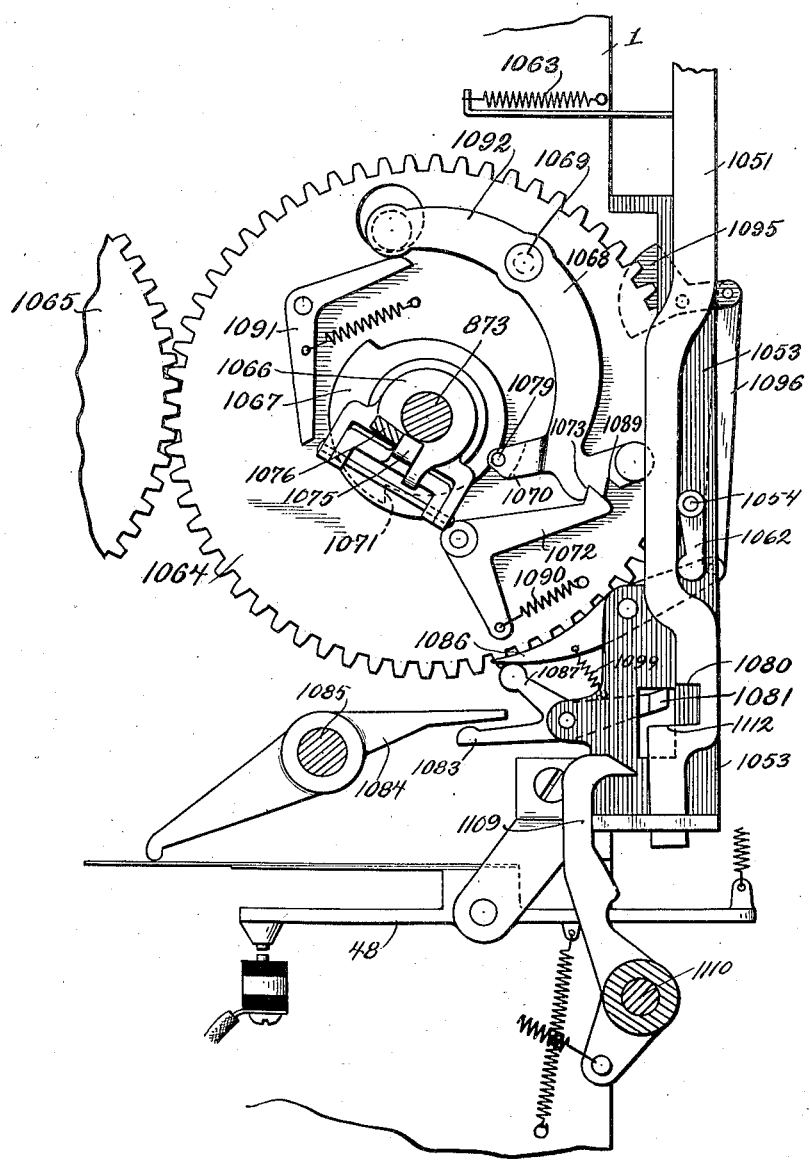

Figure 93 is a vertical transverse section taken on a line corresponding to line 93—93 of Figure 92, also showing the stamp shaft starting mechanism.

Figure 94:
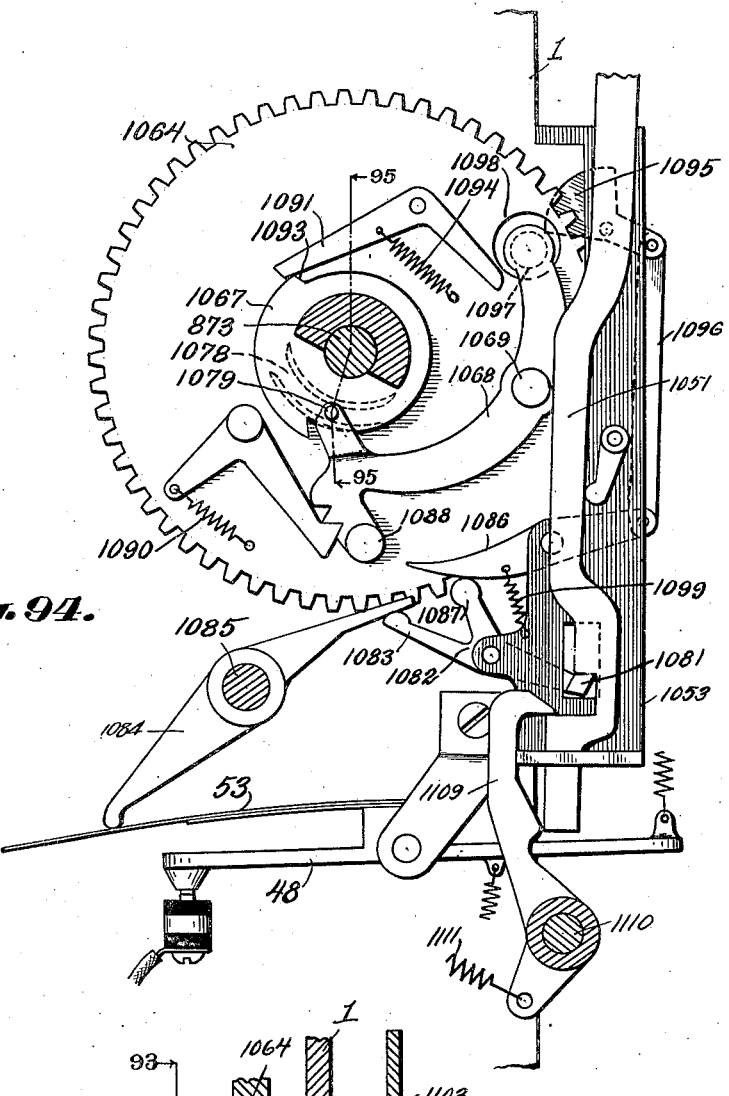
Figure 95:
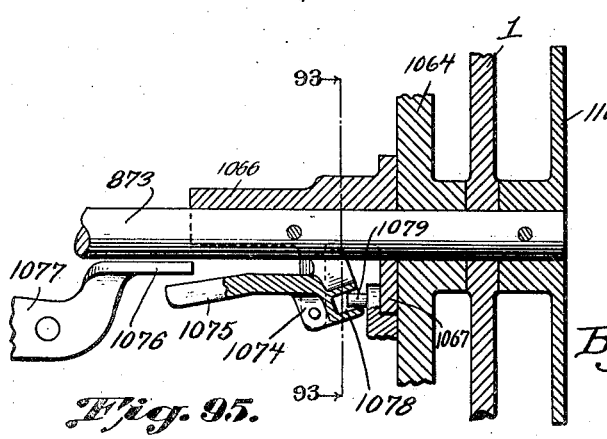

Figure 94 is a vertical transverse section taken on a line corresponding to line 94—94 of Figure 95, clutch member groove being shown in dotted lines.

Figure 95 is a vertical section of the stamp shaft clutch taken on a line corresponding to line 95—95 of Figure 94.

Figure 96:
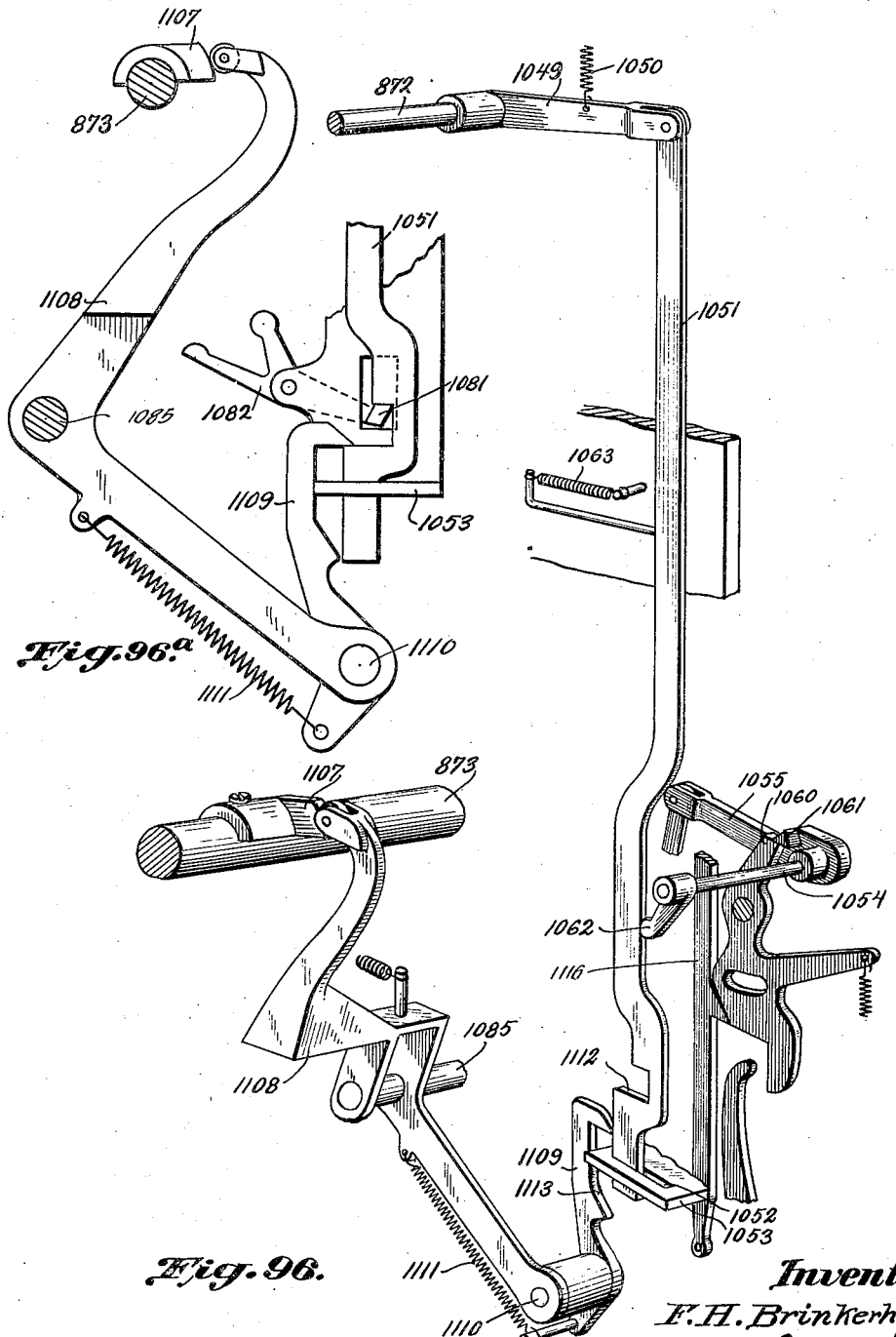

Figure 96 is a detail perspective view of the stamp shaft safety starting device.

Figure 96ª is an enlarged detail side view of a portion of the stamp shaft safety starting device.

Figure 97:
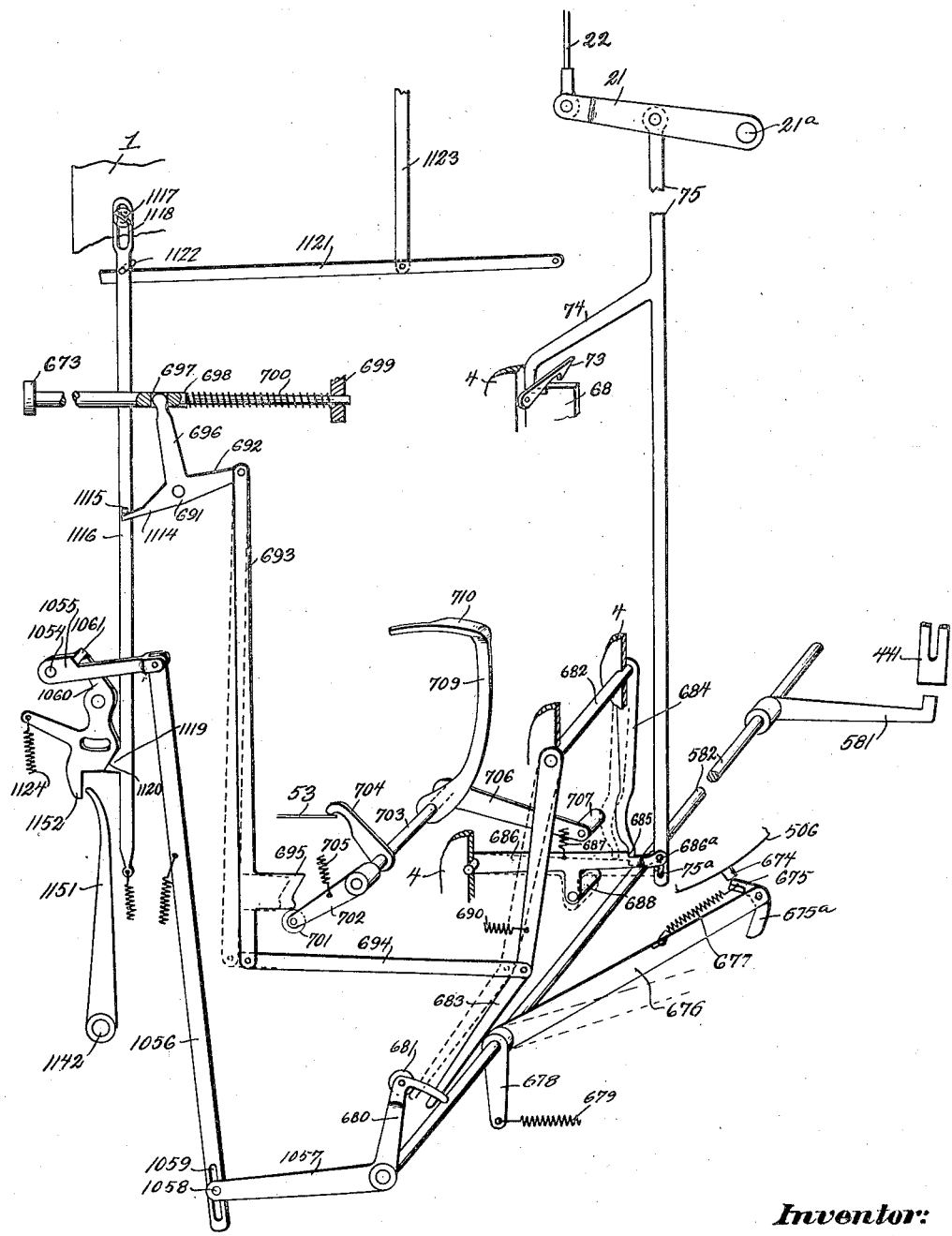

Figure 97 is a diagrammatic perspective view of a portion of the stamp and change control.

Figure 98:
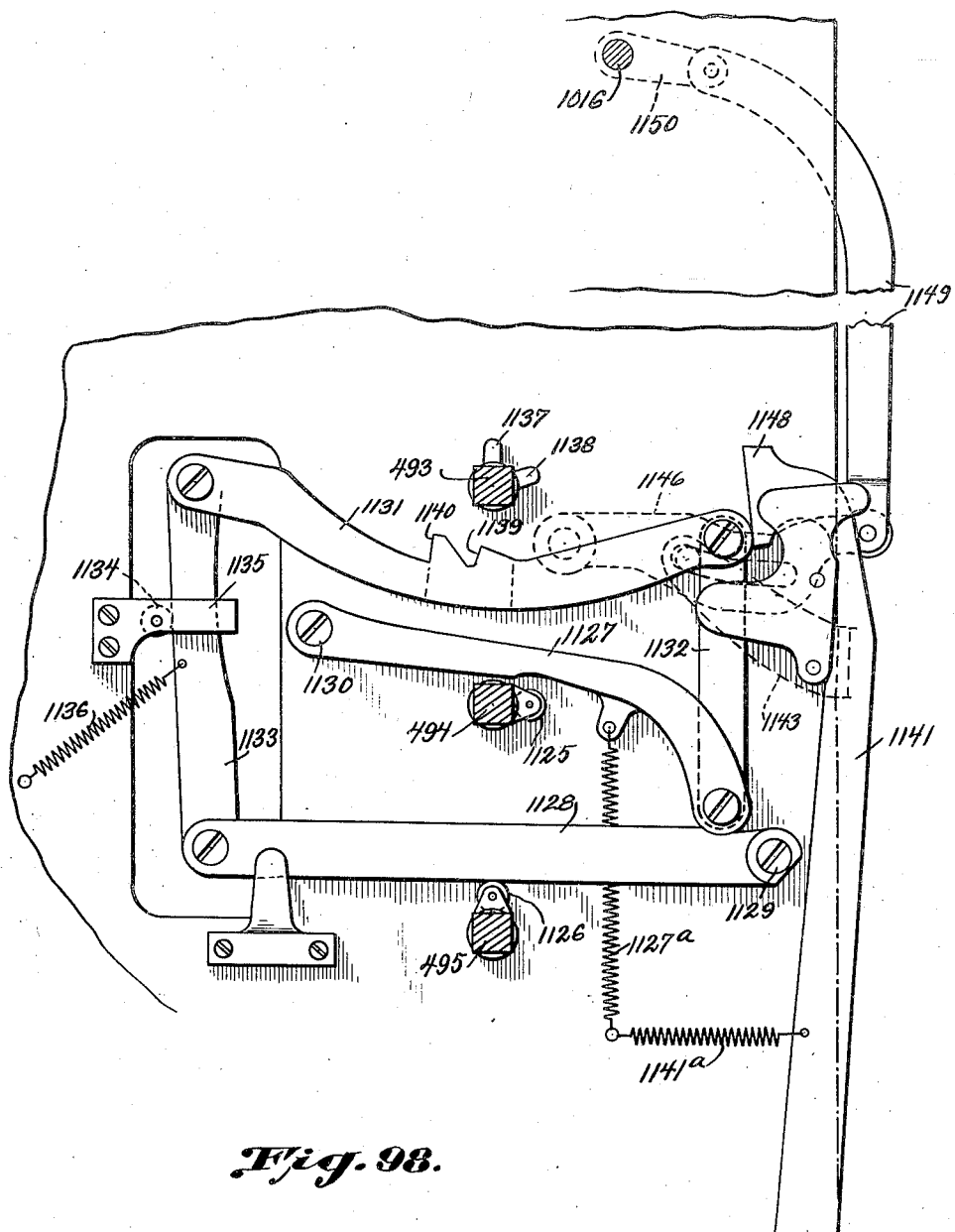

Figure 98 is a vertical cross section taken on a line 98—98 of Figure 55, showing means for tripping the stamp shaft and two-cent stamp button when credit is exhausted.

Figure 99 is a front elevation of the coin distributor with the front plate removed and coin elevator in position.

Figure 99ª is a detail sectional view taken on line 99ª—99ª of Figure 99 and showing the elevator in position to receive the coin from the coin chute.

Figure 100 is a back view of the coin elevator.

Figure 101 is a detail section through the coin elevator taken on a line corresponding to line 101—101 of Figure 99.

Figures 102, 103:
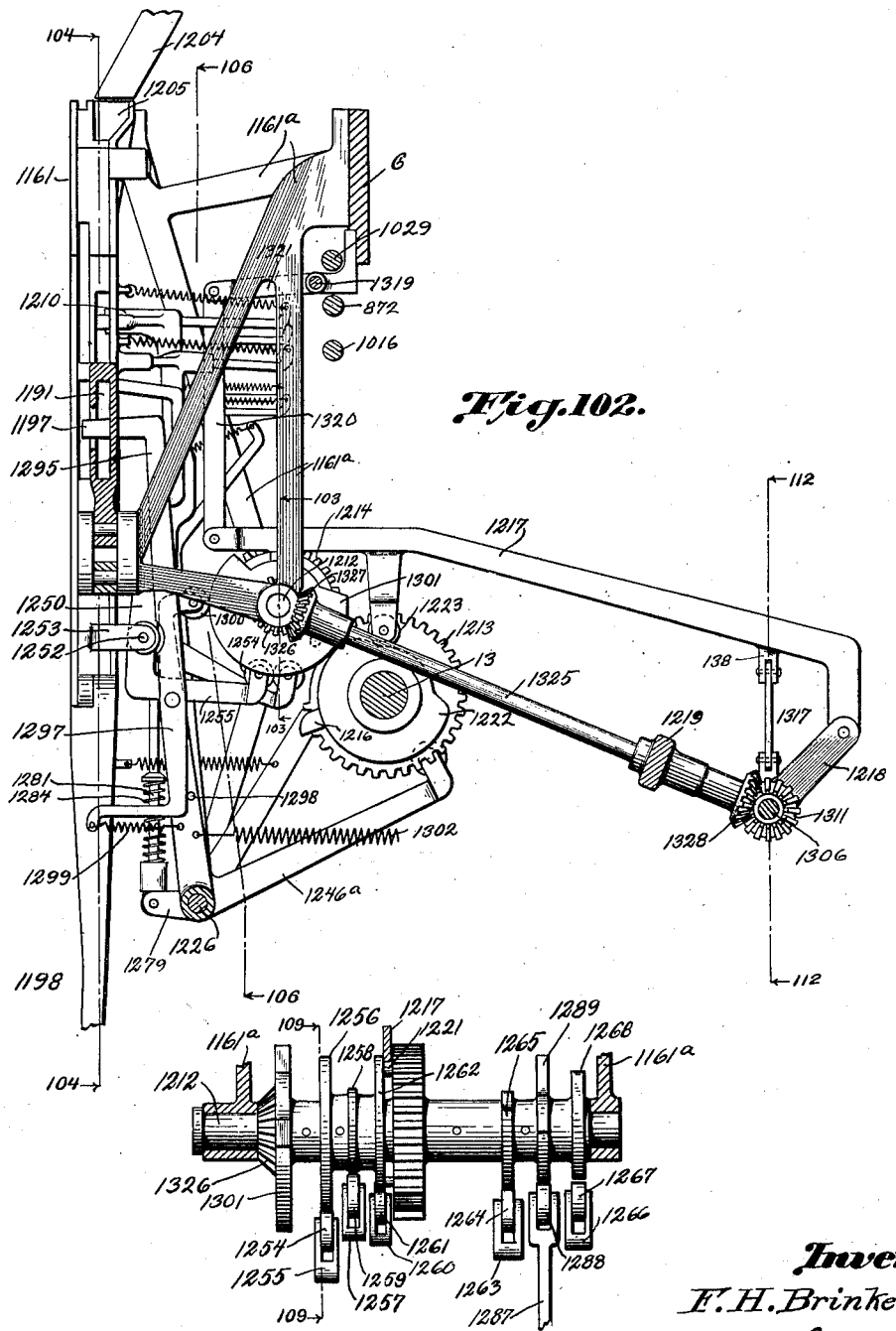

Figure 102 is a vertical cross section taken on a line corresponding to line 102—102 of Figure 99 and showing a side view of the coin distributor.

Figure 103 is a vertical longitudinal section taken on a line corresponding to line 103—103 of Figure 102, showing the distributor cam shaft and cams in full lines.

Figure 104 is a vertical longitudinal section taken through the change sorting and loading chute on a line corresponding to line 104—104 of Figure 102.

Figure 105 is a detail section taken on a line corresponding to line 105—105 of Figure 104 and showing one of the thickness testers.

Figure 106:
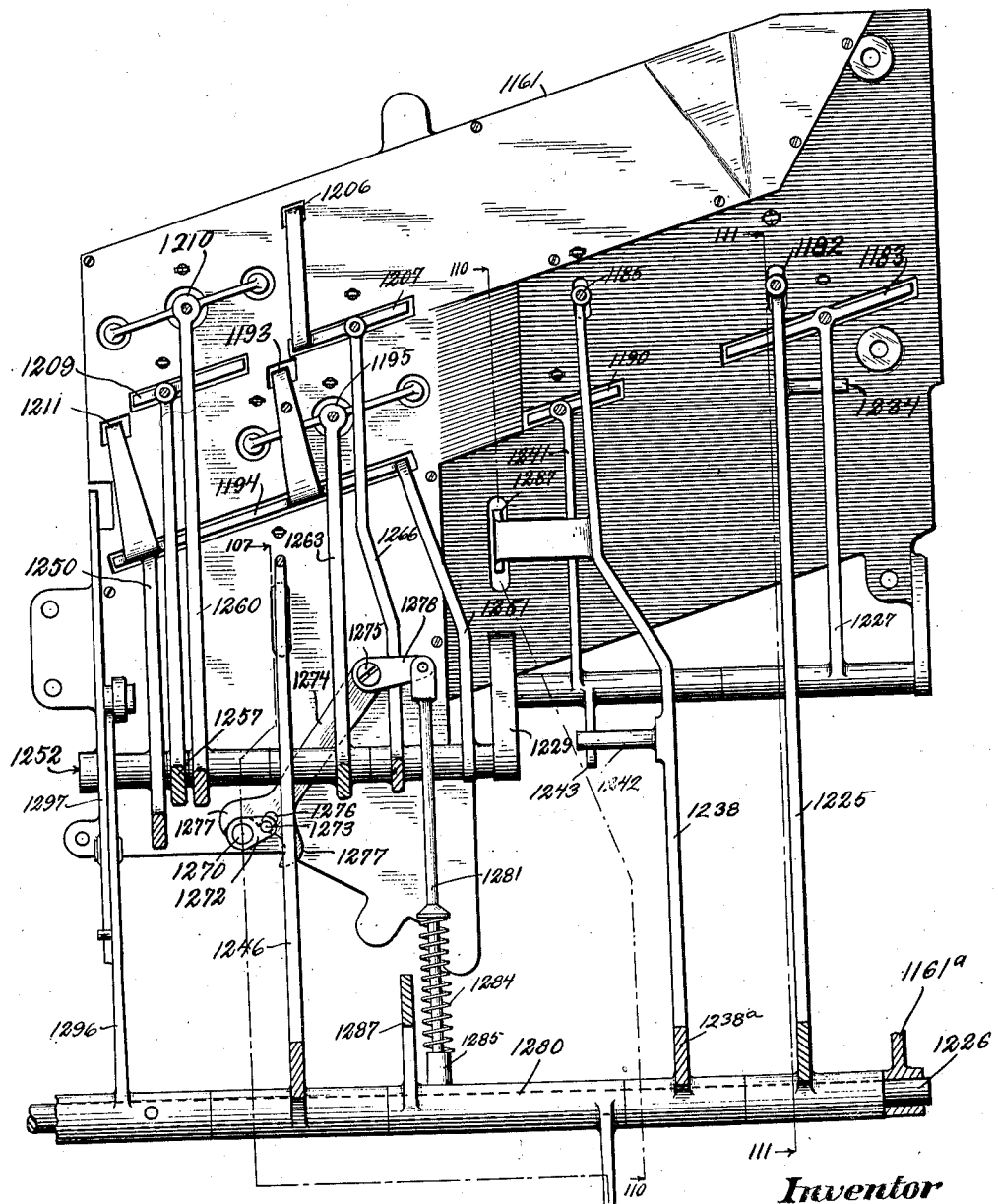

Figure 106 is a rear elevation of the coin distributor partially in section taken on line 106—106 of Figure 102.

Figure 107 is a detail vertical section taken on a line corresponding to line 107—107 of Figure 106.

Figure 108 is a detail perspective view of the coin distributor driving gear and contact control.

Figure 109 is a vertical section taken on a line corresponding to line 109—109 of Figure 103.

Figure 110 is a vertical section taken on a line corresponding to line 110—110 of Figure 106.

Figure 111 is a detail section taken on a line corresponding to line 111—111 of Figure 106.

Figure 112 is a vertical longitudinal section taken on a line corresponding to line 112—112 of Figure 102, showing the coin leader drive shaft in detail, with coin timer and operating means.

Figure 113 is a detail view taken on a line corresponding to line 113—133 of Figure 112.

Figure 114 is a detail view of the locking device shown in Figure 113.

Figure 115 is a detail vertical section through the coin timer taken on a line corresponding to line 115—115 of Figure 112.

Figure 116:
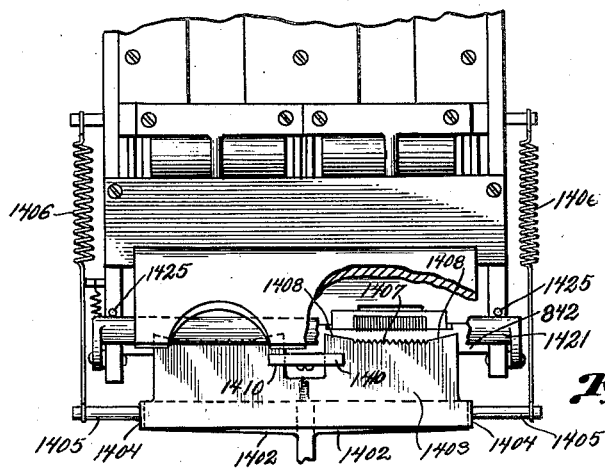

Figure 116 is a front view of the stamp cutting devices.

Figure 117:
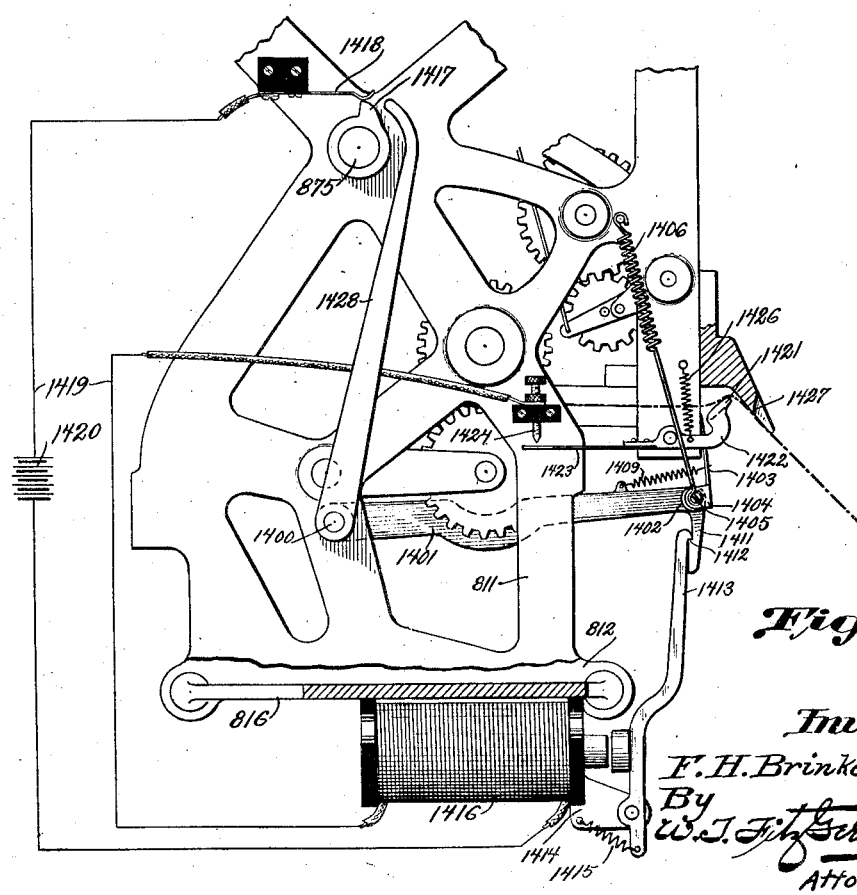

Figure 117 is a side view of the stamp cutting devices and the operating mechanism therefor.

Referring to the drawings, I provide suitable side frames 1 and 2, intermediate frame 3 and subframe 4. These frames are secured to the base 5 in any suitable manner, and are supported by tie bars 6 and 7, shown more in detail in Figure 45, it being understood that throughout the drawings all moving parts move in the direction shown by arrows.

Referring to Figure 12, mounted in suitable bearings in frames 1 and 4, I provide a main drive shaft 8, and an intermediate shaft 9 is mounted in frames 1 and 3 and is driven from shaft 8 by means of gears 10 and 11. The first cam shaft 12 is mounted in suitable bearings in frames 1 and 3 and a second cam shaft 13 is mounted in a similar manner in frames 1, 2 and 3, and both are driven from shaft 9 by means of suitable gears to be described later. Stamp shaft 873 is also mounted in frames 1, 2 and 3 and connected with the drive shaft by suitable gears. A pulley 15 is mounted on drive shaft 8 and is connected by means of belt 16 to the motor 17.

A coin receiving member 18 is suitably mounted on the intermediate frame 3 and is provided with a coin inlet door 19 pivoted at 20.

The raising and lowering of this door, together with the effect of coin insertion, initiates the automatic operation of the machine. When the door is opened, coin inserted, and door closed, the control switch for the driving electric motor is closed, starting the motor, and a first cycle or preliminary test is started. I divide the wholly automatic operations of the machine, responsive to the insertion of a good coin, into two groups, the operations of the first group occurring during the rotation of a first cam-shaft and the operations of the second group occurring during the rotation of a later-start second cam-shaft. If the inserted object be not a proper coin and be rejected on the first tests, the second cam-shaft is not thereafter started, but at the conclusion of the first test cycle, and completion of the rotation of the first cam shaft, the motor stops and the machine is left in normal condition ready for proper operation.

In the operation of my machine, the coin inlet door 19 is first raised. This lowers the arm 21 pivoted at 21ᵃ and connected by means of link 22 to the door 19, and this movement allows pawl 23, also pivoted on arm 21, to move to the position shown by the dotted lines in Figure 5, said pawl being held in engagement by means of the spring 24.

A coin diameter-gauge 25 is mounted in the inlet member 18 by means of the rollers 26 also mounted in the inlet member 18 and adapted to engage the grooves 27 (Figures 19 and 21) on the gauge 25. When the coin is inserted in the inlet, the gauge 25 is pushed back to a position relative to the diameter of the coin and the coin is held between rollers 28 on gauge 25 and rollers 29 mounted in the inlet member 18, (Figure 8). A pin 30 mounted on the gauge 25 and operating through the slot 31 engages the lever 32 and depresses trip 33 through the medium of link 34 (Figure 7) which allows the pawl 23 to drop under the contact lock 35 and raise the same through the act of closing the door. The contact lock 35 (Figure 4) is pivoted at 36 and held in operative position by means of spring 37. Arm 38 is pivoted at 39 and provided with a downwardly extending arm 40 having a lug 41 adapted to engage the notch 42 in the contact lock 35, and when the contact lock is raised by the operation previously described, the arm 38 is raised by means of the spring 43, thereby raising the vertical contact control link 44, which is movably secured to the frame 1 by means of link 45 and is provided with a slot at its upper end through which the arm 38 extends. The lower end of link 44 is pivotedly connected to one end of the lever 46, pivoted at 47. A contact member 48 is also pivoted to the side frame 1 at 49 and the contact points 50 and 51 are normally held open by means of the spring 52. The spring 53 is secured to the contact member 48 and is depressed by one end of the lever 46, thereby overcoming the tension of the spring 52, closing the contact points and starting the motor 17.

An inner door 54 adapted to cover the coin opening is also pivoted at 20 and is provided with a rearwardly extending lug 55 on which is pivoted the dog 56, adapted to engage the notch 57 in the door 19, the dog 56 being normally held in position by the spring 58. Thus the outer and inner doors are raised together. A lever 59 is pivoted on the inlet member 18 at 60 and connected by means of a link 61 to a pawl 62 pivoted at 63. The lever 59 is provided with an extension 64 projecting over the vertical contact-control link 44, and is raised by the movement of the same, previously described, and at the same time the pawl 62 is carried beneath the ear 55 on the inner door 54, thereby locking the same. The pawl 62 simultaneously engages the extension on the dog 56 forcing it from the notch 57 and releasing the outer door 19.

The general arrangement of the driving mechanism cam shafts, etc., is shown diagrammatically in Figure 11.

Referring now especially to Figure 12, a pinion 65 is mounted upon the shaft 9 and adapted to engage a mutilated gear 66 on the first cam shaft 12. A collar 67 is slidably mounted upon the shaft 9 and controlled by a lever 68 pivoted at 69 to a bracket on the subframe 4 and normally held against the stop on pawl 70 by means of a spring 71. The pawl 70 is pivoted at 72 on the subframe 4. Pawl 73 is also pivoted at 72 and adapted to engage the lever 68 but is normally held out of engagement by the arm 74 on the trip rod 75 secured to the arm 21 at 76. The catch on pawl 73 is slightly in advance of pawl 70 when said pawl is out of engagement. When the arm 21 is lowered by raising the door and through the mechanism previously described, the pawl 73 is dropped into position for engagement with the lever 68.

Pawl 70 is then raised out of engagement with lever 68 by means of link 77 secured by means of slot 78 and pin 79 to an extension arm on the trip 33, which is operated by the insertion of a coin. Trip 33 is held in its normal position by spring 80 and the link 77 and pawl 73 are forced downward by the spring 81.

When the door is closed, the pawl 73 is again raised allowing the stop 82 on the lever 68 to engage catch 83 on the cam operated arm 84 controlled by cam 85 secured to shaft 9, whereby cam 85 controls the time of the releasing of the lever 68. The arm 84 is held in contact with the cam 85 by means of the spring 86. When the arm 68 carrying the collar 67 is released, it is moved by means of spring 71 toward the pinion 65 until the lug 87 engages the long tooth or lug 88 on the mutilated gear 66 (Figures 11, 12 and 26) secured to the first cam shaft 12 and turns the gear beyond the mutilated portion until it is in mesh with the pinion 65. The cam 89 (Figure 26) then comes in engagement with the roller 90 on the arm 68 and forces it back to normal or initial position where it is again engaged by pawl 70. The first cam shaft then completes one revolution stopping again when the mutilated portion of the gear is reached.

Collar 12ª is secured to cam shaft 12 and is provided with a lug 12ᵇ which engages the lug 68ª on the arm 68, thereby effectively locking the first cam shaft except when released by the movement of arm 68.

Referring especially to Figure 16, lever 91 is pivoted at 92 to side frame 1, and carries a roller 93 which is normally held in the notch 94 in the wheel or disk 95 secured to the cam shaft 12. This lever is held in position by means of the spring 96. The roller 93 tends to hold the shaft 12 in its initial position.

The vertical contact control 44 is provided with a downwardly extending arm 97 extending over the lever 91. When the cam shaft 12 starts the roller 93 is raised from the notch 94, raising the lever 91 and holding the contact control in a raised position during one revolution of the shaft 12.

Referring to Figure 19, a second diameter gauge 98 is provided immediately below the first gauge 25 and mounted on the rollers 99. This gauge is normally held against the stop 100 by means of spring 101. When the coin is inserted and the first gauge is pushed back to a position relative to the diameter of the coin as shown by dotted lines, the stop 102 on the arm 104 pivoted at 105 is brought forward until it engages one of the notches 103 in the first gauge, corresponding to the diameter of the coin inserted. In the forward movement of arm 104 the cam surface 106 bears against the roller 107 and carries the second gauge forward until the pawl 108 drops into a corresponding notch 109, which pawl is held in position by means of spring 110. A projection 111 is provided on the front edge of the second gauge, and an adjustable arm 112 is pivoted at 113, which arm is adjusted by means of the screw 114 and the arm is provided with a projection or coin stop 115. The notches 103 and 109 are positioned to correspond to the diameters of a United States silver dollar, half dollar, quarter dollar, dime and nickel respectively. Anything of a different diameter either coin or slug inserted into the machine, when released by the first gauge would drop through between the projections 111 and 115 and be carried to the change pocket through the bad money chute 116. The lever 104 is operated by means of the cam 117 on shaft 12 (Figure 19ª) through the bell crank lever 118 pivoted at 119, the connecting rod 120, lever 121, link 122 and arm 123. Connecting rod 120 is slidably mounted in pivot 124 and is provided with a spring 125 interposed between the collar 126 and the loop 127 mounted on pivot 124. This spring is for the purpose of allowing stop 102 to adjust itself to the various size coins. The first gauge 25 is controlled by spring 128. The coin is held between the second gauge 98 and the pivoted arm 112 until the gate 129 shown more in detail in Figures 23 and 33 is closed. The second gauge is then allowed to return to its initial position and the coin is dropped on the gate 129, and then rolls along the inclined floor 130 (see Figures 19 and 43) of the passage 18ª until stopped by the member 131, to be hereinafter described. When the coin is not of standard diameter, it will not be held by the second gauge, the gate 129 will not be closed and the coin will be dropped through opening 132 and into bad money chute 116 and the change pocket 133, thereby being returned to the customer.

An electro-magnet 134 (Figure 23) is mounted on the inlet member 18 in a position to act upon the coin while it is being held by the first gauge 25, and is energized immediately before the releasing of the coin by the first gauge. In case the piece inserted into the machine is of iron or steel or of any material capable of being affected by the magnet it will be held by the magnet, until such time as the mechanism hereinafter described for closing the gate 129 will be inoperative. The coin is then released and allowed to drop through opening 132 and bad money chute 116 and to the change pocket 133 as in previous operation. The magnet is provided with circuit 134, battery 135, and insulated contact members 136 and 137. The contact members are supported in bracket 138 secured to frame 1 being insulated therefrom. The contact member 137 is controlled by pin 138 on the disk 95 mounted on shaft 12. A bell crank lever 139 is pivoted at 140 and provided with a cam face 141 which is acted upon by the pin 138. The rod 142 secured to the bell crank lever 139 is depressed by the action of the cam and pin and the contact is made through the contact point 137. The spring 143 is provided to allow for any overthrow of the bell crank lever 139, and the rod 142 is insulated from the contact member by means of the insulation 144. A spring 145 is provided for the purpose of breaking the contact when the bell crank lever is released. A spring 146 is secured to an arm of the bell crank lever 139 to return it to its initial position, and a stop 147 is provided for the bell crank lever 139.

Referring more especially to Figures 24 and 24ª, the first and second gauges 25 and 98 are returned to their initial positions by means of the cam 148 secured to shaft 12 and operating through the roller 149, cam lever 150 pivoted at 119, connecting link 152 and bell crank lever 153 pivoted at 154 on inlet member 18. The arm 155 of the bell crank lever 153 is provided with a roller 156 in engagement with one end of the slot 157 in the first gauge 25, and the inlet member 18 is provided with a slot 158 to allow for the movement of the roller 156 during the operation of the cam 148. The bell crank lever 155 is carried to the position shown by the dotted lines (Figure 24), thus releasing the coin and dropping it to the second gauge. The bell crank lever is held in the position shown in the dotted lines until the lead and slug tester hereinafter described has been operated and it is then returned to its initial position. A ratchet pawl 159 is pivoted on the bell crank lever 155 at 160 and is provided with a spring 161 to hold the pawl against stop 162. When the bell crank lever 155 moves to the position shown in dotted lines, the ratchet pawl 159 is allowed to pass underneath the pin 163, and on a return movement, the pawl 159 being held against the stop 162, engages the pin 163 and forces the pawl 108 out of engagement with the notches 109 and allows the second gauge 98 to return to its initial position.

In case a soft metal slug or a check, disk, or a washer having a hole in it or a depression that is deeper than those on standard U. S. coins but which is of a standard diameter is inserted it would be held by the second gauge 98 in the position shown by dotted lines (Figure 19) in the same manner as a standard coin. In this position the piece or coin is tested by means of the needle 164 mounted in the short arm 165 of the lever 166 pivoted on the bracket 167, secured to the inlet member 18. The needle 164 is forced against the coin, slug or check by means of spring 168 acting against the long end of the lever 166.

The lever 166 stands normally in the position shown in Figure 27. Immediately before the coin is dropped to the second gauge and into position to be tested by the needle 164, the needle its removed from the path of the coin by the action of the lever 169 against the long end of the lever 166. Lever 169 is pivoted at 170 and is operated by the means of the link 171 and cam lever 172 and the cam 174 mounted on the shaft 12. (Figure 26). As soon as shaft 12 starts its revolution the roller 175 on lever 172 is forced outwardly by the cam surface 176, and is held out and holds the needle from the path of the coin by the means just described until the predetermined time for testing the coin or slug. It will then drop into notch 177 on the cam 174 allowing the needle 164 to be forced inwardly by means of the spring 168 and lever 167. Immediately before the inward movement of the needle 164, the plunger 178 is forced against the coin or slug holding it firmly against the side 179 of the the coin passage 18$^a$ in the inlet member 18 during the operation of the tester. The plunger 178 is operated by the means of the cam 180 secured to shaft 12, roller 182, lever 183 pivoted on shaft 119, link 184, lever 185 pivoted at 186, spring 187 and bell crank lever 188, the short arm of which operates in slot 189 of plunger 178. A rod 190 is inserted inside the coil spring 187 between the lever 185 and the bell crank lever 188, and the spring 187 is secured to the long arm of the lever 185 and the bell crank lever 188 and is for the purpose of allowing the plunger 178 to adjust itself to the thickness of the coin or slug. The plunger 178 is carried in a bracket 191, being slidably mounted, and the bell crank lever 188 is pivoted on a bracket 191 at 192. In order that the gate 129 may be closed at the proper time, a lever 193 (Figure 31) is pivoted to the inlet member 18 at 194, and this lever is connected by means of a link 195 and the spring 196 to the gate 129 pivoted to the inlet member 18 at 197. The slot 198 and the spring 196 are provided to prevent the breaking of the machine in case a coin should be caught between the gate and the walls of the chute. The lever 193 is provided with a lug 199. A member 200 (Figure 32) is slidably mounted in the bracket 201 on the inlet member 18 and is provided with an upwardly extended arm 202 pivoted at 203 and the upper end is held against the tester lever 166 by means of the spring 204. The member 202 is provided with a catch 205 which is normally held out of engagement with the lug 199 on the lever 193 and in the position shown in full lines. At a predetermined time after the tester lever 166 has been released for testing the coin, the member 202 is raised by means of the cam surface 206 on the cam 207 mounted on shaft 12 and acting upon the roller 208 on the cam lever 209 pivoted at 119. The roller 208 is held in contact with cam 207 by means of springs 210 and 211.

When the long arm of the tester lever 166 is moved inwardly by means of the cam 174 acting through the means described, the catch 205 on the member 202 is forced to move underneath the lug 199 on lever 193 by means of the spring 204 secured to the member 200. If a standard coin is being tested, the tester needle 164 rests against the surface of the coin and prevents the outward movement of the long arm 166 allowing the catch 205 to raise the lever 193 and link 195, thereby closing the gate 129 so that when the coin is released, it is allowed to drop on the gate 129 and against the coin stop 131 as previously described. In case of a soft metal or lead slug, check, or coin with a deeper depression than a standard coin, the needle 164 enters the soft metal or depression, and the tester arm 166 is forced outwardly by the spring 169, thereby forcing the member 202 outwardly, and carrying the catch 205 out of the path of engagement with the lug 199, and the gate 129 will not be closed. When the member 202 is raised and the slug or check is released it will drop through the opening 132 into the bad money chute 116 and be returned to the customer as previously described.

Referring again to Figure 4 and Figure 32, before another coin can be inserted in the machine, the inner door must be released and the contact lock members 35 and 40 must be reset to their initial position. This is accomplished at this time by means of a link 212 pivotedly connected to the cam arm 209. Arm 38 is connected to the link 212 by means of the pin 213 in the extension 214 operating in the slot 215. When the cam arm 209 is raised by the operation of the cam, the bottom of the slot 215 engages the pin 213 raising the extension 214 causing a backward movement of the arm 40 and allowing the catch 42 on the lock 35 to again engage the lug 41, and the arm 38 is allowed to be moved downwardly by reason of the slot 216 in the vertical contact control 44 shown more clearly in Figure 2.

Referring now to Figures 28, 29 and 30, it is evident that the testing last described would not return to the customer hard smooth surface slugs of the same diameter as standard coins. In order to accomplish this, I provide a special tester, comprising a casing 217 secured to the inlet member 18 in any suitable manner and located directly over the lead tester needle. A slot 218 is provided to allow for the movement of the tester arm 165. Mounted in this casing I provide a plurality of plungers 219, provided with points 220 and shoulders 221 normally held against the stops 222 by means of springs 223. The outer ends of plungers 219 are provided with extensions 224 extending over and in contact with the shoulders 225 on the pawl 226 which is pivoted at 227 on the casing 217. A shaft 228 is rotatably mounted in suitable brackets on the inlet member 18. The shaft 228 is provided with a collar 229 having a lug 230 which is normally in engagement with the catch 231 on pawl 226. An arm 232 (Figure 28) is also secured to the shaft 228 and is adapted to engage the vertical member 202 when the shaft is partially rotated. An arm 233 is also secured to the shaft 228 and is provided with a downwardly projecting cam lug 234. The lever 169 is provided with a projection having a cam surface 235. In case a smooth and hard surface slug or check is pressed against the side wall 179 of the inlet member 18 by means of plunger 178 all of the plungers 219 are forced outwardly and the extension heads 224 are carried outwardly releasing the pawl 226, and allowing the spring 236 to force the pawl 226 outwardly. Before the operation of the tester and immediately after the first cam shaft 12 starts, the lever 169 is moved inwardly by means of the cam 174 and the mechanism illustrated in Figures 25 and 26, and the cam surface 235 on the lever 169 engages the downwardly projecting cam lug on the arm 233, thereby preventing any revolution of the shaft 228 until the outward movement of lever 169, when the partial revolution of shaft 228 will bring the arm 232 into engagement with the member 202 forcing the same outwardly and preventing the closing of the gate 129. Thus when the member 202 is raised, the slug, when released, drops into the bad money chute as in the operations previously described. The forward movement of the lever 169 again raises the arm 233 allowing the pawl 226 to be reset by the inward movement of the plungers 219.

When the coin has successively passed the tests previously described and the gate 129 has been closed by the raising of the lever 193 by means of the cam surface 206 and the necessary connections, the cam surface 206 being of sufficient length to allow the coin time after being released to reach the stop 131, the lever 193 is then raised still higher by means of cam surface 236, allowing the end of the slot 237 to engage the pin 238 and raise the second cam shaft starting rod 239. (Figure 31.)

Referring now more especially to Figures 2 and 15, the cam 240 is provided on shaft 12, and engages the arm 241 of the bell crank lever 242 pivoted at 243. An insulated contact member 244 is secured to the bell crank lever 242 and is raised by the action of the cam 240 and contacts with the extension 245 on the link 195 when the gate 129 remains open, and an alarm bell 246 will be rung indicating the piece inserted has been rejected. In the case of a good coin the lever 193 will be raised, thereby removing the extension 245 from the path of the contact member 244.

It will have been noted that the several tests heretofore referred to are all made while the first cam-shaft is making its single rotation. If the inserted object has been rejected it has been expelled and the alarm rung; if it has passed the tests it has been directed by the gate along the coin path for further test and for value and for determination of its value indicating characteristics. It is only when a coin has successfully passed these preliminary tests that the first cam-shaft has been able to operate the rods 239 which, as hereafter described, is to start the second cam-shaft in its cyclic operation. I will now describe the parts involved in the further test of the coin and those acting automatically to condition the machine for commodity delivery and change delivery within limitation determined by the value indicating characteristics of the inserted coin.

Referring now to Figures 12 and 31, the second cam shaft starting rod 239 is pivotedly connected to lever 247, pivoted on the subframe 4 at 248 and provided with a stop 249 adapted to engage the subframe 4, and a downwardly extending arm 250. When the rod 239 is raised by means previously described, the arm 250 engages the upper end of the lever 68 forcing it and the collar 67 in the direction of the pinion 251 secured to shaft 9, until the lug 252 engages the long tooth or lug 253 on the mutilated gear 254 secured to the second cam shaft 13, and turns the gear beyond the mutilated portion until it is in mesh with the pinion 251, as illustrated in Figure 36.

Referring to Figure 35, an arm 255 is pivoted to the frame at 256 and is provided with a roller 257, normally held in the cam notch 258, on the gear 254 and is held in operative position by means of the spring 259. The roller 257 is adapted to hold the shaft 13 in its initial position, when not in operation. As soon as the second cam shaft 13 starts its revolution, the roller 257 is forced out of the notch 258, thereby raising the arm 255 which is also located under arm 97, thus preventing the lowering of the vertical contact control 44 to which arm 97 is attached and the breaking of the motor contact in the same manner as previously described in the starting of the first cam shaft. This operation is performed before the completion of the revolution of the first cam shaft, thereby preventing the breaking of the contact in case the coin has successfully passed the test previously described. After one complete revolution of the second cam shaft 13 the roller 257 again drops into notch 258, thereby lowering the vertical contact control 44, and stopping the motor unless the contact is still held by one of the means hereinafter described.

The second cam shaft 13 is provided with a number of cams for the purpose of performing the operations which will now be described.

At the time of the starting of the second cam shaft 13, the coin is held by the stop 131 (Figures 41 and 43) in the coin passage 18ª in the position shown by dotted lines in Figure 43 and in position to be tested by the thickness-gauge 260. The thickness gauge 260 is operated by means of a cam 261 mounted on shaft 13, operating through the roller 262 on cam lever 263, pivoted at 264 to tie bar 6. An arm 265 is also pivoted at 264 and is moved outwardly by means of the spring 266 secured to an outwardly extending arm 267 on the cam lever 263. A pin 268 is provided on the arm 267 bearing against the arm 265 for the purpose of returning the arm 265 to its initial position after the coin has been tested. A lever 269 is pivoted at 270 on a suitable bracket on the inlet member 18 and is connected to the arm 265 by means of a link 271. The thickness-gauge 260 is supported on the inlet member 18 by means of the links 272, pivoted to a bracket 273 and a rearwardly extending arm 274 on the thickness-gauge 260. The thickness-gauge 260 is also pivoted to the lever 269 at 275. During the revolution of cam 261, the thickness-gauge 260 is moved forward until the ribs 276 are stopped by the coin which in turn is held against the side wall 179 of the passage 18ª. The spring 266 is for the purpose of allowing the thickness-gauge 260 to adjust itself to the thickness of the various coins.

An arm 277 is pivoted on a bracket 278 secured to the inlet member 18 and is connected by means of a link 279 to the cam lever 280 pivoted at 281 to the intermediate frame 3. The cam lever 280, the link 279, and the arm 277 are carried downwardly at a predetermined time by the means of the cam 282. An arm 283 is pivoted at 284 to the arm 277. The lower end of arm 283 is provided with a knife edge 285 and is adapted to be moved forward by means of the pin 286 secured to the link 271 to a position corresponding to the thickness of the coin being gauged.

The arm 283 is carried downward by the operation of the cam 282 through the means described and the knife edge 285 if forced to travel in a vertical path by reason of being held in one of the notches of the scale weight adjusting keys to be hereinafter described. The arm 283 is allowed to adjust itself to the vertical movement by means of the member 287 pivoted on the arm 283 at 288 and held against the pin 286 by means of the spring 289. The link 279 and the arm 283 are adjustably secured to the arm 277 by means of the bearing 290 (Figure 39) adjusted by means of the screw 291 and nut 292 and secured in the slots 293 by suitable locking means 294.

Referring more especially to Figures 43 and 45, a swinging coin chute 295 having a coin passage 296 is pivoted to the coin inlet member 18 by an adjustable anti-friction bearings 297. The swinging chute 295 is provided with a bracket 298 on which is pivoted the link 299 connected at 300 to the short arm of the bell crank lever 301 pivoted to the coin inlet member 18 at 302. The long arm of the bell crank lever 301 is provided with a lug 303 extending through the slot 304 in the coin inlet member and adapted to rest upon the periphery of the coin when the swinging chute 295 is swung by the means hereinafter described, the diameter of the coin thereby limiting the movement of the swinging chute 295.

The movement of the swinging chute 295 is controlled by the cam 305 illustrated in Figure 41 mounted on shaft 13. A cam lever 306 is pivoted on the bracket 307 secured to the intermediate frame 3 and is provided with a roller 308 adapted to engage the cam 305. The cam lever 306 is connected by means of a link 309 to the locking lever 310 pivoted at 311 to the bar 7, illustrated in detail in Figure 44. An arm 312 on the locking lever 310 is provided with a catch 313 adapted to engage the lug 314 on a collar secured to the rock shaft 315. An arm 316 is also secured to rock shaft 315 and is provided with notches 317 adapted to engage the lug 318 on the swinging chute 295. An adjustable stop 319 is provided for the swinging chute 295 when in its initial position. Arms 320 and 321 are provided on the link 310, as illustrated in Figure 45, and are connected by means of springs 322 and 323 to the arms 324 and 325 secured to the swinging chute 295. When the cam lever 306 and the link 310 are moved forward in the direction of the arrow, the springs 322 move the swinging chute 295 on its pivot 297 until it is stopped by the lug 303 on lever 301 resting on the periphery of the coin, the springs 322 allowing the cam lever 306 and link 310 to complete their forward movement. When the link 310 is returned to its initial position through the operation of the cam 305, the springs 323 carry the swinging chute 295 towards its initial position until stopped my means of the hook 326 on the arm 327 pivotedly secured to the swinging chute 295, engaging one of the stops 328, 328$^a$, 328$^b$ or 328$^c$ corresponding to the thickness of the coin. The hook arm 327 is provided with an adjustable stop 327$^a$ adapted to engage the swinging coin chute 295 to prevent undue friction between the hook 326 and the top of the frame member 330. The hook arm 327 is held in operative position by means of spring 327$^b$. These stops are raised into the path of hook 326 by means of the levers 329—329$^a$, 329$^b$ and 329$^c$ to which they are secured, these levers being pivoted on a cross frame 330 at 331. The cross frame 330 is supported on the tie bars 6 and 7. Levers 329, 329$^a$, 329$^b$ and 329$^c$ are connected to the key levers 332, 332$^a$, 332$^b$, and 332$^c$ by means of the adjustable links 333 and pins 334 operating in slots 335 (Figure 46). The levers 332, 332$^a$, 332$^b$ and 332$^c$ are pivoted at 336 and extend through slots in the intermediate frame 3 and are provided with keys 337, 337$^a$, 337$^b$ and 337$^c$, which keys are provided on their upper ends with notches 338, more fully illustrated in Figure 37, adapted to be engaged by the knife edge 285 on the arm 283 and are carried downward by the movement of the arm 283 in the operation of gauging the thickness of the coin, previously described.

It will be understood that it is desirable in practice to have the machine accept standard coins, which have been somewhat worn, and therefore thinner than new coins. The amount of wear which will be allowed and still have the coin accepted by the machine, is determined by the width of the keys 337, 337$^a$, 337$^b$ and 337$^c$, the keys being adjustably secured to the key bars 332 by means of the screw 339 and slots 340, for example. In assembling the machine, the keys 337, 337$^a$, 337$^b$ and 337$^c$ are so adjusted that the coin of standard thickness would cause the knife edge 285 to engage the first notch of the corresponding key, the width of the key therefore determining the amount of wear allowed. In case the coin is worn more than the predetermined amount, the knife edge 285 would be carried beyond the key corresponding to the coin being gauged, and the corresponding stop will not be raised and the swinging chute will return to its initial position before the coin is delivered to the scales as hereinafter described.

In case the coin is so thin that the knife edge 285 is carried beyond the key corresponding to the diameter of the coin and depresses one of the other keys, its corresponding stop will be raised, but the diameter of the coin will prevent the swinging chute from swinging to a point where the hook 226 will catch the raised stop, and the swinging chute will return to its initial position before the passage of the coin. In case the coin, check or slug being gauged is thicker than a standard coin of the same diameter, the knife edge 285 will not be carried far enough to engage the key corresponding to the diameter of the check, slug or coin that is being gauged, and the corresponding stop will not be raised. In case the knife edge 285 depresses one of the other keys, its corresponding stop will be raised and the swinging chute 295 will be held by the stop corresponding to the key depressed. For example, if the piece being gauged is of the diameter of a quarter and of the thickness of a half dollar, the knife edge 285 will depress the half dollar key 337 and the half dollar stop 328 will be raised and the swinging chute will be stopped in alignment with the half dollar scale instead of the quarter scale and the coin will be returned to the customer in the manner to be described later.

The levers 329, 329$^a$, 329$^b$ and 329$^c$ (see Figures 45 and 46) are provided with extensions 341 passing through and guided by slots 342 in the intermediate frame 3. A pawl 343 is pivoted to the extension 341 and is provided with a catch 344 adapted to engage the cross bar 345, of the frame 330, when the keys 337 are depressed, thereby holding the stops 328 in their raised position until the operation of the swinging chute 295. Pawl 343 (Figure 46) is held in operative position by means of the spring 346 and a stop 347. A bail like member 348 is secured to a rock shaft 349 mounted on the frame member 330 and is provided with an arm 350 extending through an opening in the intermediate frame 3. A cam 351 is secured to the shaft 13, and at a predetermined time engages the roller 352 on the bell crank lever 353 pivoted to the frame 3, thereby depressing the arm 350 causing the bail 348 to release the pawl 343 and the lever 329 is returned to its initial position by means of the spring 354. A spring 355 holds the bail 348 out of engagement with the pawl 343. Springs 356 are provided for the purpose of returning the levers 332 to their initial position. A stop 357 is provided to limit the return movement of the key levers.

When the swinging chute 295 is in position and ready for the passage of the coin, the stop 131 (Figures 41, 42 and 43) is removed from the path of the coin and the coin is allowed to roll through the swinging chute and into its corresponding scale to be later described. The stop 131 is formed on the arm 359 pivoted at 360 on the inlet member 18, (Figure 41) and normally extends through the opening 361 and into the path of the coin. The stop 131 is provided with a curved face 362 (Figure 42) adapted to hold the coin in position to be gauged by the member 260 and is also provided with a beveled lip 363 for the purpose of starting the coin while the stop is being removed and to prevent the coin from sticking to the wall of the member 18. The stop 131 is removed from the path of the coin by means of the pin 364 mounted on the cam member 305, on the shaft 13, and adapted to engage the cam surface 365 on the lever 366 pivoted to the tie bar 6 and connected to the stop arm 359 by means of the link 367.

Referring now to Figures 45 and 46, weighing members 368 are pivoted by means of suitable anti-friction bearings 369 to the bracket 370 which is secured to the tie bars 6 and 7 in any suitable manner.

The bracket 370 is provided with upwardly extending arms 371 connected by the cross bar 372 provided with adjustable stops 373 for the purpose of holding the weighing members 368 in position to receive the coin from the swinging chute 295, when the coin passage 296 is brought into alignment with the coin compartment 374 of the scales 368, the swinging chute being held in alignment during the passage of the coin by means of one of the notches 317 on the member 316, as illustrated in detail in Figure 44. Scale members 368 are provided with adjustable weights 375 adapted to be locked in position on the arm 376 by means of the locking screw 377. The scales are locked in position to receive the coin by means of the members 378 pivoted on the rod 379 supported by the arms 371. The scale members 368 are provided with a rearwardly extending lug 380 adapted to be engaged by the catch 381 on the locking member 378. The locking member is held in engagement with the lug by means of the spring 382.

While it will be understood that a single scale may be used for all coins, I have illustrated in Figure 45 a scale for each denomination of coin used. It will be readily understood from the operations previously described that any coin not coming within the prescribed limits as to thickness will not enter the scale corresponding to its diameter, but will be delivered to one of the scales adapted to weigh a much heavier coin.

An automatically adjustable scale weight 383 is pivoted on the bearing 369 and is held in position by means of the frictional contact of the spring 384 secured to the scale member 368. A stop 385 on the scale member 368 and the slot 386 in the scale weight arm are provided to limit the movement of the scale weight. The scale weight 383 is normally adjusted on the side of the scale member 368 so that a coin of standard weight will tilt the scale member when the same is unlocked and roll into its respective compartment in the finder chute 387. It will be readily understood that in order that the scale member 368 may be tilted by good coins which have been worn until they are of lighter weight than the standard coins, yet are still within the limits of weights desired to be retained by the machine, the scale weight 383 must be moved forward or adjusted to a position relative to the thickness of the coin. In case the coin is of the prescribed diameter and thickness, but is of lighter material than the standard coin, it will not tilt the scale but will be retained until disposed of in a manner hereinafter described.

The scale weight 383 is automatically adjusted to a position corresponding to the thickness of the coin by means of the depression of the key levers 387' connected by the links 388 to the arms 389 of the bell crank levers 390 pivoted to brackets 391 and connected to the members 392 pivoted to the bracket 370. Member 392 is provided with a cam surface 393 adapted to engage the arm 394 on the scale weight 383. Thus it will be seen that a depression of one of the key levers 387 will cause a corresponding movement of the scale weight 383. The key levers 387' are provided with keys 395 which are adapted to be depressed by the downward movement of the arm 283 and knife edge 285 in the same manner and at the same time that the keys 337 are depressed, as previously described. The key levers 387' are returned to their initial position by means of springs 387ª.

The tops of the keys 395 are notched in a similar manner to those of the keys 337 in order to engage the knife edge 285, each successive notch being higher than the preceding one, as shown in Figure 37, so that the keys will be depressed a distance corresponding to the notch engaged, and the scale weight 383 will be adjusted to correspond to the thickness of the coin. A key 396 similar to keys 337 and 337ª is provided in alignment with the dollar key 395, and is secured to the lever 397 which is also pivoted at 336 and held in position by one of the springs 356, in the same manner as the key levers 332. The key 396 is also provided with notches on its upper end and is for the purpose of holding the knife edge 285 in a vertical path during its downward stroke until it engages one of the notches in the key 395.

A bail like member 398 (Figure 51) is supported in bearings 399 and 400 on the bracket 370 and is provided with a pinion 401, meshing with the rack 402, on the rack member 403 operated by means of the cam 404, on shaft 13. The rack member 403 is guided by means of rollers 405 mounted in the casing 406 which is secured to the front tie bar 6. The rack member 403 is provided with a roller 407 operating in cam slot 408 in the cam 404 prior to the adjustment of scale weight 383. The bail member 398 is swung backwardly by the means just described to the position shown by the dotted lines in Figure 46 and is held in this position until the adjustment of the scale weight and until the coin has been deposited in the scale through the swinging chute, thus allowing the arm 394 of the scale 383 to be moved rearwardly in the operation of adjusting the scale weight. The bail 398 is then moved to the position shown in Figure 48 by the further revolution of the cam 404 and forces the scale lock 378 out of engagement with the lug 380, thereby releasing the scale and allowing the coin to tilt the scale and drop into the finder chute 387, in case it is of the correct weight.

In case the coin being weighed is too light to tilt the scale, it will be held for a predetermined time, and then tilted by means of a further movement of bail like member 398 acting against the downwardly extending arm 409 on the scale member 368.

Finder chute 387 is provided with partitions 410 dividing the chute into compartments corresponding to the scales, as illustrated in Figure 56. A coin finder bar 411 operates through the openings 412. A coin holder 413 operates through the openings 414 in the finder chute 387 in a manner to be described later.

The coin finder bar 411 is provided with an inclined surface 410ª. This finder bar is so arranged that when a coin is dropped from the scale on its inclined surface 410ª, it will roll into the chute 414' and be returned to the customer through the bad money chute 116 to the change pocket 133 but at the time that a coin of standard weight is dropped into the finder chute 387, the finder bar 411 has been withdrawn from the chute by means to be described later and the coin drops on and is supported by the coin holder 413 and is disposed of in a manner hereinafter described.

It will be understood, that what is commonly termed the "Buffalo" nickel, on account of its deeper depressions is of lighter weight than other coins of the corresponding diameter and thickness. The scales would therefore require a further weight adjustment in order to allow the scale to be tilted by the lighter coin. This is accomplished by means of mechanism illustrated more in detail, in Figures 37, 45 and 50.

A rock shaft 415 is supported in suitable bearings on the arms 371 of the bracket 370. This rock shaft is normally held in position by means of the pin 416 on the arm 417, engaging the catch 418 on the armature 419 of the magnet 420. The rock shaft 415 is provided with a weight 421 loosely mounted on said rock shaft and supported by means of the stop 422 on the rock shaft 415. The weight 421 is provided with an arm 423 extending behind but not in contact with the nickle scale, as illustrated in Figure 50. When the weight 421 is released by the movement of the stop 422, the arm 423 is pressed against the scale, the weight 421 being of sufficient size to assist in tilting the scale at the predetermined time. The rock shaft 415 is operated by means of the spring 424 when the armature 419 is raised by the magnet 420. The magnet is supported on the tie bar 7 by means of the bracket 425. The rock shaft 415 is provided with a downwardly extending arm 426 and is reset by the bail member 398 during its further backward movement, after the coin has been weighed, as clearly illustrated by Figure 50. In order that the magnet may be energized at the proper time, I provide a member 427 loosely mounted in an opening 428 in one of the ribs 276 of the thickness-gauge 260. In the operation of the thickness-gauge, the projections 429 of the gauge member 427 are pressed against the face of the coin by means of the spring 430, one of the projections 429 being near the periphery of the coin where the greatest depressions occur in a Buffalo nickel. In case the depression is of such a depth that the coin will be light in proportion to its thickness and diameter, the contact arm 431 of the gauge member 427 will be moved to the position shown in Figure 50 and will close the circuit 432 through the contact member 433, thereby energizing the magnet 420 by means of the battery 434, the frame of the machine being used as a part of the circuit 432.

In case of a smooth coin, or one in which the variations are not so great as in the Buffalo nickel, the arm 431 will be held more nearly in the position shown by the dotted lines in Figure 50 and will not close the circuit 432.

Referring to Figure 45, the swinging chute 295 is provided with a safety door 295ª held in position by means of the spring hinge 295ᵇ. The door is provided so that in case the coin fails to completely enter its respective scale the chute 295 will be allowed to make its return movement through the operation of the spring door in passing in the coin.

It will now have become apparent that by series of tests of true coin characteristics objects other than the true coins will have been rejected, and that a true coin, by virtue of having passed all the tests, and particularly because of its having responded to the diameter test which generally distinguishes the coin value, will have been deposited in that one of the chutes appropriate to coins of that denomination. So positioned the coin acts as a stop by which automatically operated credit mechanism is limited in setting movement, thereby to fix the credit, or limit the aggregate extent to which, only, commodity sales and change delivery may be made. Thus the credit mechanism co-operates with the value testing or determining means to effect coin-controlled setting of the credit. I will next describe the means for accomplishment of these results.

Generally speaking, the credit is established by conditioning the change dispensing mechanism to deliver appropriate change, (in this instance to the amount of one-cent less than the face value of the tested coin) and in a general way I handle the change by providing certain parts that have two movements, one for setting, the other for change delivering. Specifically these parts are sleeves which are both slidable and rotatable, sliding to effect actual change delivery, rotating to effect setting and resetting of the credit limit or amount of change to be delivered. In this sense mechanisms involving in the issuance of change, and operating to slide said sleeves or operated to dispense change-coins by reason of their sliding, may be regarded as portions of the change-delivering mechanism, and mechanism concerned with the rotative setting of these sleeves may be regarded as portion of a credit mechanism which, as hereafter shown, is appurtenant to, and controls, both the change-delivery and the article-delivering means. It will be understood, however, that in its broader aspect I do not limit the change dispensing mechanism to apparatus having such sliding and rotating parts or sleeves.

When the coin has successfully passed all of the tests, previously described, and is finally supported on the coin holder 413 in the coin finder chute 387, it is necessary to set up the credit mechanism in such a manner that the face value of the coin less one cent, may be withdrawn from the machine either in stamps or change by the means which I will now describe. I provide a frame 435 (Figures 56 and 57) secured vertically to the side frame 2 having pivoted thereto at 436, a finder bar frame 437 having an upwardly and forwardly extending arm 438 terminating in the coin finder bar 411. Credit keys 439 and 440, and a universal key 441 are movably attached to the frame 435 by means of the bracket 442 and pivot pin 443, extending through slots 444 at the lower end of the keys. The keys are also attached to the finder bar frame 437 by means of the bracket 445 and the pins 446 extending through the slots 447 near the upper end of the keys. After the coin is in position upon the coin holder 413, the finder bar 411 is brought forward until it strikes the coin, as illustrated in Figure 56, thus bringing the corresponding key into alignment with the key plunger member 448. When the member 448 is moved downwardly by means described later, the corresponding key will be depressed. In the particular form illustrated, I have shown the coin in the dollar compartment 387ª of the finder chute 387, the chute also being provided with compartments 387ᵇ, 387ᶜ, 387ᵈ and 387ᵉ, adapted to receive the half dollar, quarter, nickel and dime, respectively. The finder bar frame 437 is operated by means of a cam 449 on shaft 13, the cam lever 450 pivoted to the frame 435 at 451, and a rod 452 pivoted to the cam lever 450 and supported at its other end by the collar 454 pivoted to the link 455, which is pivoted at 456 on bracket 457. Finder bar frame 437 is provided with a bracket 458 (Figure 58) on which is pivoted the member 459 having a depending arm 460 slidably mounted on the rod 452. A spring 461 is mounted on the rod 452 for the purpose of allowing the cam 449 to continue its revolution after the finder bar frame has been stopped by the finder 411 engaging a coin. The rod 452 is provided with a shoulder 462 adapted to engage the arm 460 of the member 459 in order that the finder bar frame 437 may have a positive backward movement. An upwardly extending bifurcated arm 463 is provided on the member 459, as shown in detail in Figure 59 and is adapted to be used as a safety stop for the five cent change rod to be referred to later and also to prevent any lateral movement of the member 459.

Referring again to Figure 56, the dollar and half dollar credit key 439 is provided with steps 464 and 465 adapted to be engaged by the plunger 448 when the finder bar 411 is stopped by the dollar and half dollar respectively. The dollar and half dollar credit key 439 is also provided with a lug 466 adapted to engage either the dollar stop 467 or the half dollar stop 468 depending upon the position of the key. These stops are for the purpose of preventing an overthrow of the keys. The dime and nickel credit key 440 is also provided with steps 469 and 470 corresponding to the nickel and dime respectively, and it will be seen that when the finder bar 411 is stopped in its forward movement by either the dollar, half dollar, nickel or dime in their respective compartments, the corresponding key will be brought under the key plunger 448 and will then be in a position to be depressed by the further operation of the machine. The credit key 440 is also provided with a lug 471 adapted to engage either the nickel stop 472 or the dime stop 473 depending upon the position of the credit key, a credit key not being necessary for the twenty-five cent coin, for reasons that will be explained later.

The universal key 441 is provided with a wide face 474 so that it is depressed with either of the other keys. The credit key 440 is provided with a rib 475 extending over the shoulder 476 of the plunger 448 to prevent the key from travelling faster than the plunger in its downward stroke. The credit key 440 and the universal key 441 are provided with springs 477 and 478 respectively for the purpose of returning them to their initial position.

Referring now to Figures 65 and 66, the keys are depressed at a predetermined time by means of the cam 479 on the shaft 13 acting through the roller 480 on the cam lever 481 pivoted at 482 on the bearing rod 767 supported in brackets 768 on the top frame of the money changer, shown more in detail in Figures 70 and 74 and connected to the credit money bar lever 483 by means of the link 484, the lever 483 being pivoted at 485 to the back tie bar 7. The key plunger member 448 is slidably secured to a bracket 486 on the tie bar 7 by means of screws 487 in the slot 487$^a$ and is secured to lever 483 by means of the pin 488 in the slot 489. Thus it will be seen that at each revolution of the cam shaft 13, the key plunger 488 will be depressed.

In order that the credit money bar lever 483 may be held more securely in its initial position, and the plunger 448 be prevented from any interference with the tops of the credit keys during their adjustment through any lost motion in the money bar connections, a member 483$^a$ is pivoted at 483$^b$ on the tie bar 7 and provided with a roller 483$^c$ adapted to engage in the cam notch 483$^d$ in the money bar lever 483 and is held in position by means of a spring 483$^e$. The member 483$^a$ is also provided with a stop 483$^f$ adapted to engage the stop 7$^a$ on the tie bar 7 and holds the member 483$^a$ in position so that roller 483$^c$ will engage cam notch 483$^d$ upon a return stroke of the money bar lever 483.

In case there is no coin in the finder chute 387 the credit keys will all be carried inwardly beyond the plunger 448 and no credit will be set up. At the same time the contact member 490 secured to the coin finder frame 435 and shown in detail in Figure 67 will close the circuit 491 through the insulated contact member 492 and the alarm 246 will be sounded indicating that a coin has been rejected by the machine, the frame of the machine being used as a part of the circuit 491.

Referring now to Figures 54 and 55, in practice it has been found desirable to set up the machine so that all credits will be in pennies, nickels and quarters, as it has been found that all combinations of stamps and change may be delivered to the customer by the use of fewer parts and less complicated mechanism. This is accomplished by means of change rods 493, 494 and 495 supported upon the frames 2 and 3 in suitable bearings on which, by means later described, is set up credit in pennies, nickels and quarters respectively. A change rod sleeve 496 is slidably mounted on the one cent change rod 493, and change rod sleeves 497 and 498 are mounted in a similar manner on the change rods 494 and 495 respectively. The change rods are preferably square in cross section so that the sleeve may be revolved with the change rods. A change carriage 499 is slidably mounted upon rods 500 and 501 also supported upon frames 2 and 3. The change rod sleeves are also rotatably engaged by the carriage 499 in the grooves 502. The carriage 499 is provided with a laterally extended arm 503 provided with rollers 504 adapted to engage the cam grooves 505 in the periphery of the cam wheel 506 mounted in suitable bearings on frame 3 and subframe 4. Thus it will be seen that during each revolution of the cam wheel, the carriage 499 and the change sleeves 496, 497 and 498 will be moved a predetermined distance and returned to their initial position. Change lever 507 adapted to operate a change delivering mechanism to be described later is adapted to be engaged by the rollers 508, 509, 510 and 511 on the one cent change sleeve. These rollers are so located on the circumference of the sleeve, as illustrated in Figure 54, that when the roller 508 is in engagement with the change lever 507, the lever will be carried the full distance of the travel of the carriage 499 causing the change mechanism later described to deliver four cents to the change pocket. In case the roller 509 is in position to engage the lever 507 during the travel of the carriage 499 it will be seen that the change lever 507 will only be carried a distance relative to three fourths of the distance travelled by the carriage, thereby delivering only three cents to the change pocket. In the same manner, it will be understood that the rollers 510 and 511, when brought into position to engage the change lever 507, will deliver either two cents or one cent respectively. The change sleeve 497 is also provided with rollers 512, 513, 514 and 515, these rollers are adapted to engage the nickel change lever 516 and deliver to the change pocket four, three, two or one nickel respectively, in the same manner as described for cents. The change sleeve 498 is also provided with rollers 517, 518 and 519 adapted to engage the quarter change lever 520 and deliver to the customer three, two or one quarter respectively in the same manner as the nickels. Thus it will be seen that when a silver dollar is inserted in the machine and the change rod sleeves are revolved to a position where the change rollers 508, 512 and 517 will engage the change levers 507, 516 and 520 and the carriage 499 is moved the predetermined distance, four pennies, four nickels and three quarters will be delivered to the customer, the machine retaining one cent for its services. It will be readily understood that by a proper adjustment of the change sleeves, any other necessary combination of change may be delivered. In case it is desirable any or all of the change sleeves may be rotated to such a position that the change levers will not be engaged by the change rollers and no change will be delivered upon movement of the carriage.

I will now describe the mechanism used for the purpose of rotating the change rods 493, 494 and 495 for the purpose of bringing the change rollers into position corresponding to the value of the coin in the coin chute 387 less one cent.

The change rods 493 and 494 are provided with a five slot split Geneva movement (Figures 54, 56, 60 and 61) comprising the slotted member 521 secured to the nickel change rod 494 and the locking member 522 slidably mounted on the one cent change rod 493. The member 523 is secured to the one cent change rod 493 and carries the transfer pin 524. The five cent change rod 494 and quarter change rod 495 are also connected by a four slot split Geneva movement comprising the slotted member 525 secured to the change rod 495 and a locking member 526 slidably mounted on the change rod 494. The member 527 is secured to the five cent change rod 494 and carries the transfer pin 528 for the purpose of engaging the slots in the slot member 525. These Geneva movements are of the well known type and are used for the purpose of subtracting from the credit an amount corresponding to the value of the stamps purchased by the customer. In order that the change rods may be rotated individually in setting up a credit, the locking members 522 and 526 must be moved out of engagement with the slotted members 521 and 525 respectively. This is accomplished by means of the cam 529 on the periphery of the cam member 404 on shaft 13 and operating through the rollers 530. The arm 531 is mounted on the rock shaft 532, which is in turn mounted in suitable bearings on the bracket 533 secured to the side frame 2. The rock shaft 532 is provided with an arm 534 provided with rollers 535 adapted to operate in the groove 536 in the sleeve 537 slidably mounted on the one cent change rod 493 and to which the locking member 522 is secured. An arm 538 is also secured to the rock shaft 532 and provided with rollers 539 adapted to operate in the groove 540 in the sleeve 541, slidably mounted on the nickel change rod 494 and to which the locking member 526 is secured. Springs 542 are secured to the change rods 493 and 494 and are provided with rollers 543 bearing against the inclined surfaces 544 for the purpose of the holding of the locking members securely in their positions. Thus it will be seen that during the revolution of the cam shaft 13, the locking members 522 and 526 will be moved to the position shown by the dotted lines in the Figure 60 so the change rods may be rotated individually in the setting up of the credit. When the locking members are in the position shown by the dotted lines (Figure 60) the rollers 543 on the springs 542 engage the notches 545 and hold the locking members in their unlocked position while the credit is being set up. The change rod 493 is provided with a pinion 546 having pin teeth 547 adapted to be engaged by the gear segment 548 pivoted at 549 on the frame 435.

Referring now to Figure 67, the gear segment is operated by means of a cam 550 on shaft 13 and through the cam lever 551 pivoted at 552 on the side frame 2 and connected by means of a link 553 to the arm 554 on the sleeve 555, pivotally mounted on the brackets 457 of the frame 435. The sleeve 555 is also provided with an upwardly extending arm 556, also shown in Figure 57, which is connected to the arm 557 on the gear segment 548 by means of the link 558. Thus it will be seen that with each revolution of the cam shaft 13, the gear segment 548 will be raised a predetermined distance and returned to its initial position.

Referring now to Figure 61, the pin teeth 547 of the pinion 546 are so arranged that when the change rod 493 and sleeve 496 are in position shown in Figure 54, showing four cents credit, the teeth of the gear segment 548 will not engage the pin teeth 547 during the movement of the segment.

A pinion 559 is secured to the nickel change rod 594 and is provided with pin teeth 560 adapted to be engaged by the gear segment 561. The gear segment is pivoted at 549 and is also operated coincidentally with the gear segment 548 as by means of an arm 562 secured to the sleeve 555 and connected to the gear segment 561 by means of the link 563. Thus it will be seen that the gear segment 561 makes a full downward movement and returns to its initial position shown in Figure 61 during each revolution of the cam shaft 13. It will also be seen that when the nickel change rod is in a position shown in Figure 54 with a credit of four nickels, the pin teeth 560 will not be engaged by the teeth of the gear segment 561 during its movement, but when either or both of the change rods 493 and 494 have been left in any other position than that shown in Figure 54, they will be returned to that position indicating a credit of twenty-four cents by the movement of the gear segments 548 and 561 before the credit keys are operated. A pinion 564 is secured to the quarter change rod 495 and adapted to be operated by the gear segment 565, (Figure 56) pivoted at 566 on the frame 435 and provided with a lug 567 adapted to engage a stop 568 on the frame 435, for the purpose of limiting its downward movement. The gear segment 565 is adapted to be raised a predetermined distance through the operation of the dollar and half dollar credit key 439 to which it is secured by means of the link 569. When the quarter credit rod 495 has been left in any other position than that shown in Figure 54, the gear segment 565 will be in a raised position corresponding to the position of the change rod, and during the operation of the gear segment 561 will be returned to its initial position shown in Figure 56 by means of the roller 570 secured to the link 563 engaging the gear segment 565 during its movement.

Thus, it will be seen that before the operation of the credit keys the change rods are always in the position illustrated in Figure 54 indicating a credit of four cents, four nickels, and no quarters. The reason for always setting the change rods in this position before the operation of the credit keys is that by this arrangement, it is only necessary to revolve one of the change rods in order to set up any desired credit. For example, in case a quarter is inserted in the machine, no movement of the change rods will be necessary. In case a dollar is inserted in the machine, it will be necessary to revolve the quarter change rod three fourths of a revolution, bringing the roller 517 in a position to engage the change lever 520. The machine then will show a credit of three quarters, four nickels and four cents, or ninety-nine cents. In case a half dollar is inserted in the machine, it is only necessary to revolve the quarter change rod one fourth of a revolution, showing a credit of one quarter and the other rods showing twenty-four cents, making a total of forty-nine cents. When a nickel is inserted in the machine, the nickel change rod is revolved four fifths of a revolution or until no credit is shown in nickels. There will then remain a credit of four cents on the one cent change rod. In case a dime is inserted, the five cent change rod will be revolved only three fifths of a revolution or until a credit of one nickel is shown, which, together with the four cents shown on the one cent change rod, makes a total credit of the required amount, nine cents.

It will therefore be understood that by the arrangement shown, the minimum number of operations and parts will be required to obtain the desired results.

It will be seen by reference to Figure 56 that with the parts in the position shown, a credit of ninety-nine cents will be desired and the plunger 448 in its downward movement will engage the dollar step of the credit key 439, making a full movement of the key and segment and setting up the corresponding credit of three quarters, while in case a half dollar is in the compartment 387$^b$ of the chute 387, the credit key 439 will be carried forward to a position where the plunger 448 in its downward movement will engage the half dollar step 465, causing a limited movement of the credit key 439 and gear segment 565, thereby setting up a credit of only one quarter on the quarter change rod 495.

The pinion 559 is also provided with pin teeth 571 adapted to be engaged by the teeth 572 on the gear segment 573, as illustrated in Figures 62 and 63. A short tooth 574 is also provided on pinion 559 and adapted to be engaged by the offset tooth 575 on the gear segment 573. This gear segment is also pivoted at 549 and is connected to the dime and nickel credit key 440 by means of links 576. During the movement of the key 440, the segment 573 will be raised a predetermined distance and returned to its initial position. A lug 577 is provided on the segment 573 and is adapted to engage the frame 435 and limit the downward movement of the segment. The key 440 being provided with a nickel step 469 and dime step 470, as previously described, it will be understood that the position of the key steps under the plunger 448 will determine the movement of the segment 573. As previously stated, before the credit keys are operated, the nickel change rod 494 is always left in the position to show a credit of four nickels, and this leaves the pins 571 and the short pin 574 in the position relative to the segment 573, shown in Figure 62. When the credit key 440 is depressed by the plunger 448 engaging the nickel step 469, the segment 573 will be carried its full stroke or to the position shown in Figure 63ª, the segment 573 having an extended portion 578 adapted to prevent any overthrow, as illustrated.

Segments 548 and 561 are also provided with similar extensions to prevent the overthrow of the change rods 493 and 494. When the plunger 448 engages the dime step 470, the segment 573 will be carried to the position shown by Figure 63, thus revolving the nickel change rod three fifths of a revolution, leaving a credit of one nickel on the nickel change rod.

It will be seen by reference to Figure 63 that all the pins 571 and the short pin 574 are required in order to complete four-fifths of a revolution of the five cent change rod 494 and to bring it into the position shown. When it is desired to move the change rod only three-fifths of a revolution, as shown by Figure 63, the short pin 574 will not be in the path of the segment teeth 572 while it is returning to its initial position. When it is desired to leave the change rod in the position shown in Figure 63, it is desirable to provide a stop to prevent the overthrow of the five cent change rod. This is accomplished by means of the lugs 579 on the collar 580 secured to the five cent change rod 494, as illustrated in detail in Figure 59. The lugs 579 are adapted to engage the bifurcated arm 463 on the member 459 when the finder frame 437 is moved to a position where the dime step of the credit key 440 is in position to be engaged by the plunger 448.

Referring to Figure 56, it will be noticed that the universal key 441 is adapted to be depressed by the plunger 448 coincidentally with the depression of either one of the credit keys 439 or 440. During its downward movement the lower end of the universal key engages the arm 581 secured to the rock shaft 582 which extends longitudinally between the frames 1 and 2 and is supported in suitable bearings thereon. The universal key 441 is for the purpose of operating to set up the mechanism illustrated more in detail in Figure 96, and which will be later described in such a manner that the amount of credit set up by the coin inserted may be withdrawn from the machine, either in stamps or change, or partially in stamps and the balance in change. The register or counter 583 is secured to the side frame 2 and is operated by means of the arm 584 operating in the slot 585 in the member 586 secured to the arm 581. Thus it will be seen that each downward movement of the universal bar will be registered by the counter 583, thus giving a complete record of the number of operations of the credit mechanism.

It will be understood that after the change rods have been operated by any of the segments, it is desirable to lock them in position during the return movement of the segments and the Geneva lock members. This is accomplished by means of the cam surfaces 586 and 587 on the cam 550, (Figure 67) engaging the roller 588 on the lever 589 pivoted at 590 on the frame 2. The lever 589 is held in operative position by means of spring 591. A locking member 592 is pivotally connected to the lever 589 and slidably mounted on the frame 2 by means of the screw 593 in the slot 594. The locking member is provided with lugs 595 adapted to engage the springs 596 on the pawls 597. These pawls are pivoted at 598 on the frame 2 and are adapted to engage the star wheels 599 on the change rods and prevent any movement of the same when the pawls are locked in engagement with the star wheels by the locking member 592. When the pawls are unlocked they are held in position by means of the springs 600 and are so designed as to allow the change rods and star wheels to be freely revolved by the movement of the segments. The cam face 586 is adapted to lock the change rods during the return movement of the segments 548 and 561, and the cam face 587 is adapted to lock the change rods during the return movement of the segment 573 and the Geneva lock members 522 and 526.

A change holding and delivering section located in a position adjacent the change rod sleeves, is fully illustrated in Figures 69 to 74 and comprises a base plate 601 and top plate 602 secured in any suitable manner to the intermediate frame 3 and also supported by means of the arm 603 on one of the brackets 457 of frame 435. A vertical bearing member 604 is secured to and supported by the plates 601 and 602. Gears 605, 606 and 607 are mounted on the bearing member 604 and are adapted to engage the pinions 608, 609 and 610 respectively. Pinion 608 is mounted on a vertical shaft 611 also supported by the plates 601 and 602 and having a change ejecting disc 612 secured thereto. The ejector disc is provided with openings 613 which are adapted to pass under the coin tube 614 which is secured in any suitable manner to the base plate 601 and passes through and is also secured to the top plate 602. The coin tube 614 is so arranged as to provide an opening 615 slightly greater than the thickness of one cent between the coin tube and base plate 601. The ejector disc 612 is slightly thinner than the coins to be ejected and the coin openings 613 are adapted to pass through the opening 615 and to engage the bottom coin in the coin tube 614. The edge of the openings 613 are slightly thinner at the point of contact with the coin to prevent any danger of engaging more than one coin. The base plate 601 is provided with an opening 616 through which the coin drops during the revolution of the disc 612. The coin then passes through the chute 617 and against the change pocket door 618 from which it is delivered to the change pocket by means hereinafter described. In the construction illustrated, I have shown four coin openings in the disc 612, therefore it will be understood that when the disk 612 has completed one revolution, four cents will have been deposited in the change pocket 133. When it is desired to deposit three cents, only three fourths of a revolution will be made, one half a revolution depositing two cents, and one fourth of a revolution, one cent. In order to accomplish these results, I provide a ratchet 618 on the gear 605 adapted to be engaged by the pawl 619 on the change lever 507 and held in operative position by means of spring 620, the change lever being also mounted on the bearing rod 604 and held against the adjustable stop 621 by means of the spring 622. The stop 621 is mounted on the bracket 623 secured to the plates 601 and 602. The outer end of the change lever 507 extends over the change rod sleeve 496 and is provided with a cam surface 624 and is adapted to be engaged by the rollers on the change rod sleeve during the initial movement of the change carriage 499, as previously described. The carriage is also provided with a cam surface 625 adapted to engage the roller 626 on the change lever 507 and return it to its initial position during the return movement of the carriage. A pawl 627 is pivoted at 628 on bracket 629 and is adapted to engage the ratchet 618 during the return of the change lever 507 to its initial position. Thus it will be seen that one, two, three or four cents will be delivered to the customer depending upon the amount of credit set up on the one cent change rod. The spring 630 is adapted to hold the pawl 627 in engagement with the ratchet 618.

In order to prevent any overthrow of the coin ejector disc 612, I provide a ratchet 631. A pawl 632 is also pivoted at 628 and adapted to engage the ratchet 631 and is normally held in engagement by the spring 633. Before the operation of the change delivery mechanism, the pawl 632 is moved out of engagement with the ratchet 631 by means of the pin 634 on the arm 635 secured to the rock shaft 636. The pin 634 is adapted to engage the slot 637 moving the pawl 632 out of engagement with the ratchet when the rock shaft 636 is operated. This is accomplished by means of the cam 638 on the cam wheel 506 and is shown more in detail in Figures 73 and 64. Immediately before the initial movement of the carriage 499, the cam 638 engages the roller 639 on the cam lever 640 pivoted at 641, the cam lever being connected to the arm 635 on the rock shaft 636 by means of the link 642. The rock shaft 636 is held in position by means of the spring 643 secured to the arm 644.

The mechanism used for the delivery of nickels and quarters is similar to that used in the delivery of cents. The nickel tube 645 is supported by the base plates 601 and 602, and a coin ejector disc 646 is provided with openings 647 adapted to pass under the tube 645 and deliver nickels through the opening 648 and the nickel chute 649 against the change pocket door 618 in the same manner as described for cents. The disc 646 is secured to the shaft 649 mounted in suitable bearings in the plates 601 and 602. Pinion 609 is also secured to the shaft 649 and driven by means of the gear 606, which is in turn operated by means of the change lever 516 which extends over and is engaged by the change rollers on the nickel change rod sleeve 497 during the initial movement of the change carriage 499. The carriage is also provided with a cam member 650 engaging the roller 651 on the change lever for the purpose of returning the change lever to its initial position.

In a similar manner, a quarter ejector disc 652 is mounted on the shaft 653 on which the pinion 610 is secured. This pinion is driven by the gear 607 through the change lever 520 adapted to be engaged by the rollers on the quarter change rod sleeve 498, in the same manner as described for cents and nickels. The ejector disc 652 is provided with openings 654 adapted to pass under the quarter tube 655 and deliver quarters through the opening 656 and the chute 657 and against the change pocket door 618 in the same manner as described for cents and nickels. The quarter tube 655 is mounted on the plate 601 and passes through the top plate 602 in the same manner as the other coin tubes. As the operating and locking mechanisms for ejecting the nickels and quarters is exactly similar to that described for ejecting cents, it is not thought necessary to describe them in detail. The bearing rod 604 is provided with collars 658 and the shoulder 659 for the purpose of supporting the gears 605, 606 and 607.

Referring now more especially to Figures 76 and 77, in order to deliver the coins to the change pocket 133, the change pocket door 618 is secured to the rock shaft 660 supported in suitable bearings on the change pocket member 661 and the intermediate frame 3, and is operated by means of a pin 662 on the cam wheel 506 adapted to engage the arm 663 on the rock shaft 660, as shown in detail in Figure 55. In case of rejected coins, checks or slugs, when they are rejected before the starting of the second cam shaft 13, this door will be opened by means of cam 664 on the first cam shaft 12, operating on the cam lever 665 which is connected by means of a link 666 to the arm 667 on the rock shaft 660. In case the coin or slug is rejected after the first cam shaft has completed its revolution, the door is opened by means of cam 668 on the second cam shaft 13 operating on the cam lever 665. The door is held in its closed position by means of the spring 669. To prevent the door closing before all of the coins have passed into the change pocket, I provide a dash pot 670 mounted on the bracket 671 secured to the intermediate frame 3 and operated from the rock shaft 660 by means of the arm 672.

As has been previously stated, the change carriage 499 is moved a predetermined distance and returned to its initial position by means of the rollers 504 engaging the cam grooves 505 in the cam wheel 506, these grooves being so designed that the coin ejector discs are momentarily stopped while the coin is entering or being discharged from the openings therein.

In order to deliver the change to the customer in the manner previously described, the cam wheel 506 must be started by pressing the change button 673 which operates through the mechanism which has been set in operative position by the depression of the universal key 441. This will be more readily understood by reference to Figure 97.

A pin or stop 674 is provided on the periphery of the cam wheel 506 and is adapted to be engaged by the escapement pawl 675 pivoted on the arm 676. The pawl is provided with a stop member 675ª adapted to engage the arm 676 and prevent the overthrow of the cam wheel 506. The movement of the pawl on the arm 676 is controlled by means of the spring 677. The arm 676 is secured to the rock shaft 582 and is provided with an arm 678 to which the spring 679 is attached to return the rock shaft to its initial position. This will be more clearly understood by reference to Figure 64. When the rock shaft 582 is operated through the depression of the arm 581 by means of the universal key 441 as mentioned previously, the pawl 675 will be moved out of engagement with the stop 674 and returned to the position shown in Figure 97 and resting on the stop 674, thus allowing the cam wheel to be revolved. When the cam wheel has made one revolution, the stop 674 will again engage the pawl 675, thus preventing any overthrow of the cam wheel.

It must be remembered that in Figure 97 the rock shaft and arms are shown in position after the rock shaft 582 has been operated by the universal key and the rock shaft arms carried to the position shown by the dotted lines and returned to their initial position, and the change button connections are shown in position after having been moved from the initial position shown by dotted lines to the set up position shown in full lines.

An arm 680 is secured to the rock shaft 582 and is provided with a roller 681 and is adapted to operate the rock shaft 682 by engaging the bent arm 683 secured thereto during the initial movement of the rock shaft 582. The rock shaft 682 is also provided with an arm 684 which is adapted to engage the catch 685 on the arm 686 which is pivotally supported on the sub-frame 4. The arm 686 is held in operative position by means of the spring 687. A roller 688 is secured to the arm 686 and is adapted to be engaged by the cam 689 on the cam wheel 506, Figure 64, thus releasing the arm 684 from the catch 685 and allowing the arms 684 and 683 to be returned to their initial position shown by dotted lines by means of the spring 690.

A T-shaped lever 691 is pivoted on the side frame 1 and is provided with an arm 692 to which is pivotally secured the link 693, the other end of which is connected to the bent arm 683 by means of a link 694. The link 693 is provided with a cam-faced lug 695. The T-shaped lever 691 is also provided with an arm 696, engaged in the slot 697 of the change button stem 698 which is slidably mounted in bracket 699 secured to the side frame 1, and is held in operative position by means of the spring 700. When the change button 673 is pushed in the link 693 will be depressed through the movement of the T-shaped lever 691 and the lug 695 engages the roller 701 on the arm 702 which is mounted on the rock shaft 703 mounted in suitable bearings in the frame 1 and the sub-frame 4. This rock shaft is also provided with an arm 704 adapted to engage the spring 53 of the contact member 48, thus closing the contact points 50 and 51 and starting the drive shaft 8 by means of the motor 17. It will be understood that the rock shaft 703 will be operated through the engagement of the lug 695 acting on the roller 701, and will be returned to its initial position by means of the spring 705. It will also be understood that unless the universal key 441 has been depressed and the mechanism set up in operative position, as shown in full lines in Figure 97, the link 693 and the lug 695 will remain in the position shown by dotted lines and the lug 695 will not engage the roller 701, and it would therefore be impossible to start the motor by means of the change button.

The rock shaft 703 is also provided with an arm 706 upon which is mounted roller 707. This arm and roller are shown more in detail in Figure 64. It will be understood that when the rock shaft 703 is operated by the means just described, the roller 707 will be raised, and as soon as the cam wheel 506 starts its revolution will be supported in its raised position on the track 708 mounted on the cam wheel, thereby holding the contact member 48 in its depressed position throughout the revolution of the cam wheel 506.

The rock shaft 703 is also provided with an arm 709, the upper end of which is provided with a cam member 710. The purpose of this cam member will be more readily understood by reference to Figures 12 and 14. In order that the cam wheel 506 may be revolved, it must be driven from the drive shaft 8; this is accomplished by the means which will now be described. The drive shaft 8 is provided with a collar 711 secured to and slidably mounted thereon and operated by means of lever 712 movably supported on bracket 713 on the side frame 1. The lever 712 is provided with a lug or bracket 714 on which is mounted the roller 715. This is shown more in detail in Figure 14. During the operation of the rock shaft 703 (Figure 97) the cam member 710 is moved to the position shown by dotted lines in Figure 14. A roller 710ª is mounted on a lug on the sub-frame 4 and is adapted to engage the side of the cam member 710 and hold it in alignment during its movement. The cam surface 716 on the cam member 710 acting on the roller 715 will move the lever 712 until the pin 717 mounted thereon will be engaged by the catch 718 on the pawl 719 mounted on the side frame 1. The pawl 719 is held in operative position by means of the spring 720. The lever 712 is provided with an arm 721 having at its outer end a catch 722 adapted to engage the lug 723 on the lever 68 and lock the same in inoperative position, thereby preventing the starting of the first cam shaft 12 during the operation of the change cam wheel 506. A spring 724 is attached to the arm 721 for the purpose of returning the lever 712 to its initial position when released by the pawl 719. When the lever 712 is moved by the means described the collar 711 is moved along the shaft 8 until the lug 725 is in position to engage the roller 726 during the revolution of the shaft 8. The roller 726 is mounted on the lever 727, one end of which is pivotally mounted on the bracket 728 on the sub-frame 4. The collar 729 is also secured to and slidably mounted on the shaft 8 and adapted to be moved by the lever 727. A catch 730 on the pawl 719 is adapted to engage the pin 731 on the lever 727 and hold the same in position after it has been moved by means of the lug 725, engaging the roller 726. A pinion 732 is secured to the shaft 8 and is adapted to engage the mutilated gear 733 on the cam wheel 506 more fully illustrated in Figure 64. When the lever 727 is moved by the means described, the collar 729 is moved upon the shaft 8 until during its revolution the lug 734 on the collar 729 engages the lug or long tooth 735 on the gear 733 and turns the gear until the mutilated portion 736 passes beyond the pinion 732 and the teeth of the pinion are in engagement with the teeth of the gear 733. The lever 737 is pivoted on the sub-frame 4 at 738, and is raised by means of the cam 739 secured to cam wheel 506 and acting on the cam surface 740 of the lever 737. One end of the pawl 719 rests upon this lever 737 and is raised by it and is disengaged from the pins 717 and 731 (Figure 12) on the levers 712 and 727 respectively and allows the same to be returned to their initial positions by means of the springs 724 and 741. The spring 741 is secured to the lower end of the levers 712 and 727. If for any reason the lever 727 fails to be returned to its initial position by the spring 741, the cam 742 on the cam wheel 506 engages the roller 743 on the lever 727 and forces the same to return to its initial position. The cam wheel 506 (Figure 64) is held in its initial position by means of the roller 744 engaging the cam notch 745 on the cam wheel 506. The roller 744 is mounted on the lever 746 pivoted on the intermediate frame 3 and held in position by spring 747.

Referring now to Figure 97, if for any reason the change button is not operated, as for example when the customer takes all his credit in stamps, the set up mechanism will remain in the position illustrated by full lines until the lever 21 is again depressed by the opening of the coin inlet door, when the trip rod 75 will depress the lever 686 by means of the pin 686ª in the slot 75ª, thus disengaging the catch 685 from the arm 684 and allowing the set up mechanism to return to its initial position. This places the machine in a condition to give a customer only his correct change or stamps even if the previous customer has for any reason left or forgotten to take his change. Change signs are provided so that in case the machine returns to the customer a good coin, he may know whether the change is out, limited, or ample and may operate the machine accordingly.

These signs are operated by means of the mechanism illustrated in Figures 73, 74, and 75. The coin tubes 614, 645 and 655 are provided with the openings 748 and 749 near the bottom of the tubes. Rods 750 and 751 are supported in these openings, their outer ends being pivotally secured to the pawls 752 and 753. These pawls are pivotally mounted on the bearing rod 754. A rock shaft 755 is mounted in brackets 756 on the base plate 601 of the change section. The rock shaft 755 is provided with arms 757 to which is secured the rod 758 adapted to engage the arms 759 on the pawls 752 and 753 and hold the same in position to be engaged by the pins 760 and 761; on the rods 762. The rod 758 is held in engagement with the arms 759 by means of the lug 763 on the rock shaft 764 mounted in the brackets 457 and to which the sleeve 555 is secured so that at each movement of the sleeve 555 by the cam 550 operating through the means previously described, the lug 763 will be moved downwardly and the resulting downward movement of the rod 758 allows the rods 750 and 751 to be forced against the coins in the coin tubes by means of the pawls 752 being moved by the springs 765. In case any of the tubes are not filled with coins above the opening 748, the rod 750 will be allowed to enter the tube, and the corresponding pawl 752 would be moved out of engagement with the pin 760, and the rod 762 will be raised and the corresponding sign will show the word "Limited" through the sign window by means described later. In case the coins in the tube are below the opening 749, the rod 751 will be allowed to enter the tube and the pawl 753 will be moved out of engagement with the pin 761 and the corresponding rod 762 will be allowed to raise still higher, and the word "Out" on the corresponding sign will be shown through the sign window. The rods 762 are pivotally connected to the levers 766 which are mounted on the bearing rod 767 supported on the brackets 768 on the top plate 602 of the change section. The rods 762 are held in operative position by means of the springs 769 and are raised, when released by the pawls 760 or 761, by means of the springs 770 secured to the lever 766. Whenever any of the rods 762 have been released by any of the pawls, they are forced downwardly coincidentally with the movement of the pawls just described, so that if the coin tubes are again filled above the openings 748 or 749 the pins 760 or 761 will be again engaged by the pawls and the signs will show the corresponding word.

In order to force the rods 762 downwardly after being released, a cam 771 is provided on the cam shaft 13, and operating the cam lever 772 through the roller 773 secured thereto, and shown more in detail in Figure 69. The cam lever 772 is also pivoted on the bearing rod 767 and is provided with an arm 774 extending over the levers 766 and adapted to engage and force them downwardly at each revolution of the cam shaft 13 in case they have been raised by the release of the rods 762 by the pawls 752 or 753. The signs 775 are arranged to operate behind the window 776 (Figure 75) in the case 777 and are secured to the levers 778 pivoted on bearing rod 779 suitably supported near the top of the machine and connected to the levers 766 by means of links 780. It will therefore be seen that the corresponding signs will be moved coincidentally with the rods 762.

A bail like member 781 is also pivoted on the bearing rod 779 and rests upon the levers 778. A rod 782 shown in Figure 45 and further illustrated in Figure 32 extends through the opening 783 in the bail member 781, and is provided with a shoulder adapted to be engaged by the bail member 781 when it is raised by any of the levers 778. Referring now to Figure 31, the rod 782 is connected to a pawl 784 pivoted to the coin inlet member 18 and adapted to engage a lug 785 on the movable arm 786 pivoted at 787 to the coin inlet member 18. The pawl 784 is adapted to be disengaged from the lug 785 by the raising of the bail like member 781 and the rod 782. The pawl is adapted to be held in engagement with lug 785 by the spring 788. A member 789 is pivoted at 790 to the upper end of the lever 786 and is slidably mounted on the coin inlet member 18 by means of the screw 791 in the slot 792. The member 789 is adapted to be moved forward by means of the spring 793 when the pawl 784 releases the movable arm 786 mounted thereon until the catch 794 on the member 789 is engaged by the pawl 795, illustrated in Figure 10 and mounted on the coin inlet member 18. The pawl 795 is adapted to be moved out of engagement with the catch 794 by means of the bell crank lever 796 pivoted on the coin inlet member 18 and operated by the cam 797 on the coin inlet door, so that when the coin inlet door is raised, the member 789 will be moved forward by means of the spring 793, and the lug 798 mounted thereon will pass behind the member 202, preventing the catch 205 thereon from engaging in its upward movement the lug 199 on the lever 193, and thus preventing the closing of the gate 129 and the starting of the second cam shaft by the means heretofore described.

When the mechanism is in this position, any coin inserted will be returned to the customer. If the customer still desires to operate the machine by taking all of his credit in stamps or enough in stamps so that the balance in change may be paid out by the machine, he may do so by means of the button 799 connected to the movable arm 786 by means of the rod 800.

In case the springs 770 fail to operate the sign levers (Figure 75) on account of the friction of the pawl 784 on the lug 785, (Figure 31) this friction will be relieved and the pawl allowed to rise by means of the cam point 801 on the gate lever 193 engaging the cam point 802 on the member 789, thereby forcing the movable arm 786 slightly backward and releasing the pawl.

As soon as the coin has been accepted by the machine and the credit set up, the bell 803 (Figure 2) will ring for the purpose of notifying the customer that his coin has been accepted. This is accomplished by means of the member 804 secured to the cam shaft 13 and provided with arms 805 adapted to engage the cam lug 806 on the lever 807, pivoted on the side frame 1 and held in operative position by means of the spring 808. A bell striking arm 809 is pivoted to the lever 807 and held in operative position by means of the spring 810 and is adapted in this particular case to ring the bell twice upon each revolution of the cam shaft 13.

It will now have become apparent that the machine provides a change making mechanism coin controlled automatically to set, initially, a credit or aggregate-value-of-delivery limit substantially according with the face value of the coin, and controlled in operation by the user to deliver change according to its setting. Also that the normal credit and the coin-value-determined credit are established by suitable devices automatically driven from the second cam-shaft and rotating the change shafts while the latter are separately rotatable because their gears are not in train. Further, that after the shafts have been so rotated the shaft-connecting gearing is brought into such relation that by rotation of the one-cent shaft subtractively the credit may be progressively reduced to zero, extinguishing the credit cent-by-cent, ultimately to incapacitate the machine further to function as part of the instant transaction. As has been suggested the change making means, thus initially set, is subject to control of the stamp-dispensing means for subtractively reducing the credit limit, progressively and as fast as the stamps are delivered, each subtractive action being accordant with the value of the stamp just delivered. The mechanism for stamp delivery and credit reduction, with attendant and correlated mechanisms I will now next describe:

In order to deliver stamps to the customer, a stamp section is provided having side frames 811 and 812 and secured to the side frame 2 by means of the brackets 813. These frames are connected by means of the cross frames 814, 815 and 816 secured to the side frames in any suitable manner. A front frame member 817 is provided having stamp grooves 818 and 819. The stamps are provided in rolls, one stamp in width. These rolls are rotatably mounted on the rod 820 secured to the side frame 2 (Figure 80). These stamps are threaded over the rollers 821 mounted on members 823 and pass through the grooves 822 in the members 823 pivotally mounted on bearing rod 824. The stamps then pass over the rollers 825 also mounted on 824 and through the grooves 818 and 819 in the front frame member 817 where they are guided by means of members 826 secured thereto. They then pass under the rollers 827, the two cent stamps passing through the groove 819 and the one cent stamps through the groove 818 in the particular construction shown. Referring now to Figure 86, the two cent stamps, after passing under the roller 827 are carried between the friction rolls 828 and 829, the roll 828 being mounted on the bearing rod 830 suitably mounted in the side frames 811 and 812. The roll 829 is secured to the shaft 831 and is driven from the roll 828 by means of the gear 832 secured thereto, and the pinion 833 secured to the shaft 831. The shaft 831 is mounted in the arms 834 and 835 of the member 836 pivotally mounted on the rod 837, supported in the side frames 811 and 812. The rolls 829 are held in frictional contact with the rolls 828 by means of the spring 838 secured to the arm 834. The stamps then pass around the drive rolls 839 and under the fingers 840 and through the opening 841 in the member 842 and are passed under the stamp guide 843 and so delivered to the customer.

The stamps are held in frictional contact with roll 839 by means of the friction roll 843 mounted on the arms 844 of the member 845 and held in operative position by means of the spring 846 (Figures 85 and 86). The roll 843 is driven by means of the gear 847 secured to the drive roll 839 and the gear 848 secured to the roll 843. The friction roll 828 is driven by means of the gear 828[a] mounted thereon and the gear 839[a] secured to the drive roll 839.

The one cent stamps are delivered to the customer through the opening 849 in the member 842 in an exactly similar manner to the two cent stamps by passing between similar friction rolls and over the one cent stamp drive roll 850 (Figure 87), the friction rolls being driven by similar gears from the drive roll 850. The drive roll 850 is mounted on the shaft 851 supported in suitable bearings on the frames 811 and 812 and is driven from the main stamp shaft through the intermittent gear 852 by means to be later described. The two cent stamp drive roll 839 is secured to the hollow shaft 853 mounted on the shaft 851 and adapted to be driven through the intermittent gear 854 from the main stamp shaft.

When a credit has been set up in the machine and it is desired to withdraw either all or a portion of it in two cent stamps, the rod or stem 855 is pushed inwardly by means of a button 856, the rod 855 being mounted in suitable bearings on the side frame 812 and the supporting member 857 as shown in Figures 80 and 82. A lever 858 is pivoted at 859 on the side frame and its lower end is engaged in the slot 860 in the rod 855 and is adapted to be moved inwardly by the rod. This lever is provided with an arm 861 to which is secured the spring 862 for the purpose of returning the rod 855 to its initial position. A member 863 is pivoted to the lever 858 near its lower end and is adapted to be carried inwardly by the movement of the lever. The other end of the member 863 is slidably mounted in the guide member 864 and is held against the guide roller 865 and in operative position by means of the spring 866. A catch 867 is provided on the member 863 and is adapted to engage one of the downwardly extending arms of the member 868 mounted on the rod 869 supported by the side frames 811 and 812 and shown more in detail in Figure 88. The member 868 is provided with an arm 870 adapted to engage the arm 871 and partially rotate the rock shaft 872 to which it is secured and thereby start the motor and the main stamp shaft 875 by means to be described later. The rock shaft 872 is mounted in suitable bearings in the side frames 1 and 2 and intermediate frame 3 as shown in Figures 78 and 92. The stamp shaft 873 is mounted in suitable bearings in bracket 874 secured to the side frame 2 and in suitable bearings on side frame 1 and intermediate frame 3. (Figures 1, 54 and 92.) A shaft 875 (Figure 83) is slidably mounted in suitable bearings in the stamp section side frames 811 and 812 and has an enlarged portion 876 adapted to slidably engage the stamp shaft 873 which is provided with an extension extending into the opening 877 of the enlarged portion 876 and slidably secured thereto by means of a feather 878.

An intermittent locking pinion 879 is secured on the shaft 875 and is adapted, when in position shown, to turn the intermittent gear 854 (Figures 83 and 90) one fourth of a revolution during one revolution of the stamp shaft 873. Thus it will be seen that the two cent stamp driving roll 839 will be revolved one fourth of a revolution which is the amount necessary to deliver one stamp to the customer.

The shoulder 880 is provided on the pinion 879 and is adapted to lock the one cent intermittent gear 852 when the pinion is in position to operate the two cent gear 854.

An intermittent locking pinion 881 is also secured to the enlarged portion of the shaft 875 and is adapted to engage the intermittent gear 882 secured by means of the pins 883 to the Geneva movement locking member 522 slidably mounted on the one cent change rod, as previously described and illustrated in Figure 54, the pins passing through openings in the member 523. Thus it will be seen by reference to Figures 60 and 83, that when the locking members 522 and 526 are moved to the position shown in the dotted lines for the purpose of allowing the change rod 493 to be rotated in setting up the credit, the intermittent gear 882 will be moved out of engagement with pinion 881, thereby allowing the one cent change rod to be rotated. It will also be understood that as each two cent stamp is fed out from the machine, the intermittent pinion 881 will turn intermittent gear 882 two fifths of a revolution, thereby removing the two cent credit from the change rod 493. If another stamp is taken, all of the credit will be removed from the one cent change rod, and when the next stamp is removed three cents credit will be set up on the one cent change rod and the nickel change rod will, through the Geneva movement, remove one nickel of the credit therefrom. In case more than twenty-four cents worth of two cent stamps are removed, the credit will then be removed from the quarter change rod by means of the Geneva movements in the same manner as described for the one cent and five cent change rods.

In case it is desired to purchase one cent stamps, the one cent stamp stem or rod 884 will be pushed in by means of the button 885. The rod 884 operates a mechanism similar in every way to that used in the operation of the two cent button for starting the motor and main stamp shaft, (Figures 80, 82 and 88) comprising a lever 858$^a$, similar in every way to 858, engaged in the slot 860$^a$ and adapted to operate the member 863$^a$ provided with a catch 867$^a$ adapted to engage one of the downwardly extending arms of the member 868, thus raising the arm 870 and partially rotating the rock shaft 872 and starting the motor in the same manner, as when using the two cent stamp button.

A lug 886 (Figure 82) is provided on the rod 884 and is adapted to engage the arm 887 of the locking member 888 pivoted on the cross frame 814 and bring the arm 889 in contact with the lug 890 on the rod 855 when the one cent stamp rod 884 is pushed inwardly. This operates in a similar manner when the two cent button is used, thus preventing the operation of both buttons at the same time. The rod 884 is provided with a cam lug 891 adapted to engage the roller 892 on the segment shaped member 893 which is secured to the rock shaft 894 mounted in suitable bearings on the cross frames 814 and 815. The lower end of the rock shaft 894 is provided with an arm 895 (Figures 80 and 83) provided with rollers 896 adapted to engage a groove in the member 897 secured to the shaft 875. Thus it will be seen that when the rod 884 is pushed inwardly, the shaft 875 will be moved longitudinally by the means just described until the pinion 879 is in position to drive the intermittent gear 852 on the shaft 851, to which the one cent stamp driving roll is secured, and that during one revolution of the stamp shaft one one-cent stamp will be delivered in the same manner, as described for two cent stamps. When the pinion 879 is in this position, the shoulder 898 will be in engagement with the locking portion of the intermittent gear 854, thereby preventing any accidental movement of the two cent stamp delivering mechanism. In this position, the intermittent pinion 899 will be in a position to engage the intermittent gear 882 on the one cent change rod 493, shown more in detail in Figure 91, and turn the same only one-fifth of a revolution with each revolution of the stamp shaft 873, thus removing one cent credit each time a one cent stamp is removed from the machine, the credits being removed in the same manner as described when purchasing two cent stamps.

The enlarged portion 876 of the shaft 875 is provided with a flange 900 shown in detail in Figures 78 and 91. A stop 901 is secured to the side frame 2 in such a manner as to engage the flange and prevent the shifting of the intermittent driving pinions during their revolution. An opening 902 is provided in the flange and is in alignment with the stop 901 when the shaft 875 is at rest, thus allowing it to be moved at that time. The edge of the opening 902 and the stop 901 are provided with knife edges so that in case the shaft 873 has not been shifted to its proper position the lug 901 bearing against the flange 900 will force the shaft to its proper position.

It will be remembered that in order to set up credit on the change rods, the locking member 522 and the intermittent gear 882 must be moved to the position shown in dotted lines in Figure 83 and out of engagement with both of the driving pinions 881 and 899. It will be understood that this could not be accomplished when the pinions were in position for the purchase of one cent stamps, and therefore it is evident that the pinions must be returned to the position shown before a new credit is set up. This is accomplished by means of the cam member 449 on shaft 13. (Figures 78 and 79.) A cam lever 903 is pivoted to the frame 2 and is provided with a roller 904 adapted to rest in the notch 906 of the cam member 449. The cam lever is connected by means of a link 907 to one end of the lever 908 pivoted to bracket 909 on the stamp section side frame 812, and the other end of the lever 908 is adapted to operate a rock shaft 910 (Figures 80 and 82) by means of the pin 911 adapted to engage in the slot in the lever 908. The rock shaft 910 is provided with an arm 912 which is connected to the arm 913 on the rock shaft 894 by means of the link 914 passing through the opening 915 in the rock shaft arm 912 and so arranged as to return the rock shaft 894 to the position illustrated, when the rock shaft 910 is operated by means of the roller 904 being raised from the notch 906 in the cam member 449, and it will be understood that through this operation, the driving pinions 899 and 881 will always be returned to the position shown in Figure 83 before a credit is set up. The rock shaft 910 is also provided with arms 916 adapted to engage lugs 917 on the button rods 884 and 855, thus securely locking them and preventing their operation during the revolution of the cam shaft 13, and while the credit is being set up.

In case one cent stamps have been purchased, and it is desired to purchase two-cent stamps from the same credit, the roller 918 will be in a position to be engaged by the cam lug 919 on the two-cent button rod 855 and the segment member 893 (Figure 82) and rock shaft 894 will be returned to the position illustrated and will bring the mechanism into position to deliver two cent stamps, as before described.

The intermittent gear 854 is provided with pins 920 adapted to engage the arm 921 on the rock shaft 922 adapted to operate the counter 923. The pins 920 are so arranged that each stamp purchased will be registered by the counter. An arm 924 is also provided on rock shaft 925 and adapted to operate the counter 926 by means of the pins 927 on the intermittent gear 852 and so arranged that each one cent stamp purchased will be registered.

The counters 926 and 923 are secured to the cross frame 928 supported by the side frames 811 and 812. It will be understood that in order to tear off the stamps purchased at the line of perforation from those remaining in the machine, it will be necessary to bring the perforations exactly in alignment with the front edge of the opening 841 in the member 842. (Figure 86.)

In practice, it has been found that there is a varying distance between the lines of perforations between the stamps. In order to bring these perforations to the desired position, adjusting pawls 929 are pivotally mounted on a bearing rod 930. The bearing rod extends through the slots 931 (Figure 84) and is supported in the reciprocating members 932 slidably mounted in the guides 933. A frame member 934 is also pivoted on the bearing rod 930 and is adapted to extend over the tops of the pawls 929 and hold the same in alignment with the grooves 935 (Figure 84ª) adapted to receive the downwardly extending fingers 936 of the pawls 929 when they drop through the perforations between the stamps. These pawls are carried backwardly by means of the reciprocating members 932 and during the operation of feeding one stamp through the opening 841 in their forward movement the fingers 936 will drop through the perforations and the stamp will be moved to its correct position.

When the pawls have reached the limit of their forward movement the frame member 934 is forced under the cross bar 937 of the member 842, thereby holding the stamp firmly in position between the frame member 934 and the member 842. In order that the pawls 929 may move the stamps during their forward movement, it is necessary to release the stamps from between the feed rolls and the friction rolls 843 and at the same time friction rolls 828 and 829 must remain firmly holding the stamps in position to prevent the customer from removing more stamps from the machine than those already fed out. In order that sufficient slack in the stamps may be provided around the feed roll 839 so that the stamps may be moved the required distance by the pawls, the rolls 828 are arranged to run slightly faster than the feed rolls.

As soon as the feed rolls start, the friction rolls 829 are momentarily moved from contact with the rolls 828 to allow the feed rolls to take up the unused slack. They are then closed during the remainder of the movement to allow the roll 828 to provide the necessary slack to allow the next operation of pawls 929. The friction rolls 829 are momentarily removed from contact with the roll 828 by means of the pins 938 (Figures 85 and 87) on the feed rolls engaging the cam member 939 on the arms 835 of the members 836, as shown more in detail in Figure 85. Friction rolls 843 are moved out of engagement with the drive rolls by means of the cams 940 and 941 mounted on the shaft 875 and adapted to engage the rollers 942 and 943 secured to the arms 944 on the members 845. Thus it will be seen by reference to Figure 83 that when the shaft 875 is in position to deliver two cent stamps, the cam 941 will be in position to engage the roller 943, which will in turn release the corresponding friction roller 843, and when the shaft 875 is moved to a position to deliver one cent stamps, the cam 940 will be in position to engage the roller 942, and through the mechanism described release the corresponding friction rolls. The pawl operating members 932 (Figure 84) are reciprocated by means of the cams 945 and 946 mounted on the shaft 875 and adapted to engage the rollers 947 and 948 respectively, these rollers being mounted on the forked levers 949 and 950 pivoted on the rod 837. These levers are held in operative position by means of the spring 950ª (Figure 80). The lower ends of the forked levers 949 and 950 extend through the slots 951 in the member 842 and are provided with slots 952 adapted to engage the pins 953 on the reciprocating members 932. Thus it will be seen that when the machine is in position to deliver two cent stamps as in Figure 83, the cam 946 will be in position to engage the roller 948 on the lever 950 and thereby operate the pawls through the mechanism described, and when the shaft 875 has been moved to a position to deliver one cent stamps, the cam 945 will be in position to engage the roller 947 on the lever 949 and operate the corresponding pawls in the same manner as for two cent stamps.

Shields or guides 954 are secured to the members 944 and extend over the feed rolls and are provided with fingers 955 extending into the grooves 956 in the rolls 828 and also provided with fingers 957 extending into the grooves 958 of the friction rolls 843. These shields are provided for the purpose of guiding the stamps while loading the machine. Referring to Figure 85, when it is desired to thread the stamps between the rolls in the process of loading the machine, the friction rolls are moved out of contact with their driving rolls by means of the lever 959 mounted on the bearing rod 845ª. The lever is provided with an arm 960 having lugs 961, 962 and 963 thereon. When the lever 959 is raised, the lug 961 is forced against the arms 844 of the member 845, and the friction rolls 843 carried thereon are removed from contact with the drive rolls 839 and 850. The lug 962 will also engage the end of the arms 835 on the member 836, and the friction rolls 829 mounted thereon will be removed from contact with the rolls 828. During the same operation, the lug 963 will engage the shoulders of the forked levers 949 and 950 and the pawls 929, and the frame member 934 operated thereby will be moved backwardly, thereby allowing the stamps to be threaded through the opening 841. A locking member 964 (Figure 85) is pivoted at 965 on suitable brackets on the bottom cross frame of the stamp section. When the lever 959 is raised, the arm 966 is moved under the lug 967 on the lever, thereby locking the lever 959 in its raised position. The member 964 is moved to the locking position by means of the spring 968 secured thereto. The bell crank lever 969 is secured to the stamp section side frame 811 and is adapted to move the locking member 964 to its initial position when the door 970 in the casing 777 is closed, in case the machine attendant neglects to return it to position before closing the door, as clearly illustrated in Figure 85a.

In order that the stamp buttons may be made inoperative when the stamps are exhausted, members 972 and 973 (Figures 80 and 86) are movably suspended from the arms 974 and 975 on the sleeves 976 and 977 (Figure 88) respectively. These sleeves are loosely mounted on the rock shaft 978 mounted in suitable bearings in the stamp section side frames. The member 973 (Figure 86) is provided with an arm 979 on which is mounted the roller 980. This roller is adapted to rest against the two-cent stamps and is adapted to swing into one of the grooves 981 in the feed roller 839 when the stamps are exhausted. When the roller 980 rests against the stamps the member 973 is held in the position shown by full lines and is prevented from rising by means of the lug 982 engaging the roller 983 mounted on the guide member 984 secured to the side frame 811. When the stamps are exhausted, the roller 980 drops into the groove 981 moving the lug 982 out of engagement with the roller 983 and a lug 985 on the member 983 is brought into position to engage the pin 986 on the cam 946. The member 973 will be carried to the position shown in dotted lines when cam 946 is rotated, and the spring controlled member 987 will hold it in that position with the lug 985 out of engagement with the pin 986. The member 987 is pivoted on the stamp section side frames and is provided with a lug 988 adapted to engage the bottom cross frame 816 and limit its movement and is controlled by the spring 989. The member 972 (Figure 80) is provided with a similar roller 990 adapted to swing into the groove 991 in the feed roll 839 (Figure 87) and carry the lug 992 out of engagement with the roller 993 and allow the member 972 to be raised by means of the lug 994 engaging the pin 995 on the cam 945 in an exactly similar manner as described for member 973, in which position it will be held by a similar spring controlled member 996.

The sleeve 976 (Figure 88) is partially rotated on the shaft 978 when the arm 972 is raised and is adapted to partially rotate the sleeve 997 supported on the bearing rod 998 secured to the side frames 811 and 812. This is accomplished by means of the link 999 connected to the arm 1000 on the sleeve 976 and the arm 1001 on the sleeve 997, this sleeve being provided with an arm 1002 carrying a roller 1003 adapted to engage the member 863a when the sleeve 997 is partially rotated by raising the member 972, thus preventing the catch 867a from engaging the arms 868 and the motor will not be started when the one cent stamp button is operated. In a similar manner, the sleeve 1004 is adapted to be partially rotated on its bearing rod 998 through the arms 1005 and 1006 and the link 1007 operated through the sleeve 977 by the raising of the member 973. When the arm 1005 is moved downwardly through this operation, it engages a pin 1008 on the arm 1009 on the sleeve 1010 which is also mounted on the bearing rod 998. The arm 1009 is provided with a roller 1011 adapted to engage the member 863 and depress the same and prevent the lug 867 from engaging the arm 868 when the two cent stamp button is operated. It will therefore be understood that when there are no stamps in the machine, it will be impossible to start the motor by means of the stamp buttons.

In Figure 88, the member 972 is shown in its normal position when one cent stamps are in the machine, and 973 is shown in its raised position after the two cent stamps have been exhausted.

In order that the two cent stamp button may be made inoperative when there is only one cent credit left in the machine, an arm 1012 is provided on the sleeve 1010, which arm is provided with a link 1013 pivoted to the supporting arm 1014 and carrying a roller 1015. A rock shaft 1016 is mounted in suitable bearings on the side frame 2 and the intermediate frame 3 (Figure 78) and is adapted to be partially rotated by a means to be hereinafter described, when there is only one cent credit left in the machine. This rock shaft is provided with an arm 1017 adapted to engage the roller 1015 on the member 1013, thereby partially rotating the sleeve 1010 and bringing the roller 1011 into engagement with the member 863 in the same manner as previously described. The sleeve 1010 is returned to its initial position by spring 1018 when the arm 1009 is released, returning the member 973 to its initial position.

When the credit is all exhausted by the purchase of stamps, the stamp shaft is automatically made inoperative by the action of the change rods through a mechanism to be later described.

A collar 1019 is secured to the rock shaft 978 (Figure 88) and is provided with lugs 1020 and 1021. A lug 1022 is provided on the sleeve 977 and is adapted to engage the lug 1020 and operate the rock shaft when the member 973 is raised. A lug 1023 is provided on the sleeve 976 and is adapted to engage the lug 1021 and operate the rock shaft when the member 972 is raised. An arm 1024 is also secured to the rock shaft and connected by means of the link 1025 to the arm 1026 pivoted on the side frame 812. A roller 1027 is mounted on the arm 1026 and is adapted to engage the arm 1028 on the rock shaft 1029 when the rock shaft 978 is operated by the means just described. In this operation, the rock shaft 1029, which is mounted in the side frames 2 and intermediate frame 3, (Figure 78) releases the movable arm 786, shown in Figure 31 and renders the machine inoperative in the same manner as when the change is exhausted, unless the button 799 is pushed after inserting another coin, in which case the credit must then be taken from the stamps or change still remaining in the machine.

In order to release the movable arm 786, an arm 1030 (Figures 45 and 78) is secured to the rock shaft 1029 and is adapted to engage the end of a rod 1031, the other end of which is pivoted to the downwardly extending arm 1032 on the bail like member 781, thereby raising the pawl 784 through the rod 782 (Figure 31).

When it becomes necessary to thread the stamps around the feed rolls, the members 972 and 973 must be returned to their initial position and the rock shaft 978, (Figure 88) be allowed to release the arm 1028 on the rock shaft 1029 through the means described.

An arm 1033 is secured to the rock shaft 973 and is connected by means of the link 1034 to the arm 1035 on the member 964, the link being connected to the arm 1035 by means of the pin 1036 in the slot 1037. It will be remembered that when threading the stamps around the feed rolls, the friction rolls must be released by means of the lever 959, (Figure 85) and locked in position by the arm 966 on the member 964. In case the attendant neglects to return the members 972 and 973 to their initial position, the pin 1036 (Figure 88) will engage the top of the slot 1037 and prevent the operation of the locking member 964, thereby calling the attendant's attention to the fact that the members 972 and 973 have not been returned to their initial position.

In order that the stamps may be more easily torn off at the line of perforations, a blade 1038 (Figure 86) is provided having a serrated edge 1039 adapted to be pressed against the stamps at the line of perforations. This blade is secured to the member 1040 and is adapted to operate in the opening 1041 in the member 842. A piece of rubber, or some similar material, is provided at 1042 to prevent dulling the serrated edge when it is pressed against the stamps. The member 1040 is pivoted by means of ears 1043 (Figure 78) to the side frames 811 and 812, and is also provided with an arm 1044 (Figures 78 and 89) on which is mounted a roller 1045 adapted to be engaged at a predetermined time by a cam 1046 on the shaft 875. The arm 1044 is provided with an extension 1047 adapted to engage the bracket 813 and hold the arm in operative position. The arm 1047 is provided with a spring 1048 for the purpose of returning it to its initial position.

When a credit is set up in the machine, the stamp shaft starting mechanism must be set up in such a manner that the stamp shaft may be rotated when either of the stamp buttons are operated.

An arm 1049 is secured to the rock shaft 872 (Figure 96) and supported by spring 1050, and a starting rod 1051 is pivotally suspended from the arm 1049, the lower end being adapted to operate in the slot 1052 in the frame 1053 secured to the side frame 1 (Figures 92 to 96). A rock shaft 1054 is supported on the frame 1053 and is provided with an arm 1055 to which is secured the link 1056, (also shown in Figures 3 and 97), the link being connected to an arm 1057 on the universal key rock shaft 582 by means of the pin 1058 through the slot 1059. Thus it will be seen that when the universal key is depressed in setting up a credit, the rock shaft 1054 will be partially rotated by the raising of the arm 1055 through the pin 1058 engaging the top of the slot 1059 in the link 1056. A locking pawl 1060 is pivoted on the frame 1053 and is adapted to pass under and engage the lug 1061 on the arm 1055, thereby holding the rock shaft 1054 in its partially rotated position, as shown in Figures 96 and 97. An arm 1062 is also provided on rock shaft 1054 and is adapted to engage the starting rod 1051 and carry it to the starting position, as shown in Figures 94 and 96 when the set up mechanism has been operated and is in the position shown in Figure 97. The starting rod 1051 is shown in its inoperative position in Figure 93 and is returned to that position by the spring 1063. It must be remembered that when either of the stamp buttons is operated, the starting rod 1051 will be depressed through the arm 1049 and the rock shaft 872, as indicated in the description of the stamp section. A gear 1064 is loosely mounted on the stamp shaft 873 (Figures 92 to 94) near the side frame 1 and is adapted to be driven by the gear 1065 on the drive shaft 8. A collar 1066 is provided with a flange 1067 adjacent to the gear 1064. A pawl 1068 is pivoted at 1069 to the gear 1064 and is provided with a lug 1070 adapted to engage the notch 1071 in the flange 1067 during the revolution of the gear 1064 but is held out of engagement until the operation of the stamp buttons, by means of the pawl 1072 pivoted on the gear 1064 and adapted to engage the notch 1073 in the pawl 1068.

The stamp shaft is prevented from turning when not in use my means of the member 1074 pivoted on the collar 1066 provided with the arm 1075 (Figure 95) adapted to engage the stop 1076 on the bracket 1077. This bracket is shown in detail in Figure 55. The member 1074 is also provided with a groove 1078 through which the pin 1079 on the pawl 1068 is adapted to pass when the gear 1064 is being rotated and the stamp shaft is not in use. When one of the stamp buttons is operated and the starting rod 1051 is depressed, and if a credit is already set up in the machine, the shoulder 1080 engages the lug 1081 on the lever 1082 pivoted on the frame 1053, (Figure 94). The lever 1082 is provided with an arm 1083 adapted to engage the lever 1084 secured to the rock shaft 1085 and adapted to depress the spring 53 on the contact member 48, thereby starting the motor. A cam member 1086 is pivoted on the frame 1053 and is adapted to be engaged by the arm 1087 on the lever 1082, and is thereby raised into position to engage the lug 1088 on the pawl 1068 during the revolution of the gear 1064 and force the pawl into position where the lug 1070 will engage the notch 1071 on the collar 1067. During this operation, the pawl 1072 is forced out of the notch 1073 and into the notch 1089, thus holding the lug 1070 in position to engage the notch 1071 on the flange 1067, the pawl 1072 being held in position by means of the spring 1090. This operation takes place immediately after the pin 1079 has entered the groove 1078 in the member 1074, thus moving the arm 1075 to the position shown in Figure 95 and releasing it from the stop 1076 and allowing the rotation of the stamp shaft with the gear 1064. In order to prevent the stamp shaft rotating faster than the gear 1064, a pawl 1091 is pivoted on the gear 1064 and is normally held in the position shown in Figure 93 by means of the arm 1092 on the pawl 1068, and when released by the pawl 1068 is brought into engagement with the collar 1067 and in a position to engage the catch 1093 and thus prevent the stamp shaft 873 from rotating faster than the gear.

The pawl 1091 is adapted to be moved into operative position by means of the spring 1094.

Referring to Figure 93, a cam member 1095 is pivoted to the frame 1053 and is connected to the cam lever 1086 by means of a link 1096. When the cam member 1086 is raised into position to engage the lug 1088 and move the pawl 1068 into operative position, the cam member 1095 will be moved out of the path of the roller 1097 which is secured to arm 1092 of the pawl 1068. The roller 1097 extends through the opening 1098 in the gear 1064. When the cam lever 1086 is released and returned to its initial position by means of the spring 1099, the cam 1095 will be returned to the position shown in Figure 93 and engage the roller 1097 during the revolution of the gear, thereby returning the pawl 1068 to its initial position and releasing the stamp shaft 873 through the means described and the member 1074 will be released and the arm 1075 will again engage the stop 1076, thereby preventing any overthrow of the stamp shaft. During this operation, it will be understood that only one stamp has been delivered. In case more than one stamp is to be delivered, the cam member 1086 will be held in the position shown in Figure 94 and the cam member 1095 held out of engagement with the roller 1097 by the continued pressure of the stamp button until the desired number of stamps have been delivered or until the credit has been exhausted.

After the stamp shaft 873 has been started by the means described, it is necessary that the contact member 48 be held in the position shown in Figure 94 in order that the motor shall be operated throughout the revolution. This is accomplished by means of the lever 1100 secured to the rock shaft 1085, as shown in Figure 3 and provided with a roller 1101 adapted to engage in the cam notch 1102 when the stamp shaft is at rest. When the stamp button is operated, the roller 1101 is carried out of the notch 1102 in disc 1103 secured to the stamp shaft 873 through the operation of the lever 1084 on the rock shaft 1085, (Figure 94), and as soon as the stamp shaft starts its revolution and the stamp button is released, the roller 1101 will engage the periphery of the disc 1103 and the contact member will be held in position so that the motor will operate throughout the revolution of the stamp shaft. When the shaft has completed one revolution, the roller 1101 will again be forced into the notch 1102 by means of the spring 1104 secured to the arm 1100 and the contact will again be broken and the motor stopped. A pin 1105 is mounted on the disc 1103 and is adapted to engage the arm 1106 on the lever 807 as soon as the stamp shaft starts, thereby ringing the bell 803 through the mechanism shown in Figure 2 so that the customer will be notified of the number of stamps delivered.

In case the customer, while purchasing more than one stamp, should release the stamp button, thereby breaking the contact immediately after the roller 1097 has passed the cam member 1095, the pawl 1068 would be left in its operative position shown in Figure 94 and with the contact broken. In order to prevent this occurring, I provide a cam 1107 on the stamp shaft 873 adapted to operate the cam lever 1108 loosely mounted on the rock shaft 1085 and provided with a pawl 1109 pivoted to the cam lever at 1110 and held in operative position by the spring 1111 and adapted to be lowered to the position shown in Figure 96ª. In case the button is released during the downward movement of the pawl 1109, the shoulder 1112 will be engaged by the pawl and the starting rod 1051 will be prevented from rising to a position where the contact will be broken and the stamp shaft will therefore complete its revolution.

When the stamp shaft is at rest, the pawl 1109 will be in its downward position and in position to engage the shoulder 1112 when the starting rod 1051 is depressed by the operation of the stamp button, and hold the same in its depressed position and the contact on until the stamp shaft has started and the roller 1101 has been engaged by the periphery of the disc 1103 and the contact then held on throughout the revolution of the stamp shaft by the means previously described. The starting rod 1051 is then released through the pawl 1109, being forced out of engagement with the shoulder 1112 during its upward movement by means of the cam lug 1113 engaging the frame 1053.

Whenever change is taken from the machine by pushing the change button 673 (Figures 2 and 97) the arm 1114 on the T-shaped lever 691 will engage the pin 1115 on the tripping rod 1116 movably mounted on the side frame 1 by means of the screw 1117 through the slot 1118. The rod 1116 is provided with a cam lug 1119 adapted to engage the cam surface of the pawl 1060. When the rod 1116 is raised by the operation of the change button through the means described, the pawl 1060 will be thrown out of engagement with the lug 1061, thus allowing the arm 1055 and the arm 1062 (Figure 96) on the rock shaft 1054 to return to their initial positions, and the starting rod 1051 will then be held out of engagement with the lug 1081 during its downward movement in case the stamp buttons are operated.

In case a customer should leave the machine without having exhausted all of his credit, the next customer, in raising the inlet door for the purpose of inserting a coin, will raise the tripping rod 1116 by means of the lever 1121 pivoted on the frame 1 engaging the pin 1122 on the tripping rod 1116. The lever 1121 is connected to the bell crank lever 796 by means of the link 1123, as shown in Figures 10 and 97, thus it will be seen that in the operation of raising the inlet door and the consequent movement of the bell crank lever 796, the pawl 1060 will be tripped through the mechanism described in the same manner as when using the change button. The pawl 1060 is controlled by means of the spring 1124.

In case the credit has all been exhausted from the machine by the purchase of stamps, the pawl 1060 will be tripped by means which I will now describe.

Referring now to Figures 98 and 64, the nickel change rod 494 and the quarter change rod 495 are provided with rollers 1125 and 1126 respectively mounted thereon and adapted to be raised into engagement with levers 1127 and 1128 respectively when the credit has been exhausted from either of these rods, the quarter rod 425 being shown in that position. The lever 1128 is pivoted to the intermediate frame 3 at 1129 and is shown in its raised position. The lever 1127 is pivoted at 1130 to intermediate frame 3, and is shown in its lowered position. A member 1131 is connected at one end to the lever 1127 by means of the link 1132, the other end being connected to the lever 1128 by means of the link 1133, the link being held in position against the roller 1134 mounted in the guide 1135 by means of the spring 1136. The one cent change rod 493 is provided with lugs 1137 and 1138 adapted to engage the teeth 1139 and 1140 on the member 1131, when it is raised by the credit, being exhausted on both the nickel change rod 494 and the quarter change rod 495. When the credit is exhausted on only one of the change rods, only one end of the member 1131 will be raised and the teeth 1139 and 1140 will not be raised high enough to engage the lugs 1137 and 1138 on the one cent change rod. But when the credit is exhausted on both the nickel and the quarter change rods both the levers 1127 and 1128 will be raised and both ends of the member 1131 will consequently be raised and thereby bring the teeth 1139 and 1140 into position to be engaged by the lugs on the one cent change rod. The lugs 1137 and 1138 are so arranged on the one cent change rod 493 as to engage the teeth 1139 and 1140 and move the member 1131 forwardly during that part of the revolution when the last credit is being exhausted from the one cent change rod by the purchase of stamps.

When the credit has all been exhausted from the quarter and nickel change rods and there is one cent credit left on the one cent change rod 493, the lug 1137 will be in engagement with tooth 1139 and will have moved the member 1131 forwardly one half its complete stroke. When all the credit has been exhausted, the lug 1138 will have engaged the tooth 1140, and the member 1131 will complete its full forward stroke. The lever 1141 is secured to the rock shaft 1142 supported on the intermediate frame 3 and the side frame 1, and as shown in Figures 64 and 92 is provided with an arm 1143 on which is mounted a roller 1144 adapted to move in the cam slot 1145 in the lever 1146 pivoted on the intermediate frame 3 at 1147. Levers 1141 and 1127 are held in operative positions by means of springs 1127$^a$ and 1141$^a$. The lever 1141 is provided with an extension 1148 adapted to be engaged by the member 1131 during its forward movement. When the member 1131 is moved forward, one half its stroke by reason of all but one cent credit having been exhausted, the lever 1141 will be moved outwardly carrying the roller 1144, and the lever 1146 will be raised by the movement of the roller in the slot 1145. The lever 1146 is connected to the rock shaft 1016 by means of the link 1149 and the arm 1150 secured to the rock shaft. Thus it will be seen that the two cent stamp button will be made inoperative by the partial rotation of the rock shaft 1016 by the means just described, and as referred to in the description of the stamp section with special reference to Figure 88.

Referring now to Figures 92 and 97, the rock shaft 1142 is provided on its outer end with an arm 1151. This arm extends upwardly, and when the lever 1141 is moved its complete stroke through all the credit being exhausted the arm 1151 will engage the lug 1152 on the pawl 1060, releasing the arm 1055 and thereby making the stamp shaft inoperative. Thus it will be understood that when the credit is all exhausted through the purchase of stamps or the use of the change button or when the door is raised to insert another coin, the arm 1151 will be actuated and the mechanism made inoperative until another credit is set up.

Signs 823$^a$ are mounted on bell crank levers 823$^b$ pivoted to the upper portion of stamp section side frames, as shown in Figure 80 and adapted to stand in alignment with and to be seen through the windows 823$^c$ provided in the case. These signs are provided with the two words "Ample" and "Limited" (Figure 78), and when in the position shown, the word Ample will be seen through the sign. When the stamps are nearly exhausted from the machine, the sign will be moved so that the word Limited may be seen through the window. To accomplish this result, a catch 823$^d$ is provided, pivoted to the side frame as shown and adapted to engage the pin 823$^e$ on the bell crank lever 823$^b$ and normally hold the same in the position shown. The stamp guide members 823 are provided with forwardly extending arms or lugs 823$^f$ and when the stamps are nearly exhausted, the guide members 823 will necessarily be lowered and the arms 823$^f$ will be raised engaging the catch 823$^d$, thereby releasing the pin 823$^e$ and allowing the lever 823$^b$ to drop to the position to show the word Limited through the window, the bell crank levers 823$^b$ being operated by means of the springs 823$^g$. When it is desired to load the machine, the members 823 are raised until the lug 823$^h$ is engaged by the catch 823$^d$, thereby holding the members 823 in a raised position. The members 823 are also provided with lugs 823$^i$ which are adapted to engage the bell crank levers 823$^b$ when the members 823 are being raised, thereby moving the pin 823$^e$ forwardly and allowing the catch 823$^d$ to engage the lug 823$^h$.

The machine as thus far described provides complete mechanisms for commodity vending and change making in response to and accordance with the relative values of different coins, so that the credit, automatically established as a result of coin insertion and the testing of the value-indicating physical characteristics of the coin, may be drawn upon, either partially or to exhaustion, by the user-controlled, selective delivery of commodity items of different values and in different quantities, and so that at any time in the transaction the user may cause delivery of his credit-balance in the form of change.

I preferably provide the machine with wholly automatic coin-exhibiting means and means for segregating underweight coins, of the denominations are used in the machine to make change, from standard weight coins of those denominations and means to utilize the latter coins automatically to replenish the change supply, which mechanisms I will now describe, together with certain other refinements which give other advantages to the machine.

Referring now to Figure 56, after the complete operation of the machine the coin still remains in the chute 387 and is held therein by the coin holder 413. During the next operation of the machine, the finder bar 411 is moved away from the coin by means of its operating cam 499 on the shaft 13, as previously described. The coin holder 413 is then removed from under the coin and the coin drops through the chute 387 and into the elevator, to be later described. The coin holder 413 is an extension of the U-shaped cam lever 1153 which is pivoted on the bracket 1154 on the frame 435 and is operated at a predetermined time by the cam 1155 on the shaft 13.

Referring now to Figure 99, when the coin passes through the chute 387, it is dropped into the elevator pocket 1156, which is shown in dotted lines and more in detail in Figure 99$^a$. This elevator pocket is pivoted at 1157 on the bracket 1158 on the elevator arm 1159 and is adapted to be held in an upright position by the spring 1160. After the coin has dropped into the elevator pocket, it is raised to the position shown in full lines and the coin is delivered into the exhibitor 1161. The elevator arm 1159 extends across the front of the machine and is pivoted on the side frame 1 at 1162, as shown in Figure 1.

The elevator arm 1159 is moved downwardly in order that the pocket may receive the coin and is returned to its initial position by means of the cam 1163 on the second cam shaft 13 (see Figure 36). This cam operates through the roller 1164 on the cam lever 1165 which is pivoted on the bearing rod 21ª supported on side frame 1 and intermediate frame 3. The cam lever is provided with an arm 1166 which is connected to the elevator arm by means of the spring 1167 secured to the bearing members 1168 and 1169. A rod 1170 is inserted in the coils of the spring and engages the bearing members 1168 and 1169 in such a manner that the elevator arm 1159 will have a positive downward movement, but in case the coin should be caught between the elevator pocket and the coin chute 387 in such a manner as to prevent the elevator arm being raised, the spring 1167 will allow the cam lever 1165 to return it to its initial position. The elevator arm is also provided with an auxiliary spring 1171 (Figure 1) to assist in raising it. The elevator arm is guided in its movement by means of the shoe 1172 engaging the guide 1173 mounted on suitable brackets on the side frame 2.

The exhibitor 1161 (Figures 1 and 99) is provided for the purpose of sorting and distributing the coins when loading the machine with change and sorting and distributing the coins that are used by the customers in operating the machine. The elevator pocket is provided with an enlarged opening 1174 for the purpose of allowing the coin to enter the pocket from the chute 387, and a restricted portion 1175 for holding the coin upright and in alignment with the opening in the exhibitor. The pocket is also provided with a lug 1176 adapted to engage the stop 1177 on the exhibitor and tip the pocket during the movement of the arm 1159 to the position shown by full lines in Figure 99. The guide members 1178 on the pocket 1179 enter the opening 1180 in the exhibitor and the coin will then roll into the chute 1181 and be held by the stop 1182 resting on the trap 1183 in the floor of the chute where it remains until the next operation of the machine. Before another coin is delivered to the exhibitor, the stop 1182 will be withdrawn from in front of the coin, and in case it is a dime, nickel or quarter, it will pass into the restricted portion 1184 of the chute 1181 and a nickel or quarter will then be held by the stop 1185 in the chute 1184. A dime will pass beneath the stop 1185, and through the opening 1186 in the floor of chute 1181 and be held by the stop 1187 in the chute 1189. In case the coin delivered to the exhibitor is a half dollar or dollar, it will not enter the restricted portion of the chute 1181 by reason of its diameter, the trap 1183 will then be withdrawn and the coin will drop into the chute 1189 and rest against the stop 1187 where it will be held until the machine is again operated. In the case of a quarter or nickel, at the next operation of the machine, a trap 1190 will close the opening 1186 in the floor of the chute and when stop 1185 is withdrawn the quarter or nickel passes over the trap 1190 and passes through the opening 1191 and into the tester chute 1192 (Figure 104) in the back portion of the exhibitor, where, in the case of its being a quarter, it rests against the stop 1193 and is supported on the trap 1194 and in position to be tested by the thickness gauge 1195. In case the coin is a nickel, it passes under the stop 1193 and into the chute 1196 through which it passes to the nickel change tube 645, as shown in Figure 99, unless the five cent coin tube is full, in which case the top 1197 will be moved in front of the coin and it will be held on the trap 1194 until the next operation of the machine, when the trap will be withdrawn and the coin will drop into the chute 1198 and be carried to the money drawer.

In case the coin is a quarter and is resting against the stop 1193, as described, the thickness gauge 1195 shown in Figure 105 will be moved forward, and if the coin is of the required thickness, it will be held between the thickness gauge 1195 and the wall of the chute 1192 until the trap 1194 is withdrawn and the gate 1199 is raised to nearly a vertical position and the coin will then be released and will drop into the chute 1200 and be carried to the quarter change tube. In case a nickel should accidentally get into the chute 1200, an opening 1201 (Figure 99) is provided in chute 1200 of sufficient size so that nickels will fall out of the chute but quarters will be retained and pass on to the quarter tube. In case the quarter tube is full, the gate 1199 (Figure 104) will not be raised and the coin will drop on the gate and roll into the chute 1198 and be carried to the money drawer. The thickness gauge 1195 is provided with L-shaped arms 1202 (Figure 105) adapted to engage the wall of the chute 1192 and prevent the thickness gauge from engaging the coin when it is not of the desired thickness. Then when the trap 1194 is withdrawn the coin will drop on the gate 1199 before it can be raised and will not pass to the quarter change tube, but will roll into the chute 1198 and then to the money drawer.

In the case of a dime, half dollar or dollar, which is resting against the stop 1187 (Figure 99) at the next operation of the machine, the stop will be withdrawn and the coin will pass on to the stop 1203 resting there until the machine is operated again, when it will be released and, dropping into the chute 1198, will pass to the money drawer as in the previous described operations.

In loading the machine, the coins are dropped through the chute 1204 and pass through the opening 1205 (Figure 104) into the chute 1192 and the quarters rest against the stop 1206 and on the trap 1207 while the nickels will pass under the stop 1206 and rest against the stop 1208 and on the trap 1209.

The coins are so timed in passing through the chute 1204, by mechanism which will be later described, that they will not enter the chute 1192 while the traps are withdrawn.

When the trap 1207, on which the quarter is resting, is withdrawn, the coin drops on the trap 1194 and in front of the thickness gauge 1195 where it rests against the stop 1193. It is then tested for thickness and delivered either to the change tube or the money drawer as before described.

A thickness gauge 1210 is provided for testing the nickels resting on the trap 1209. This thickness gauge is similarly constructed and operates in a similar manner as the thickness gauge for testing quarters. Then, in case the coin is thinner than required, when the traps 1209 and 1194 are withdrawn, the coin will drop through the chute 1198 and pass to the money drawer. In case the coin is of the required thickness, it will be held by the gauge until the trap 1194 is again closed but the gauge will release the coin before the trap 1209 closes and the coin will drop on to the trap 1194 and roll into the chute 1196 and pass to the nickel tube as before. The quarter stop 1206 is formed on an upwardly extending arm carried on the trap 1207 and adapted to be moved with it. It has been found in practice that a coin could wedge between a stationary stop and the trap when the trap is moved and thus interfere with the operation of the machine. The stops 1193 and 1211 are carried on upwardly extending arms on trap 1194 for a similar reason and adapted to be moved in a similar manner. The stop 1211 is provided in case a quarter should enter the chute 1192 while the trap 1207 and the stop 1206 are withdrawn and its momentum should carry it to the stop 1208 where it would rest on the nickel trap 1209, and when the trap is opened, would drop through onto the trap 1194 where it would be prevented from entering the nickel chute 1196 by the stop 1211, then when the trap 1194 is withdrawn, it will drop into the money drawer chute 1198.

It is evident that the various stops, traps and coin gauges just described must be withdrawn and returned in their proper sequence in order that the machine may be operative. The mechanism used in the operation of these parts will now be described with special reference to Figures 106 to 110 inclusive. These stops, traps and coin gauges are all cam controlled and are operated from cams either on the second cam shaft 13 or the short cam shaft 1212, which will hereafter be called the exhibitor cam shaft, mounted in suitable bearings on the exhibitor supporting brackets 1161ᵃ (Figure 103). A mutilated gear 1213 (Figures 108 and 102) is secured to the second cam shaft 13 and is adapted to drive the exhibitor cam shaft through the mutilated gear 1214 mounted thereon. It is necessary that the second cam shaft 13 should move a predetermined part of its revolution before starting the exhibitor cam shaft. This is accomplished by means of the mutilated gear 1214 having a pin 1215 mounted thereon and adapted to be engaged by the lug or tooth 1216 secured to the gear 1213. This long tooth is secured to the gear in such a position that it will engage the pin 1215 at the predetermined time and move the gear 1214 until it is in mesh with the gear 1213. The exhibitor cam shaft will then complete its revolution, again stopping when the mutilated portion is reached and the gear 1213 will complete its revolution. A lever 1217 is pivoted on an arm 1218 of the bracket 1219 secured to the intermediate frame 3. (See also Figure 112.) This lever is provided with a catch 1220 adapted to be engaged by the pin 1221 mounted on the gear 1214 and adapted to prevent the overthrow of the exhibitor shaft at the completion of its revolution. This is shown more in detail in Figure 108. The cam shaft is provided with a cam 1222 engaging the roller 1223 on the downwardly extending arm of the lever 1217, thereby raising the same and carrying the catch 1220 out of engagement with the pin 1221 and thus allowing the exhibitor cam shaft to be rotated. The catch 1220 is then allowed to return to its initial position and again engage the pin 1221 when the exhibitor cam shaft has completed its revolution.

Referring now to Figures 106 and 111, the stop 1182 and the trap 1183 are controlled by means of a cam 1224 (Figure 111) mounted on the cam shaft 13. The stop 1182 is mounted on the lever 1225 loosely mounted on the rock shaft 1226 which is supported in suitable bearings on one of the exhibitor brackets 1161ᵃ and the exhibitor bracket 1161ᵇ.

The trap 1183 is mounted on the arm 1227 supported on the bearing rod 1228 mounted on the brackets 1229 and 1230 on the back of the exhibitor. The trap is held in operative position by means of the spring 1231 and the stop 1182 is held in position by means of the spring 1232. The lever 1225 is provided with the arm 1233 on which is the lug 1234 adapted to extend in front of the arm 1227 and withdraw the trap 1183 during the movement of the stop 1182. The stop 1182 is withdrawn from the exhibitor by means of the cam surface 1235 engaging the roller 1236 on an arm 1225ᵃ of the lever 1225. The further movement of the lever 1225 by means of the cam surface 1237 engaging the roller 1236 brings the lug 1234 into engagement with the arm 1227 and thereby withdrawing the trap 1183.

The stops 1185 and 1187 are mounted on the lever 1238 (Figure 110) which is also loosely mounted on the rockshaft 1226 and are adapted to be withdrawn from the exhibitor by means of the cam 1239 on the shaft 13 engaging the roller 1240 on the arm 1238ᵃ of the lever 1238. The trap 1190 is mounted on the lever 1241 pivotally mounted on the bearing rod 1228 and is adapted to be held withdrawn from the exhibitor by means of the lug 1242 on the lever 1238 bearing against the arm 1243 on the lever 1241 and holding the trap out of the path of the coin when the stop 1185 is in its operative position as shown. It will be seen that when the stops 1185 and 1187 are withdrawn from the path of the coins by means of the cam 1239, the trap 1190 will be allowed to move forward by means of the spring 1244 to its operative position. The lever 1238 is held in its operative position by means of the spring 1245.

The coin stop 1203 is formed (Figure 107) on the lever 1246 loosely mounted on bearing rod 1226 and is operated by means of the cam 1247 mounted on the cam shaft 13 and adapted to engage the roller 1248 on the arm 1246ᵃ of the lever 1246, thereby withdrawing the coin stop from the path of the coin at the proper time. This lever being also held in operative position by means of the spring 1249.

Referring now to Figures 102, 103 and 106, the trap 1194 on which the stops 1193 and 1211 are formed is mounted on the lever 1250 and the arm 1251 which are pivotally mounted on the bearing rod 1252 supported in brackets 1253 and 1229 on the exhibitor. A roller 1254 (Figures 102 and 103) is mounted on the arm 1255 of the lever 1260 and is adapted to be engaged by the cam 1256 secured to the exhibitor cam shaft 1212 and is operated thereby in a similar manner to the stops previously described. As all of the stops and traps are held in operative position by springs, as illustrated, in the same manner as previously described, it is not thought necessary to further refer to them specifically. The trap 1209 is carried by the cam lever 1257 pivoted on the bearing rod 1252 and operated by means of the cam 1258 engaging the roller 1259 on the cam lever 1257, the cam 1258 being secured to the exhibitor cam shaft 1212.

The thickness gauge 1210 is formed on the cam lever 1260 and is operated through the roller 1261 mounted thereon being engaged by the cam 1262 also secured to the exhibitor cam shaft 1212. The thickness gauge 1195 is formed on the cam lever 1263 pivotally mounted on the bearing rod 1252 and adapted to be operated through the roller 1264 (Figure 107) mounted thereon being engaged by the cam 1265 secured to the exhibitor cam shaft 1212. The stop 1206 and the trap 1207 on which it is mounted are carried by the cam lever 1266 pivotally mounted on the bearing rod 1252 and operated through the roller 1267 mounted thereon engaging the cam 1268 on the cam shaft 1212. The gate 1199 is mounted on the rock shaft 1270 supported in the bearing 1271 on the back of the exhibitor. This rock shaft is provided with an arm 1272 (Figure 106) carrying pin 1273. A lever 1274 is pivoted at 1275 on the back of the exhibitor and is provided with a slot 1276 adapted to engage the pin 1273 on the arm 1272 and move the gate 1199 to the position shown by dotted lines in Figure 104 when the lever 1274 is operated. This lever is also provided with extensions 1277 adapted to engage the bearing member 1271 and limit the movement of the lever. The lever 1274 is provided with an arm 1278 which is connected to the arm 1279 on the sleeve 1280 by means of the link 1281, the arm 1279 being movably secured to the link 1281 by means of the pin 1282 in the slot 1283 and the spring 1284 bearing against the collar 1285 and the shoulder 1286 on the link 1281. The sleeve 1280 is loosely mounted on the rock shaft 1226 and is provided with an arm 1287 on which is mounted a roller 1288 adapted to engage the cam 1289 on the exhibitor cam shaft 1212 and be held in the position shown until released by the cam, when it will be operated by the spring 1290 and the gate will be moved in the manner described. The spring 1284 is provided so that in case a coin should be caught by the gate 1199 in such a manner as to prevent the movement of the same, the spring will allow the arm 1279 to complete its movement by means of the pin 1282 moving in the slot 1283.

The sleeve 1280 is also provided with an arm 1291 on which is pivotally mounted a rod 1292 extending rearwardly and into the opening 1293 in the quarter coin tube 655. When the roller 1288 is released by the cam 1289, the rod 1292 will be moved through the opening 1293 and into the quarter tube 655, thus allowing the full movement of the sleeve 1280 and the consequent opening of the gate 1199 and allowing the coins to pass into the tube 655. When the tube is filled with coins above the opening 1293, the rod 1292 will be prevented from entering the tube when the roller 1288 is released by the cam and the sleeve 1280 will be prevented from moving and the gate 1199 will consequently remain closed, thus sending the coins to the money drawer.

Referring now to Figures 99, 102 and 106, the stop 1197 is formed on the member 1295 pivoted on the lever 1296 secured to the rock shaft 1226. The member 1295 is provided with a downwardly extending arm 1297 adapted to engage the stop 1298 on the lever 1296 and be held in engagement therewith by means of the spring 1299. It will be seen that if the stop 1197 should engage a coin in its forward movement the spring 1299 will allow the lever 1296 to complete its forward movement without the danger of breaking any of the parts. The lever 1296 is provided with a roller 1300, which is held in engagement with the cam 1301 on the exhibitor cam shaft 1212 by means of the spring 1302. When the cam shaft is rotated the roller will be released during a portion of the revolution and the stop 1197 will be withdrawn from the path of the coin by the spring 1302. An arm 1303 is also secured to the rock shaft 1226, as shown in Figure 99 and on which is pivotally mounted the rod 1304 extending into the opening 1305 in the nickel coin tube 645. This operates in an exactly similar manner as the rod 1292, shown in Figure 107 so that when the nickel coin tube is filled above the opening 1305 the rock shaft 1226 will be prevented from moving and the stop 1197 will remain in its forward position, thus sending all the nickels to the money drawer as before described.

Referring now to Figure 112 and Figure 12, for the purpose of loading the machine with nickels and quarters and timing their entrance into the exhibitor, shaft 1306 is slidably mounted in suitable bearings in the frame 2 and the intermediate frame 3 and the bracket at 1219 on the frame 3. A gear 1307 is secured to this shaft and adapted to be driven by means of the pinion 1308 on the intermediate shaft 9. The pinion 1308 is loosely mounted on the shaft 9 and is adapted to be engaged by the clutch member 1309 held in engagement by means of a spring 1310. This clutch member is provided in order that the shaft 1306 may be turned backwardly without disengaging the gears. A bevel gear 1311 is loosely mounted on the shaft 1306 and held in position by means of the bracket 1219 and is provided with a clutch member 1312 adapted to be engaged by the clutch member 1313 on the gear 1307 when the shaft 1306 is moved by hand in the direction of the arrow. A collar 1314 is secured to the shaft 1306 and is provided with a groove 1315 in which is engaged the member 1316 pivotally secured to the link 1317, the other end of which is pivoted to an arm 1318 on the lever 1217, shown more in detail in Figures 102 and 108. When the shaft 1306 is moved in the direction of the arrow, the link 1317 will be moved to a vertical position, thereby raising the lever 1217. This lever is connected to the rock shaft 1319 mounted in suitable bearings on the front of the machine, as shown in Figure 1 by means of the link 1320 (Figure 108) and the arm 1321 mounted on the shaft. An arm 1322 is also secured to the shaft 1319 and is connected to the contact member 48 by means of the rod 1323 and the spring 1324. It will thereby be seen that when the shaft 1306 is moved by hand in the direction of the arrow, that the motor will be started by closing the contact members 50 and 51 through the mechanism described, thus driving the shaft 1306 from the shaft 9 through the pinion 1308 and the gear 1307. In loading the machine with nickels, it is necessary to run the exhibitor shaft 1212, thus operating the sorting and testing mechanism operated therefrom without running the second cam shaft, the gear being allowed to rotate through the mutilated portion of the gear 1214. This exhibitor shaft 1212 is driven from the shaft 1306 by means of the shaft 1325 supported in suitable bearings on the bracket 1219 and one of the exhibitor supporting brackets 1161ᵃ (Figure 102). A bevel gear 1326 is secured to the exhibitor shaft 1212 and is driven by means of the bevel gear 1327 secured to the shaft 1325. The other end of this shaft is provided with a bevel gear 1328 and adapted to be driven from the gear 1311 slidably mounted on the shaft 1306. When the shaft 1306 is moved in the direction of the arrow, the clutch member 1313 will engage the member 1312, thereby operating the sorting and testing mechanism through the means described.

A disc 1329 (Figure 112) is secured to the shaft 1306, a portion of the disc being cut away and one edge of the opening being provided with a knife edge 1330. This disc normally rests against the bearing on the side frame 2, thus limiting the movement of the shaft in its inoperative position. A stop member 1331 is secured to the side frame 2, as shown in Figure 113 and its relative position in regard to the disc is shown by dotted lines in Figure 112. This stop is also provided with a knife edge cooperating with the knife edge on the disc. When it is desired to start the loading mechanism the shaft is turned by hand until the opening in the disc 1329 is in alignment with the stop 1331. This brings the clutch members 1312 and 1313 into operative alignment. The shaft is then moved in the direction of the arrow until the disc 1329 passes the stop 1331 and the motor will then be started through the mechanism described.

In case the operator neglects to move the shaft 1306 the distance allowed, the knife edge on the stop 1331 and the disc 1329 will complete the movement or will force the shaft to complete the movement. This shaft is provided with a knob 1332 slidably mounted on the outer end of the shaft by means of the pin 1333 in the slot 1334. A spring 1335 is mounted on the shaft and is normally adapted to force the knob outwardly. In order to move the shaft 1306 to its operative position it is necessary to open the case door 970, which in its closed position rests against the knob 1332. In order to return the shaft to its initial position or that shown in Figure 112, the operator pushes against the knob 1332, this compresses the spring 1335, and when the opening in the disc 1329 comes into alignment with the stop 1331 the shaft will again move to its initial position by reason of the pressure of the spring 1335. In case the operator neglects to return the shaft to the position shown, the closing of the door 970 will force the knob 1332 inwardly and the shaft will be moved in the same manner as before. A cam 1336 is secured to the shaft 1306 and when the shaft is moved to its operative position, is carried to a position where it will engage the roller 1337 on the cam lever 1338, mounted on the bracket 1339 secured to the side frame 2. This cam lever operates the timing mechanism mounted on the coin chute 1204 for the purpose of dropping the coins into the sorting portion of the exhibitor at the time when the stops are in their proper position to receive them. In order to accomplish this result, a coin stop 1340 is adapted to move through the opening 1341 and in the path of the coin in the coin loading chute 1204. This stop is mounted on member 1342 pivoted on the bearing rod 1343 which is supported in brackets 1344 on the chute 1204. A spring 1345 is provided on the bearing rod 1343, one end of the spring resting against the chute 1204 and the other end bearing on the stop member 1342 and normally holding the stop 1340 in the path of the coin. A stop 1346 is secured to the stop member 1347, also pivoted on the bearing rod 1343. This coin stop is adapted to be moved into the path of the coin through the opening 1348 in the coin chute and is normally held out of the path of the coin by means of the spring 1349 secured to the arm 1350 on the stop member 1347. This stop member is also provided with a lug 1351 adapted to engage the chute 1204, thereby limiting the outward movement of the stop 1346. The cam lever 1338 is connected to the arm 1350 of the stop member 1347 by means of the link 1352 which is provided with a slot 1353 engaging the pin 1354 on the arm 1350. The link and cam lever are held in their operative position by means of the spring 1355. Thus it will be seen that when coins are dropped into the coin chute 1204, they will rest on the stop 1340, and when this stop is moved out of the path of the coin through the operation of the cam surface 1356 on the cam 1336, the stop 1346 will be moved into the path of the coin which will rest thereon. When the stop 1346 is moved into the path of the coin by the cam surface 1356, the lug 1351 engages the stop member 1342 and moves the stop 1340 out of the path of the coin, allowing the coin to drop on the stop 1346. The cam surface 1357 then comes into operation, allowing the stop member 1347 a sufficient movement so that the lug 1351 will release the stop member 1342 and allow it to move the stop 1340 into engagement with the following coin and holding it in that position until the further movement of the cam allows the stop 1346 to move out of the path of the coin which is then delivered to the exhibitor at the proper time and the operation is repeated on succeeding coins.

When the casing door 970 is open for any purpose, such as operating the coin loader or reloading the machine with stamps, it is desired that the inner coin inlet door (Figure 4) should be locked in its closed position so as to prevent the starting of the machine while the door is open. This is accomplished by means of the rod 1358 near the top of the machine (Figure 1) and slidably mounted on the bracket 1359 supported on the frame of the machine. The rod is provided with a spring 1360 secured thereto and attached to the bracket 1359 and is prevented from outward movement by means of the door 970 pressing against the end of the rod while the door is closed. The other end of the rod extends through an opening in the downwardly extending arm 1361 of the pawl 62 (Figure 4) and is provided with a head 1362 adapted to engage the downwardly extending member 1361 when the door is open and the rod moved outwardly by means of the spring 1360. This brings the pawl 62 into engagement with the lug 55 on the inner door 54 (Figure 9), thus effectively preventing the insertion of coins while the case door is open unless the rod is held inwardly by hand.

In order to effectively lock the inner door 54 during the operation of the coin loader, a collar 1363 (Figures 113 and 114) is provided on the rod 1358 and is carried by the rod into the position shown by dotted lines in Figure 114 when the door 970 is open. During the operation of starting the loader, a rod 1364 is raised into the path of the collar 1363, thereby effectively locking the rod 1358 in its outward position and preventing the inner door from being opened until the loader shaft 1306 has been reset to its initial position.

The rod 1364 is slidably supported in the bracket 1359 and the bracket 1365 secured to the side frame 2. This bracket is provided with a cam member 1366 on which is supported the cam member 1367 secured to the rod 1364. These cam members are so designed that when the rod 1364 is partially rotated, it will be raised in the path of the collar 1363 as described. The cam member 1367 is provided with a pin 1368 adapted to engage the slot 1369 in the lever 1370. This lever is pivoted to the bracket 1339 and is provided with a roller 1371 adapted to be engaged in the groove 1372 formed between the cam 1336 and the disc 1329. Thus it will be seen that during the movement of the shaft 1306 in starting the coin loader the cam member 1367 will be partially rotated on the cam member 1366, thereby raising the rod 1364 and effectively locking the inner door 54 through the means described.

In order to facilitate the easy removal of the stamps from the machine and to prevent the customer from removing more stamps than he is entitled to, a cutter is provided, and acting in conjunction with the perforator before described, allows the stamps purchased to be removed without danger of tearing them. This cutter is illustrated in detail in Figures 116 and 117. A rock shaft 1400 is mounted in suitable bearings in the stamp section side frames 811 and 812 and secured thereto and extending forwardly therefrom is a knife carrying member 1401. This member is provided with laterally extending arm 1402 on the outer ends of which is pivotally mounted the blade member 1403 by means of the ears 1404 and the pins 1405. Springs 1406 are secured to the pins 1405 and the stamp section side frames and are adapted to raise the knife member 1403 until the serrated edge 1407 of the knife blade 1403 comes in contact with the lower side of the stamp at the line of perforations, and the raised cutting edges 1408 have cut through and completely severed the stamps at each end of the line of perforations, thus allowing them to be easily removed. The cutting edge of the knife member 1403 is held in frictional contact with the front face of the member 842 by means of the spring 1409 secured thereto, as illustrated. Stops or guide members 1410 are secured to the member 842 extending outwardly and in front of the knife member 1403 to prevent the same from being moved away from the face of member 842. The knife carrying member 1401 is provided with a downwardly extending arm 1411 having a catch 1412 adapted to be engaged by the latch member 1413 pivoted on the bracket 1414 secured to the bottom cross frame 816 of the stamp section. The latch member is adapted to be held in position by means of the spring 1415 and is pulled backwardly to release the knife carrying member 1401 by means of the magnet 1416 secured to the bottom cross frame 816 of the stamp section. A cam 1417 is secured to the shaft 875 and when the machine is at rest engages the spring contact member 1418 which is insulated from the machine and forms a part of the circuit 1419 used in operating the magnet, the battery 1420 being provided for the purpose of energizing the magnet. A bar 1421 extends across the front of the stamp section and in the path of the travel of the stamps when coming from the machine and is pivoted to the side frames 811 and 812 by means of the arms 1422. A spring 1423 is secured to one of these arms and adapted to engage the contact member 1424 secured to the side frame 811 and insulated therefrom.

One of the wires of the circuit 1419 is also secured to this contact member, the frame of the machine being used as a portion of the circuit when the contact is made in the manner to be described. The bar 1421 is held in its raised position against the stop 1425 (Figure 116) by means of the spring 1426. When the stamps are being delivered from the machine, they move in the path shown by the dotted line in Figure 117, first striking the inclined side of the bar 1421 and being guided upwardly then striking the inclined shield or guide 1427 and being guided downwardly, as illustrated. Thus it will be seen that when the customer pulls the stamps for the purpose of removing them, the bar 1421 will be pulled downwardly, thus closing the circuit through the spring 1423 and the contact member 1424. The magnet will then move the latch member 1413 releasing the catch 1412 on the knife carrying member and the knife will be raised by means of the spring 1406 and the stamps will be cut as previously described. A lever 1428 is secured to the rock shaft 1400 and extends upwardly, its upper end being near the shaft 875 and when the knife 1403 is moved upwardly through being released by the magnet, the arm 1428 moves into the path of the cam 1417. It will be understood that as soon as the bar 1421 is released by tearing off the stamps, the contact will again be broken, thus releasing the latch 1413 and leaving it in position to again engage the catch 1412 when the knife carrying member 1401 is again depressed. As soon as the shaft 875 starts its revolution in the next operation in the purchase of more stamps, the cam 1417 will engage the arm 1428, thereby partially rotating the rock shaft 1400 and moving the knife carrying member 1401 downwardly and the catch 1412 will again be engaged by the latch 1413 and the knife will be held in its downward position until the stamps are again removed. As soon as the shaft 875 starts its revolution, the cam 1417 will move away from the contact member 1418, thus breaking the circuit and preventing the operation of the knife during the moving of the stamps. It will be understood that the knife could be put above the stamps and work downwardly by simply reversing some of the parts.

Having described my invention and set forth its merits what I claim is:—

1. In a vending and change making machine, the combination of article-dispensing means adapted to deliver articles successively and arranged for control of the quantity of successive deliveries by the user, and change making means adapted to deliver change in reducible amounts and controlled for amount-reduction by each successive operation of the article-dispensing means.

2. In a vending and change-making machine the combination of article-dispensing means adapted to deliver successively articles of different values and arranged for article-selective control by the user, and change-making means adapted to deliver change in reducible amounts arranged for control of amount-reduction by each successive operation of the article dispensing means.

3. In a vending and change making machine, in combination, article-dispensing means adapted to deliver articles of different values in different quantities and arranged for selective control by the user of the kind and quantities deliverable, and change making means adapted to deliver change in reducible amounts, controlled for amount reduction by the article dispensing means to reduce the change by the value of the article or articles dispensed.

4. In a vending and change making machine the combination of commodity delivering means selectively controllable by the user to vary the value of commodity delivered, and change making means arranged and adapted to limit the operation of the commodity delivering means, and adapted to deliver change in reducible amounts, said change making means subtractively controlled as to amount by the commodity delivering means according to value of commodity delivered.

5. In a coin controlled vending machine the combination of commodity dispensing means adapted to deliver commodities of different values, credit limiting mechanism limiting the operation of the commodity dispensing means and controlled by the latter accordingly with the values of commodity dispensed, and user's manipulative means controlling the commodity dispensing means, whereby in a single transaction the user may selectively secure commodity of different values not to exceed the credit limit.

6. In a commodity vending machine the combination of commodity dispensing means adapted to deliver successively a plurality of items of different individual values, credit limiting means governing the operation of said commodity dispensing means and subtractively controlled by the latter in accordance with the value of each item dispensed, to limit the aggregate value of items dispensable, and user's manipulative means controlling the items-selective operation of the commodity dispensing means.

7. In an automatic vending machine the combination of commodity dispensing means adapted to dispense successively commodity items in different quantities and of different individual values, credit limiting means adapted to be set according to different value limits and governing the commodity dispensing means to limit their action accordingly, said credit limiting means being automatically controlled by the commodity delivering means subtractively to reset the credit limit accordingly with the values of the respective commodity items delivered, and user's manipulative means controlling selectively the values and quantity of commodity items delivered.

8. In a commodity vending machine, the combination of a plurality of commodity dispensing mechanisms, each adapted to deliver successively commodity items of determined value respectively different for said mechanisms; coin controlled credit limiting means adapted and arranged to be set initially according to value of different control coins and to govern the commodity dispensing means accordingly, said credit limiting means being subtractively controlled by each commodity dispensing mechanism according to the value of the commodity which it respectively dispenses; and user's manipulative means controlling selectively the operation of the commodity dispensing mechanisms, whereby the aggregate value of the credit-setting may be delivered in any appropriate plurality of different valued commodity items.

9. In a vending and change making machine the combination of commodity dispensing means adapted to deliver different quantities of differently valued items, change making means adapted to deliver reducible amounts of change, automatically acted upon by the commodity dispensing means to reduce the change amount accordingly with value of commodity items delivered, and governing the commodity dispensing means to disable the latter when itself incapacitated for change delivery, and user's manipulative means selectively controlling the actuation of the commodity dispensing means and the delivery operation of the change making means.

10. In a coin controlled vending and change making machine the combination of commodity-dispensing means adapted to deliver different quantities of differently valued items, change making means adapted to deliver reducible amounts of change, automatically acted on by the commodity dispensing means to reduce the change-amount accordingly with the value of commodity items delivered and governing the commodity dispensing means to disable the latter when itself incapacitated for change delivery, coin controlled means adapted and arranged to set the change making means differently for different denominations of controlling coins, and to condition the commodity dispensing and change making means for delivery actuation, and user's manipulative instrumentalities selectively controlling actuation of the commodity dispensing means and of the change making means, whereby the user may occasion delivery of selected items and change, if any, to the initially set change limit.

11. In an automatic commodity vending and change making machine, coin receiving and size-testing means adapted and arranged to receive and test coins of different denomination, change making means settable according to coin size characteristics and thereby conditioned to deliver a certain credit-value in change, commodity dispensing means selectively controllable by the user to vary the value of commodity delivered, substractively controlling the setting of the change making means, and governed by the latter to be disabled from further commodity delivery when said setting becomes zero.

12. In a commodity vending and change making machine, the combination of user-controlled commodity dispensing means successively operatable at will for delivery of commodity units each of known value; change making means adapted to deliver variable change quantities, said change making means being controlled by the commodity delivery means for reduction of the change accordantly with each delivery operation of the commodity dispensing means, and one of said means controlling the other to limit the aggregate value of change and commodity deliverable, whereby within such value limit the user may, without predetermination of the number of items to be delivered, stop the delivery at any point and take the residual value in change.

13. In a coin-controlled commodity vending and change making machine, the combination of coin-controlled means adapted for control by coins of various denomination and variably settable for motion to an extent according to the controlling coin denomination; commodity dispensing means, successively operatable, connected with said settable means to reset same subtractively in accordance with each successive commodity delivery, and to be incapacitated for further commodity delivery when the successive resettings appropriately approach the extent of the initial setting; change delivering means operatable accordantly with any resetting of said variably settable means, and user's manipulative means controlling selectively each operation of the commodity delivery means and controlling the operation of the change delivery means.

14. A stamp vending and change delivering machine comprising, in combination, change delivering means, coin-controlled credit limiting means governing the change value to be delivered by said change delivering means, variable stamp-dispensing means automatically controlling the credit limiting means to diminish said change amount accordingly with stamp-value delivered, and user's manipulative means controlling the delivery operations of the stamp-dispensing and change-delivering means.

15. A stamp vending and change delivering machine, comprising, in combination, change making-delivering means, credit limiting means settable to vary and govern the change value to be delivered by said change delivering means, means to receive coins of different denominations and govern the setting of the credit limiting means accordingly, stamp dispensing means controlling the credit limiting means to diminish the change-amount-setting accordingly with stamp value delivered, and user's manipulative means for controlling the stamp dispensing and change-delivering means.

16. A stamp vending and change making machine comprising, in combination, change making means including credit limiting means having devices arranged for setting movement to vary the amount of change to be delivered and operating movement to cause the change delivery, and change delivering mechanism actuated thereby, stamp handling means for dispensing stamps, co-operating with said credit limiting means to reduce the setting in accordance with value of stamps dispensed, and governed by said setting to limit its own stamp dispensing operation, and user's manipulative means controlling the stamp-dispensing means to vary the value-aggregate of stamps dispensed and controlling the operating movement of the stated devices to cause change delivery.

17. In a commodity vending machine, credit limiting means including mechanism settable to correspond with a limit of value, and movable thence to a no-credit position, and commodity dispensing means co-operating therewith, adapted to deliver selected quantities of selected commodity items of respective different values and arranged to move said settable mechanism toward no-credit position in accordance with value of each commodity item delivered, and disabled from further commodity delivery when said settable mechanism is in no-credit position, 18. In a commodity vending machine, coin receptive means, commodity dispensing means adapted for successive operations each to deliver, selectively, differently-valued commodity items, user's manipulative means selectively controlling the dispensing means as to number and value of items dispensed, and means to limit the operation of said commodity dispensing means controlled by the coin to set said limit differently for coins of different denominations.

19. In a commodity vending machine, coin receiving and value-characteristics-testing means, credit limiting means controlled thereby for setting up a credit limit in known relation to the test-indicated values of coins of different denominations, commodity dispensing mechanisms respectively operatable to dispense articles of different values in selectively-different quantities, means controllable by the user to operate the commodity dispensing means for selection of values and quantities of items for delivery, said commodity dispensing means being limited in extent of operation by the credit limiting means.

20. In a change making machine, means to receive coins of different denominations and to test value-indicating-characteristics thereof; change coin delivering means, credit-limiting means settable to condition said change coin delivering means to deliver various change combinations, said credit limiting means being coin controlled to set up different change combinations according to the value-indicating-characteristics of inserted coins, a motor for operating said coin testing means and said delivering means, coin controlled means to condition said motor to operate said test means, and user's manipulative means to condition said motor to operate the change delivering means.

21. In a change making machine, means to receive coins of different denominations and to test value-indicating characteristics thereof, change coin delivering means, means settable to condition said change coin delivering means to deliver various change combinations, said credit limiting means being coin controlled to set up different change combinations according to the value-indicating characteristics of inserted coins, a motor for operating said coin testing means and said delivering means, coin controlled means to condition said motor to operate said testing means, user's manipulative means to condition said motor to operate the change delivering means, and automatic means for disabling said user's manipulative means during the operation of the testing means.

22. In a change making machine, the combination of coin receiving and value-characteristics testing mechanism, change-coin receptacles, means to deliver coins from said receptacles, a motor to actuate said testing and coin-delivering means, motor driven automatic means cooperating with the coin receiving and testing means variably to set said change-coin delivering means substantially in accordance with the test-indicated value of the inserted coin, coin controlled means for initiating the operation of the motor to work the testing and setting means, and user controlled means for causing the motor to drive the change delivering means.

23. In a change making machine, change-coin receptacles for different denominations, user-controlled means to deliver coins therefrom, a motor for driving said delivering means, coin receiving means, coin testing means driven by said motor and arranged to test a value indicating characteristic of the inserted coin, settable means determining the operation of the change coin delivering means, automatically actuated in accordance with the test-indicated value of the inserted coin.

24. In a change making machine, change-coin receptacles for different denominations, user-controlled means to deliver coins therefrom, a motor for driving said delivering means, coin receiving means, coin testing means driven by said motor and arranged to test a value indicating characteristic of the inserted coin, settable means determining the operation of the change coin delivering means, automatically actuated in accordance with the test-indicated value of the inserted coin, and automatic means for delivering inserted coins of proper denominations to the respective change-coin receptacles.

25. In a change making and commodity vending machine, means to receive coins of various denominations, means arranged and adapted to test a value indicating characteristic of the coins, change making means automatically settable to deliver change according to the test-indicated value of the coin, commodity delivering means arranged and adapted to deliver commodity items successively, and at each operation automatically to reset the change making means subtractively, said commodity delivering means being limited in operation by said change making means, and user-controlled means for operating said commodity delivering means any plurality of times within its limits and for operating the change delivering means before any commodity delivery occurs or after any desired number of commodity deliveries.

26. In a change making and commodity vending machine the combination of coin receiving means adapted to receive coins of various denominations, coin testing means arranged to reject spurious coins failing in test and adapted to determine a value indicating characteristic of each coin retained, credit mechanism automatically settable according to the test-determined coin value, commodity delivering means arranged to reduce the setting of said credit mechanism and to be limited in delivery operation by said credit mechanism, and change delivery means operatable in accordance with the setting of the credit mechanism.

27. In a change making and commodity vending machine the combination of correlated devices for testing various denominations of coins, rejecting spurious coins and retaining those passing test, said means determining value indicating characteristics of the coin retained, credit means settable in accordance with said test-determined value but lower than face value of the coin, article delivering means limited in operation by said credit means and connected for subtractively acting on the latter, and change-coin delivering means operatable according to the setting of said credit means.

28. In a change making and commodity vending machine associated means for receiving coins of different denominations and measuring the value indicating size thereof, means adapted to dispense varying quantities of articles, means adapted to deliver change in varying quantities subtractively controlled by the article delivering means and limiting the operation of the article delivering means and means for initially setting the change delivering means accordingly with the test-determined value of the coin.

29. In a commodity vending and change making machine the combination of article delivery devices having a shaft rotatable to effect article delivery, user's manipulative means controlling rotation of said shaft, change making means comprising change delivery devices and a change shaft settable for different rotative movements to condition said change delivery devices to deliver different change amounts, means to prevent rotation of the article delivery shaft when the change shaft is in no-change setting, and automatic means for connecting said article delivery shaft and said change shaft to cause the former to move the latter toward no-change position as articles are delivered.

30. In a stamp vending and change making machine the combination of stamp delivery means successively operatable, change delivery means, settable credit limiting means coin controlled to set a limit lower than the controlling coin value, said credit limiting means subtractively operatable by the stamp delivering means and arranged to disable the latter on attaining a predeterminately low setting and arranged to control the change-delivery means.

31. In a commodity dispensing and change-making machine, means to receive and position a coin, credit limiting means arranged for co-acting with said coin to set a credit limit substantially in accordance with coin value, change delivering means operatable to deliver change in accordance with such setting, user's manipulative means for actuating said change delivering means, means for successively delivering items of known value, governed by said credit limiting means, user's manipulative means controlling the delivery operations of said commodity delivering means, and means to cause said article delivering means to reset the credit limiting means in accordance with the value of each item dispensed.

32. A commodity vending and change making machine comprising, in combination, a motor, motor driven variably settable change making means operatable to deliver change, coin receiving means, motor driven means to test a value indicating characteristic of inserted coins of different denominations and to set said change making means to deliver change accordingly, motor driven commodity dispensing means limited by the setting of the change making means and selectively operatable to deliver commodities to different values and arranged to alter the setting of the change making means accordingly, and user's manipulative means controlling the delivery operation of said change making means and the selective operation of said commodity dispensing means.

33. In a stamp vender and change maker the combination of stamp delivery means operatable to deliver a plurality of stamps successively, change delivering means, a plurality of coin chutes for coins of different denominations, and credit limiting means having means co-acting with said chutes to establish a credit limit according with assigned denominations of the control-coin-containing chute, said credit limiting means subtractively controlled by the stamp delivering means and governing change delivering operation of the change delivering means.

34. A coin controlled vending machine comprising coin receiving mechanism, stamp delivering means comprising stamp holders and means to actuate them, manually operatable means controlling such actuating means, change making mechanism, controlled by said stamp delivering means as to change-amount reduction and limiting the operation of said stamp delivering means, manual means controlling the actuation of said change making means, said change making means being controllable for initially setting by an inserted coin, whereby the stamp delivering means and change making means are adapted to be operated to deliver coins and stamps substantially in accordance with the value of the deposited coin.

35. An article vending and change making machine comprising article delivery means, user-controlled for successive delivery of articles therefrom to a quantity variable at will, and subtractively resettable means limiting the operation of the article delivery means and controlled by the latter to be successively subtractively reset according to the value of the article or articles delivered, and change delivering means controlled by and operatable in accordance with the first setting or any resetting of the subtractively resettable means.

36. An article vending and change making machine comprising a plurality of article delivering mechanisms for articles of respectively different predetermined values, user-controlled means for selectively causing successive delivery to desired quantity from each thereof, and subtractively resettable credit limiting means limiting the operations of said article delivering mechanisms and subtractively resettable upon each delivery according to the value of each article dispensed, and change delivering means controlled by and operatable in accordance with the setting or resetting of said credit limiting means.

37. An article vending and change making machine comprising, in combination, credit limiting means, means to set the same to indicate a known value, article delivering means successively operatable at will by the user to deliver a desired quantity of articles and controlling the credit limiting means to reset the same subtractively in accordance with the value of articles delivered, said resettable means controlling the article delivering means to prevent delivery beyond a minimum resetting, and change delivering means controlled by and operatable in accordance with the setting of said credit limiting means for change-delivery of the initially set amount or the difference between the initially set amount and the value of the article or articles delivered.

38. An article vending machine comprising a plurality of successively operatable article delivery means for differently-valued articles, coin receiving means, and coin controlled means responsive to a received coin for conditioning said article delivery means for any number of operations aggregating in article-deliveries substantially the coin value.

39. A plurality of commodity vending machines comprising commodity delivery means, respectively adapted and arranged to deliver selectively articles of different values, coin receiving means, and coin controlled means for conditioning said commodity delivering means to deliver any selected plurality of items successively, aggregating a certain value.

40. A stamp vending machine comprising coin receiving means, stamp delivering mechanism, adapted and arranged to deliver stamps of different values selectively and successively, user's manipulative means controlling said stamp delivery means as to values and number of each value delivered, and coin controlled means for limiting the operation of the stamp delivering mechanism according to the value of the coin received.

41. A coin controlled vending machine comprising coin receiving and testing means, stamp delivering means comprising mechanisms for separately handling stamps of different values, credit limiting means coin controlled and automatically operatable to set up credit upon the insertion of a coin into the receiving means, said credit limiting means subtractively controlled by each mechanism of the stamp delivering means according to the value of its stamps delivered and arranged to disable the latter at a predetermined low credit setting.

42. A coin-controlled vending machine comprising coin receiving means, a change making means to be set by the coin, article delivering means limited by the change making means and arranged to act thereon to vary its change delivery, a motor, coin controlled means for initiating motor operation, to set the change making means, and user-controlled means selectively to initiate motor operation to actuate the article delivering means and the change delivering means.

43. A coin controlled vending machine comprising, in combination, coin receiving mechanism, a plurality of article dispensing mechanisms dispensing articles of known value, user's manipulative means controlling the delivery operation thereof, coin controlled credit limiting means, associated with said article delivery means to be moved by each operation accordingly to the value of the article delivered, and limiting by aggregate value the delivery of said article delivering means.

44. A coin controlled vending machine comprising a coin receiving mechanism, a plurality of stamp vending mechanisms for stamps of different values, credit setting up mechanism adapted to set up a credit upon the insertion of a coin into the machine, and means for actuating said stamp vending mechanisms selectively, each actuation of a stamp vending mechanism deducting the appropriate stamp-value from the total amount of credit set up.

45. A coin controlled vending machine comprising coin receiving means having a single orifice, automatic means for testing a value indicating characteristic of the received coin; automatic credit mechanism adapted to set up a credit substantially accordant with the test-indicated value of the coin, user-controlled change delivering means controlled by the credit mechanism to deliver change accordingly, user-controlled article delivering means for successively delivering articles and subtractively acting on said credit means to reset the same accordantly with the value of each article dispensed and limited in its operation by said credit mechanism; automatic means to prevent coin insertion while the credit mechanism is being set up, and automatic means for restoring the credit mechanism to normal upon subsequent insertion of another coin before exhaustion of the credit.

46. In a coin controlled vending machine, a credit limiting mechanism normally having a predetermined credit set up, coin controlled means operable upon the insertion of a coin into the machine adapted to set up a credit substantially accordant with the value of the controlling coin by either wiping out the difference in credit between the coin and the normal credit, or by adding to the normal credit the difference between the normal credit and the coin, depending upon the value of the coin inserted, and commodity delivering means limited in operation by the credit limiting means and controlling the latter to subtract the value of commodity dispensed from the credit set up.

47. A coin controlled vending machine comprising coin receiving mechanism, stamp vending mechanism, change making mechanism, credit setting up mechanism adapted to set up a credit equal to the value of the coin deposited, less a fractional part thereof, means for actuating the stamp vending mechanism, each actuation of the stamp vending mechanism deducting the value of said stamp from the credit set up, and means for actuating the change mechanism to deliver to the operator the difference in value between the value of the stamp or stamps vended and the total credit initially set up.

48. A coin controlled vending machine comprising a coin receiving means, stamp vending mechanism, coin controlled credit setting up mechanism, means for actuating the stamp vending mechanism, the actuation of the stamp vending mechanism deducting from the credit set up upon the insertion of a coin, change delivering mechanism operatively associated with and governed in change-delivery by said credit setting up mechanism and means for actuating the change delivering mechanism, whereby the change mechanism may be actuated to give the operator the proper change from the coin inserted.

49. A coin controlled vending machine comprising receiving mechanism for different-denomination coins, weighing means for the coins deposited in said receiving mechanism, a movable conveyor carried by said receiving mechanism and cooperating with said weighing means, coin chutes for coins of different denominations, means for conveying the inserted coin from said weighing means to the chute of its denomination, stamp vending mechanism set to operate by a proper coin and change making mechanism settable to deliver different change amounts according to which chute contains the coin.

50. A coin controlled vending machine comprising coin receiving mechanism, separate weighing means for each denomination of coin, a movable conveyor carried by said receiving mechanism and cooperative with each of said weighing means, coin chutes leading from each of said weighing means, means for receiving the coins from said chutes, stamp vending mechanism set to operate by a proper coin, and change making mechanism, said change making mechanism settable to limit its operation and that of the vending mechanism according to the delivery of the coin into different chutes.

51. In a stamp vending machine, a credit setting up mechanism having a normal predetermined credit set up, and means operatively associated therewith adapted upon the insertion of a coin of less value than the predetermined credit to immediately wipe out the difference between the normal credit and the value of the inserted coin, less a fractional part thereof.

52. In a stamp vending machine, a credit setting up mechanism having a normal predetermined credit set up, and means operatively associated therewith adapted upon the insertion of a coin of greater value than the normal credit to immediately add to the normal credit the difference between the value of the coin inserted and the normal credit, less a fractional part thereof.

53. A stamp vending machine comprising coin receiving mechanism, means for ejecting spurious coins, means for measuring the thickness of each accepted coin, weighing mechanisms adapted to be controlled by said measuring means, and stamp vending mechanism operatively associated with said receiving mechanism.

54. A coin controlled vending machine consisting of coin receiving mechanism, means for testing the thickness of each coin, weighing means for said coins, means connecting the testing means with said weighing means, and adapted to adjust the latter means, and stamp vending mechanism operatively associated therewith.

55. A stamp vending machine comprising coin receiving mechanism, means for ejecting spurious coins, means for testing the thickness of each accepted coin, weighing means; means operatively connecting said thickness-testing means with said weighing means whereby each coin tested for thickness will automatically set the weighing means corresponding to the tested coin inserted, and stamp mechanism operatively associated with said receiving mechanism.

56. A stamp vending machine comprising coin receiving mechanism, means for testing the thickness of each denomination of coin, weighing means, means connecting the testing means with said weighing means to adjust the latter for differences in coin thickness, a rejected-coin-chute, an-accepted-coin-chute, means for discharging the accepted and rejected coins into their respective chutes, and stamp vending mechanism adapted to be set to operate by the accepted coin.

57. In a coin controlled vending machine, coin receiving mechanism, credit mechanism having rotatable parts for setting up value indications, and otherwise-movable operating parts to work according to the rotatable setting, actuating mechanism associated with said coin receiving mechanism to be coin controlled and adapted to rotatively set the first said parts upon coin insertion to set up a credit substantially in accordance with the value of the coin inserted, article dispensing means successively operatable, and limited in operation by the rotatable parts of the credit mechanism, said article dispensing means connected subtractively to rotate said rotatable parts accordantly with each article delivery, change delivering means operatable by movement of the second-stated parts of the credit mechanism, and user's manipulative means controlling the actuation of said change delivering means.

58. In a vending and change making machine, coin receiving mechanism, a motor, motor driven credit mechanism associated with the coin receiving mechanism, to be coin-controlled to set up a credit substantially corresponding with the value of the received coin, coin controlled means for initiating such motor operation, motor driven article delivering means for delivering selectively variable quantities of articles, user's manipulative means governing the motor actuation thereof, said article delivering means subtractively actuating the credit mechanism, and motor driven change delivering mechanism operatively associated with said credit mechanism for change delivery in accordance with its variable setting, and user's manipulative means governing the actuation of said change delivering means.

59. In a stamp vending machine, credit mechanism rotatably settable, coin controlled mechanism for setting said credit mechanism substantially according to the value indicating size of the coin, change delivering mechanism adapted to deliver change in accordance with the credit setting, commodity delivering mechanism, and means interposed between said commodity delivering mechanism and credit mechanism for resetting the latter in accordance with value of commodity delivered.

60. In a coin controlled vending machine, associated mechanisms adapted to receive and test each coin inserted, tested-coin-controlled credit mechanism automatically settable in substantial accordance with coin value, vending mechanism operatively associated with said credit mechanism to be limited in operation thereby, and automatic means for setting said credit mechanism to a predetermined normal credit between the limits of its settable range preliminarily to the coin controlled setting.

61. In a vending and change making machine, the combination of a motor, motor driven, user-controlled, rotatable, successively-operatable article-delivering means; motor driven, user-controlled change delivering means, credit mechanism having a rotatable part variably settable, controlling the change delivering means as to value of change deliverable and subtractively resettable by the article delivering means and limiting the maximum operation of the latter, and coin controlled motor driven automatic means for initially setting said credit mechanism substantially accordantly with the value of inserted coins of different denominations.

62. Coin controlled article vending and change making apparatus, comprising, in combination, article delivering means including a unidirectionally rotating part for infinite successive deliveries, user's manipulative means controlling the successive actuation of said part, credit mechanism including a reversible rotatable part for movement from and toward zero position to indicate value, arranged to be subtractively reset by the article delivering means and to disable said article delivering means when in zero setting, change delivering means operatable to deliver change according to the value indicating position of said rotatable part of the credit mechanism, and coin controlled means responsive to coins of various denominations for initially setting said rotatable part of said credit mechanism to indicate substantially the value of the inserted coin.

63. A coin controlled vending machine, comprising coin receiving mechanism, credit mechanism, means for actuating said credit mechanism upon the depositing of a coin into the machine serving to set up a predetermined amount of credit in the credit mechanism, means controlled by the coin inserted subsequently setting up a true amount of credit equal to the value of the coin deposited less a fractional part deducted, and vending mechanism associated with said credit mechanism subtractively to affect the credit setting and itself limited in operation by the credit mechanism.

64. An automatic stamp vending machine embodying coin receiving mechanism, credit mechanism, means actuating said credit mechanism, the insertion of a coin of any denomination adapted to set up a predetermined credit in the credit mechanism and then subsequently set up a total credit by either adding to or subtracting from the predetermined credit, equal to the value of the coin inserted less a fractional part thereof, and vending mechanism operatively associated with said mechanisms.

65. An automatic vending machine comprising coin receiving mechanism, coin controlled credit mechanism, having a part settable in substantial accordance with the value of the received coin, a plurality of vending mechanisms for articles of different predetermined values operatively associated therewith, each subtractively to reset said settable part, and each user-controlled for successive operation thereof, said vending mechanisms limited in operation by said credit mechanism to disable each thereof when the credit setting is less than the value of the article deliverable by the respective vending mechanism, whereby the value of the controlling coin may be taken in any quantities of the respective articles aggregating the coin value.

66. A stamp vending machine of the class described, comprising coin receiving and denomination-determining mechanism, credit setting up mechanism co-acting therewith and adapted to set up a credit substantially according to the value of any denomination of coin inserted, stamp delivering mechanisms for various denominations of stamps, means for selectively actuating said stamp delivering mechanisms, and means for checking a further delivery of stamps when the stamps vended equal in value the credit set up.

67. In a machine of the character specified, the combination of article dispensing mechanisms, change making mechanisms having a predetermined credit, and means for altering the predetermined credit; with means controlled by the article dispensing mechanisms for altering the second credit in the change making mechanisms.

68. In a machine of the character specified, the combination of article dispensing mechanisms, change making mechanisms having a predetermined credit, and means for altering the predetermined credit; with means controlled by the article dispensing mechanisms for altering the second credit in the change making mechanisms proportionately with the articles dispensed.

69. In a machine of the character specified, the combination of article dispensing mechanisms, change making mechanisms associated therewith and having a predetermined set credit, and means to augment or diminish the predetermined set credit substantially in accordance with the value of the coin employed; with means controlled by the article dispensing mechanisms for actuating the change making mechanisms for subsequently altering the credit in said change making mechanisms.

70. In a machine of the character specified, the combination of article dispensing mechanisms, change making mechanisms associated therewith and having a predetermined set credit, and means to augment or diminish the predetermined set credit substantially in accordance with the value of the coin employed; with means controlled by the article dispensing mechanisms for actuating the change making mechanisms for deducting from the subsequently set credit an amount proportionate to the number and value of the article dispensed.

71. In a machine of the character specified, the combination of article dispensing mechanisms capable of single or multiple operation, and credit determining and change making mechanisms; with means controlled by the article dispensing mechanisms for setting the credit determining and change making mechanisms according to the value of the article or articles dispensed.

72. In a machine of the character specified, the combination of article dispensing mechanisms capable of single or multiple operation, and associated change making mechanisms; with interconnecting means controlled by the article dispensing mechanisms for setting the change making mechanisms subtractively according to the operation or operations of the article dispensing mechanisms.

73. In a machine of the character specified, the combination of article dispensing means, user controlled means for operating same a plurality of times for dispensing successively a selectively-variable plurality of articles, and change making mechanism automatically controlled by said article dispensing means to vary the change deliverable thereby in accordance with the value of each article dispensed, for proper change making after any selected number of operations of the article dispensing means, and means for actuating said change-making means for change delivery.

74. In a machine of the character specified, the combination of article dispensing mechanisms, and means for operating said article dispensing mechanisms for dispensing articles successively to selectively variable quantity; with change making mechanisms controlled by said article dispensing mechanisms according to the operations of the article dispensing mechanisms and the value of the articles.

75. In a machine of the character specified, the combination of article dispensing mechanisms for dispensing articles of different values, means for operating said article dispensing mechanisms for dispensing one or more of said articles as desired, and change making mechanisms associated with said article dispensing mechanisms; with means controlled by said article dispensing mechanisms for setting said change making mechanisms in accordance with the value of articles dispensed by the article dispensing mechanisms.

76. In a machine of the character specified, the combination of article dispensing mechanisms for dispensing articles of different values, means for operating said article dispensing mechanisms for dispensing one or more of said articles as desired, and change making mechanisms associated with said article dispensing mechanisms; with means controlled by said article dispensing mechanisms for setting said change making mechanisms in accordance with the number and value of the articles dispensed by the article dispensing mechanisms and means controlled by the change making mechanisms for disabling the article dispensing mechanisms.

77. In a machine of the character specified, the combination of article dispensing mechanisms for dispensing one or more articles of different values, and means for operating said article dispensing mechanisms for dispensing any desired number of articles of any desired value; with change making mechanisms having interconnecting means with said article dispensing mechanisms for setting said change making mechanisms in accordance with the values of the articles dispensed by said article dispensing mechanisms.

78. In a machine of the character specified, the combination of article dispensing mechanisms for dispensing one or more articles of different values, means for operating said article dispensing mechanisms for dispensing any desired number of articles of selected value; with change making mechanisms having interconnecting means with said article dispensing mechanisms for actuating said change making mechanisms according to the number and value of the articles dispensed by said article dispensing mechanisms, and means for terminating the operation of said article dispensing mechanisms upon the delivery of change.

79. In a machine of the character specified, the combination of article dispensing mechanisms for dispensing one or more articles of different values and held normally inoperative, means for causing said article dispensing mechanisms to become operative, user-controlled means for operating said article dispensing mechanisms for dispensing any desired number of articles of any desired value; with change making mechanisms having interconnecting means with said article dispensing mechanisms for setting said change making mechanisms according to the number and value of the articles dispensed by said article dispensing mechanisms, and means for terminating the operation of said article dispensing mechanisms controlled by the change making mechanisms and user-controlled means for actuating said change making mechanisms for delivering any change balance contained in said change making mechanisms.

80. In a machine of the character specified, the combination of article dispensing mechanisms, change making mechanisms having a predetermined set credit, credit setting mechanisms, means for operating said article dispensing mechanisms, interconnecting means between said article dispensing mechanisms and said credit setting mechanisms for altering the credit in said change making mechanisms according to the number and value of the articles dispensed, and means for terminating the operation of said article dispensing mechanisms and for actuating said change making mechanisms for delivering any balance contained in said change making mechanisms.

81. In a machine of the character specified, the combination of article dispensing mechanisms, change making mechanisms having a predetermined set credit, coin controlled mechanisms to set up a credit in said change making mechanisms in substantial accordance with coin-value, means for operating said article dispensing mechanisms for dispensing any desired number of articles of any desired value, interconnecting means between said article dispensing mechanisms and said change making mechanisms for altering the predetermined credit in said change making mechanisms in accordance with the number and value of the articles dispensed at each operation of said article dispensing mechanisms, and means for terminating the operation of said article dispensing mechanisms and for actuating said change making mechanisms for delivering any balance contained in said change making mechanisms said means being also adapted for actuating said credit setting mechanisms and said change making mechanisms independently of said article dispensing mechanisms.

82. In a machine of the character specified, the combination of article dispensing mechanisms for dispensing one or more articles of different values and held normally inoperative, change making mechanisms associated with said article dispensing mechanisms, credit setting mechanisms associated with said article dispensing mechanisms and said change making mechanisms, means for causing said article dispensing mechanisms to become operative and said credit setting mechanisms to set up a credit in said change making mechanisms, means for operating said article dispensing mechanisms for dispensing any desired number of articles of any desired value, interconnecting means between said article dispensing mechanisms and said change making mechanisms for altering the credit in said change making mechanisms in proportion to the number and value of the articles dispensed at each operation of said article dispensing mechanisms, and means for terminating the operation of said article dispensing mechanisms and for actuating said change making mechanisms for delivering any balance contained in said change making mechanisms.

83. In a machine of the character described, the combination of article-dispensing means including a rotary shaft; change making means comprising coin-controlled credit mechanism including a rotary shaft for setting up a credit, and change delivering mechanism controlled by said shaft for delivering change according to any credit-setting thereof; interconnecting means between said shafts for diminishing the credit-setting of the second mentioned shaft according to each article-dispensing operation of the other said shaft, user controlled mechanisms for actuating the article-dispensing means and the change-making means; and means actuated by the shaft of said credit mechanism for preventing operation of the article dispensing means.

84. In a vending machine, coin-controlled credit mechanism movable to set a credit amount; article delivering means arranged subtractively to affect the credit mechanism, change delivering means controlled by the credit mechanism user's manipulative means controlling the article delivering means, and means controlled by the credit mechanism for conditioning or disabling the article delivering means to be operated and user's manipulative means controlling the actuation of the change delivering means.

85. In a vending machine, article delivery means operatable for successive delivery of a plurality of items, change making means adapted to deliver variable change amounts and controlled as to amount by the article delivering means, user's manipulative means controlling the operations of article delivery and change delivery, and interlocking means for preventing simultaneous operation of the article delivering and change making means.

86. In a vending machine, the combination of a motor, motor driven article delivering means, successively operatable for selective delivery of a plurality of articles, motor driven change making means interconnected with the article delivering means to deliver change aggregating with the articles a value of a known amount, and user's manipulative means controlling the motor actuation of the said article delivering and change making means.

87. In a motor driven vending machine, the combination of a motor, coin testing means operated by the motor, coin-controlled means for initiating automatic test of the coin, means automatically to stop the motor after the coin has been tested, motor driven article delivering means, user's manipulative means for controlling the operation of the said article delivering means, and automatic means for preventing operation of the article delivering means during the coin testing operation.

88. In a vending machine, a coin receiving opening provided with a door; coin testing devices, credit setting up mechanism adapted to set up a credit corresponding to the value of the coin inserted, article vending devices and change delivering devices controlled by said credit setting up mechanism to deliver aggregately article and change items to the set-up-credit value, and means actuated through closing the door to clear the machine of the credit set up by the previous coin inserted in case said credit has not been utilized either wholly or in part.

89. In a vending and change making machine, a coin receiving and testing means, a coin controlled credit limiting means, means for adjusting the credit limiting means to a position substantially corresponding to the value of the coin inserted, a change delivery means, means for delivering a varying number of articles of varying value, means to subtractively adjust the credit limiting means according to the value of articles delivered, means controlled by the credit limiting means for disabling the change delivery means and article delivering means, user's manipulative means for controlling the delivery operations of said change delivering and article delivering means, and means controlled by the credit limiting means for breaking connection of said user's manipulative means with the mechanisms which they control except when there is a credit set up in the machine.

90. In a vending machine, a coin receiving and testing means, means for ejecting spurious coins and slugs, means for measuring the thickness of each accepted coin, weighing means adapted to be adjusted by said measuring means whereby the coins within a predetermined variation in thickness will operate the weighing means, and additional means for ejecting coins not of predetermined weight.

91. In a vending machine, a coin receiving and testing means; means for ejecting spurious coins and slugs; means for measuring the thickness of each accepted coin; weighing means adapted to be adjusted by said measuring means, whereby the coins within a predetermined variation in thickness will operate the weighing means; means for ejecting coins not of proper weight; a coin actuated credit mechanism adapted to indicate a credit substantially corresponding to the value of the coin retained; article delivery means; change delivery means, and means for rendering the credit available in articles or change or in combination of both.

92. In a coin controlled vending machine, a coin controlled credit mechanism adapted to set up a credit substantially corresponding to the value of the coin inserted; article delivery means; and change delivery means; said means individually controlled by the credit mechanism to limit the operations of the article delivery means and change delivery means to aggregate operation for value-delivery in change or articles according to the credit set up in said credit mechanism.

93. In a commodity vending and change making machine, the combination of article dispensing means adapted to deliver articles successively, user's-control means therefor normally disconnected therefrom for initiating the successive operations thereof, change making means forwardly settable and subtractively resettable to deliver variable change amounts, connections between the article dispensing means and change making means to reset the latter on each operation of the former, user's control means for the change making means to actuate the same for change delivery and normally disconnected therefrom, coin controlled means receptive of different coins for automatically setting the change delivering means accordantly with the coin value, and means operatable by the coin controlled means for establishing the operative connections of both the said user-controlled means.

94. In a commodity vending and change making machine; the combination of a plurality of article dispensing mechanisms for articles of different values having a common operating shaft, a change making mechanism having a reversely rotatable change-amount-determining-shaft, variable gearing for connecting the shaft of the article dispensing mechanisms to subtractively rotate said change-mechanism shaft in different ratios accordantly with the value of each article dispensed, user-controlled means for selecting the article-dispensing mechanism, varying the gearing connection and determining the extent of operation of the selected article-dispensing mechanism, user-controlled means for actuating the change-making means to deliver change, and coin controlled means receptive of different coins for automatically setting initially said reversely-rotatable shaft for change delivery according to the denomination of the inserted coin.

95. In a commodity-vending and change-making machine, the combination of a cam-shaft; a change-maker having a reversely-rotatable credit shaft and change-delivering means controlled thereby; successively-operatable article-delivering means having a unidirectionally-rotatable article-shaft; connections for subtractively moving the credit shaft from the article shaft; a motor connectible to drive the cam-shaft, the article shaft and the change-delivering means respectively; user-controlled means normally disconnected for connecting the motor to drive the article shaft for successive article deliveries at will or to operate the change delivering means; coin controlled means responsive to coins of different denominations for causing the motor to drive the cam shaft, and cam-shaft operated means for testing the coin, rotating the credit shaft and establishing operative connections for said user-controlled means.

96. In a commodity vending and change making machine the combination of a credit mechanism including a settable and resettable credit shaft, article delivery mechanism successively operatable at will to a limit determined by the credit-shaft setting and connectible with the credit-shaft to reset it toward such limit on each delivery operation, user-controlled means, normally disabled, for causing actuation of said article delivering means, change delivering means, operable for change delivery in accordance with any resetting of the credit shaft, user-controlled means, normally disabled, for causing actuation of the change delivering means, a motor for driving the article-delivering means and the change-delivering means, a cam shaft driven by said motor, coin-controlled means responsive to different coins for initiating motor-driven cam-shaft operation, and cam-shaft-driven means for testing the coin, setting the credit shaft according to the coin denomination and enabling the stated user-controlled means to operate.

97. In a commodity vending and change making machine the combination of a credit mechanism including a settable and resettable credit shaft, article delivery mechanism successively operatable at will to a limit determined by the credit-shaft setting and connectible with the credit-shaft to reset it toward such limit on each delivery operation, user-controlled means, normally disabled, for causing actuation of said article delivering means, change delivering means, operatable for change delivery in accordance with any resetting of the credit shaft, user-controlled means, normally disabled, for causing actuation of the change delivering means, a motor for driving the article-delivering means and the change-delivering means, a cam shaft driven by said motor, coin controlled means responsive to different coins for initiating motor driven cam-shaft operation; cam-shaft-driven devices comprising means for testing coin-denomination, credit-shaft setting devices differently positioned according to coin denomination and operated to rotate the credit shaft accordingly; and means to enable the stated user-controlled means to function.

98. In a machine of the class described, the combination with a plurality of ticket issuing mechanisms, of means for operating any desired mechanism to issue a variable number of tickets therefrom, change computing mechanism, and connections for introducing into said computing mechanism the value of each ticket as it is issued.

99. In a machine of the class described, the combination with devices for issuing a varying number of tickets of different values, and means for determining the number of tickets to be issued, change computing mechanism, and connections whereby the determining means controls the change computing mechanism.

100. In a machine of the class described, the combination with a ticket issuing mechanism, of the means for operating said mechanism to issue a variable number of tickets of different values, change computing mechanism, and connections for introducing in the said computing mechanism the total value of the tickets issued at an operation of the ticket issuing mechanism.

101. In a machine of the class described, means to establish therein by a single operation an amount tendered, means to enter therein at different times the amount corresponding to the product of price and quantity of several articles and mechanism issuing change to the extent of the difference between the sum of the several products and the amount tendered.

In testimony whereof I have signed my name to this specification.

FREDERIC H. BRINKERHOFF.